US012621922B2

(12) United States Patent
Hu et al.

(10) Patent No.: US 12,621,922 B2
(45) Date of Patent: May 5, 2026

(54) VOLUMETRIC PLASMAS, AND SYSTEMS AND METHODS FOR GENERATION AND USE THEREOF

(71) Applicants: UNIVERSITY OF MARYLAND, COLLEGE PARK, College Park, MD (US); THE TRUSTEES OF PRINCETON UNIVERSITY, Princeton, NJ (US)

(72) Inventors: Liangbing Hu, Woodbridge, CT (US); Hua Xie, Hyattsville, MD (US); Yiguang Ju, Princeton, NJ (US); Qian Zhang, Greenbelt, MD (US); Ji-Cheng Zhao, Dublin, OH (US)

(73) Assignees: UNIVERSITY OF MARYLAND, COLLEGE PARK, College Park, MD (US); THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 19/117,503

(22) PCT Filed: Oct. 3, 2023

(86) PCT No.: PCT/US2023/034378
§ 371 (c)(1),
(2) Date: Apr. 1, 2025

(87) PCT Pub. No.: WO2024/076574
PCT Pub. Date: Apr. 11, 2024

(65) Prior Publication Data

US 2026/0013030 A1 Jan. 8, 2026

Related U.S. Application Data

(60) Provisional application No. 63/513,567, filed on Jul. 13, 2023, provisional application No. 63/378,215, filed on Oct. 3, 2022.

(51) Int. Cl.
*H05H 1/48* (2006.01)

(52) U.S. Cl.
CPC .................................... *H05H 1/48* (2013.01)

(58) Field of Classification Search
None
See application file for complete search history.

(56) References Cited

U.S. PATENT DOCUMENTS 6,236,160 B1 * 5/2001 Komaki .................. H01J 11/12 313/586
6,376,987 B1 * 4/2002 Amemiya ............... H01J 11/24 313/586

(Continued)

FOREIGN PATENT DOCUMENTS

KR 20100100263 A 9/2010
WO WO-2011103194 A2 * 8/2011 ............ B64G 1/413

(Continued)

OTHER PUBLICATIONS

Allis, W.P., "Review of glow discharge instabilities," *Physica*, 1976, 82C: pp. 43-51. (9 pages).

(Continued)

*Primary Examiner* — Srinivas Sathiraju
(74) *Attorney, Agent, or Firm* — Rowan Tree Law Group, PLLC; Frederick F. Rosenberger

(57) ABSTRACT

A volumetric plasma can be generated between first and second electrodes. The first and second electrodes can be spaced from each other by a gap. The first electrode can comprise a first base layer and a plurality of first projecting portions that extend along a first direction from the first base layer toward the second electrode. The first base layer can comprise a first electrically-conductive material. At least some of the first projecting portions can comprise a second electrically-conductive material. A melting temperature for the first electrically-conductive material and a melting tem- (Continued)

perature for the second electrically-conductive material can be at least 1000 K. During the generating, a temperature of the volumetric plasma between the first and second electrodes can be in a range of 1000-8000 K, inclusive.

20 Claims, 14 Drawing Sheets

(56) References Cited

U.S. PATENT DOCUMENTS

| | | | | |
|---|---|---|---|---|
| 6,858,988 | B1 * | 2/2005 | Laroussi | H01J 65/046 315/111.21 |
| 7,017,594 | B2 * | 3/2006 | Kurunczi | B01L 13/02 134/1.1 |
| 7,094,314 | B2 * | 8/2006 | Kurunczi | B08B 9/00 156/345.43 |
| 7,367,344 | B2 * | 5/2008 | Kurunczi | B01L 13/02 134/22.12 |
| 7,453,191 | B1 * | 11/2008 | Song | H01J 37/32357 315/111.21 |
| 9,228,570 | B2 * | 1/2016 | Roy | F03H 1/0093 |
| 9,282,623 | B2 * | 3/2016 | Roy | H05H 1/247 |
| 9,318,311 | B2 | 4/2016 | Chimmalgi et al. | |
| 9,865,447 | B2 | 1/2018 | Chuang et al. | |
| 11,229,113 | B1 * | 1/2022 | Starikovskiy | H05H 1/48 |
| 11,450,521 | B2 | 9/2022 | Shchemelinin | |
| 11,939,243 | B1 * | 3/2024 | Gorobets | H05H 1/24 |
| 2005/0005948 | A1 * | 1/2005 | Kurunczi | A61L 2/14 134/1 |
| 2005/0139229 | A1 * | 6/2005 | Kurunczi | A61L 2/14 134/1.1 |
| 2006/0081336 | A1 * | 4/2006 | Kurunczi | H01J 37/32825 156/345.43 |
| 2006/0102196 | A1 * | 5/2006 | Kurunczi | H05H 1/2406 134/1.1 |
| 2008/0224953 | A1 * | 9/2008 | Hong | H01J 11/12 345/60 |
| 2008/0297057 | A1 * | 12/2008 | Hur | H01J 11/32 313/582 |
| 2009/0009432 | A1 * | 1/2009 | Kim | H01J 11/12 345/60 |
| 2009/0009433 | A1 * | 1/2009 | Ryu | H01J 11/50 345/60 |
| 2011/0053357 | A1 | 3/2011 | Yamazaki | |
| 2012/0304618 | A1 * | 12/2012 | Roy | F03H 1/0037 60/203.1 |
| 2013/0038199 | A1 * | 2/2013 | Roy | F04B 19/006 313/231.31 |
| 2013/0162136 | A1 | 6/2013 | Baldwin et al. | |
| 2016/0358748 | A1 * | 12/2016 | Hayami | H01J 37/3244 |
| 2016/0358752 | A1 * | 12/2016 | Sakaguchi | H01J 37/32064 |
| 2017/0018409 | A1 * | 1/2017 | Akita | H01J 37/32541 |
| 2017/0104426 | A1 | 4/2017 | Mills | |
| 2018/0090302 | A1 * | 3/2018 | Seok | B01J 19/088 |
| 2022/0087001 | A1 * | 3/2022 | Sato | H05H 1/2439 |
| 2023/0405884 | A1 * | 12/2023 | Sarmah | B29C 35/12 |

FOREIGN PATENT DOCUMENTS

| | | | | |
|---|---|---|---|---|
| WO | WO-2024076574 A2 * | 4/2024 | | B33Y 80/00 |
| WO | WO-2025024738 A1 * | 1/2025 | | H05B 1/023 |
| WO | WO-2025193681 A1 * | 9/2025 | | H01J 37/32541 |

OTHER PUBLICATIONS

Ananthanarasimhan et al., "Influence of gas dynamics on arc dynamics and the discharge power of a rotating gliding arc," *Plasma Sources Science and Technology*, Aug. 2019, 28:085012. (16 pages).

Belan et al., "Compared ionic wind measurements on multi-tip corona and DBD plasma actuators," *Journal of Electrostatics*, 2015 (online Jul. 2015), 76: pp. 278-287. (10 pages).

Bogaerts et al., "The 2020 plasma catalysis roadmap," *Journal of Physics D: Applied Physics*, 2020 53:443001. (51 pages).

Boulos et al., *Thermal Plasmas: Fundamentals and Applications*—vol. 1. New York, New York, Springer Science+Business Media, 1994. (462 pages).

Bradenburg, R., "Dielectric barrier discharges: progress on plasma sources and on the understanding of regimes and single filaments," *Plasma Sources Science and Technology*, Apr. 2017, 26:053001. (30 pages).

Briant, C.L., "The properties and uses of refractory metals and their alloys," *Mat. Res. Soc. Symp. Proc.*, 1994, 322: pp. 305-314. (10 pages).

Cairns et al., "Carbon deposition on metallic surfaces studied by r.f. plasma discharge," *Nature*, Dec. 1980, 288: pp. 686-687. (2 pages).

Chung et al., "Synthesis of Ultra-Incompressible Superhard Rhenium Diboride at Ambient Pressure," *Science*, Apr. 2017, 316: pp. 436-439 (5 pages).

Clerici et al., "Laser-assisted guiding of electric discharges around objects," *Science Advances*, Jun. 2015, 1:e1400111. (6 pages).

Coburn et al., "Plasma etching—A discussion of mechanisms," *Journal of Vacuum Science & Technology*, 1979, 16(2): pp. 391-403. (13 pages).

Cole et al., "Weldability of tungsten and its alloys," *Welding Research Supplement*, Sep. 1971, pp. 419-426. (8 pages).

Conrads et al., "Plasma generation and plasma sources," *Plasma Sources Science and Technology*, 2000, 9(4): pp. 441-454. (14 pages).

Corke et al., "Dielectric barrier discharge plasma actuators for flow control," *Annu. Rev. Fluid Mech.*, 2010 (online Sep. 2009), 42: pp. 505-529. (25 pages).

Darny et al., "Plasma action on helium flow in cold atmospheric pressure plasma jet experiments," *Plasma Sources Science and Technology*, Sep. 2017, 26:105001. (11 pages).

Delikonstantis et al., "Nanosecond pulsed discharge-driven non-oxidative methane coupling in a plate-to-plate electrode configuration plasma reactor," Chemical Engineering Journal, 2020 (online Aug. 2019), 380:122477. (12 pages).

Ecker et al., "Thermal instability of the plasma column," *The Physics of Fluids*, Dec. 1964, 7(12): pp. 2001-2006. (6 pages).

Eliasson, B., "Nonequilibrium Volume Plasma Chemical Processing," *IEEE Transactions on Plasma Science*, Dec. 1991, 19(6): pp. 1063-1077. (15 pages).

Fukuyama et al., "New Synthetic Method of Forming Aluminum Oxynitride by Plasma Arc Melting," *J. Am. Ceram. Soc.*, 1999, 82(6): pp. 1381-1387. (7 pages).

Gershman et al., "Unstable behavior of anodic arc discharge for synthesis of nanomaterials," *Journal of Physics D: Applied Physics*, Jul. 2016, 49:345201. (9 pages).

Go et al., "Microscale gas breakdown: ion-enhanced field emission and the modified Paschen's curve," *Journal of Physics D: Applied Physics*, Nov. 2014, 47:503001. (24 pages).

Golubovskii et al., "Contraction of the positive column of discharges in noble gases," *Plasma Sources Science and Technology*, Sep. 2011, 20:053002. (29 pages).

Haas, R.A., "Plasma stability of electric discharges in molecular gases," *Physical Review A*, Aug. 1973, 8(2): pp. 1017-1043. (27 pages).

Hong et al., "Prediction of the material with highest known melting point from ab initio molecular dynamics calculations," *Physical Review B*, 2015, 92:020104(R). (6 pages).

International Search Report and Written Opinion, mailed Mar. 5, 2024, in International Application No. PCT/US23/34378. (9 pages).

Jacob et al., "High speed 2-dimensional temperature measurements of nanothermite composites: Probing thermal vs. Gas generation effects," *Journal of Applied Physics*, 2018 (online Mar. 2018), 123:115902. (10 pages).

Jalali et al., "Touch-free flash sintering with magnetic induction within a reactor activated by the usual flash method," *J. Am. Ceram. Soc.*, Jun. 2022, 105: pp. 6517-6522. (6 pages).

Ju et al., "Plasma assisted combustion: Dynamics and chemistry," *Progress in Energy and Combustion Science*, Jan. 2015, 48: pp. 21-83. (63 pages).

(56) References Cited

OTHER PUBLICATIONS

Klas et al., "Experimental and theoretical studies of the direct-current breakdown voltage in argon at micrometer separations," *Physica Scripta*, Mar. 2011, 83:045503. (6 pages).
Knight et al., "Application of plasma arc melting technology to processing of reactive metals," *International Materials Review*, 1991, 36(6): pp. 221-252. (32 pages).
Kogelschatz, U., "Dielectric-barrier Discharges: Their History, Discharge Physics, and Industrial Applications," *Plasma Chemistry and Plasma Processing*, Mar. 2003, 23(1): pp. 1-46. (46 pages).
Lieberman et al., *Principles of Plasma Discharges and Materials Processing, Second Edition*. Hoboken, New Jersey, John Wiley & Sons, Inc., 2005. (794 pages).
Liu et al., "Development processes of positive and negative DC corona under needle-plate electrode in air," *2016 IEEE International Conference on High Voltage Engineering and Application* (*ICHVE*), Sep. 2016. (4 pages).
Liu et al., "Sensitive and single-shot OH and temperature measurements by femtosecond cavity-enhanced absorption spectroscopy," *Optics Letters*, Jul. 2022, 47(13): pp. 3171-3174. (4 pages).
Massines et al., "Atmospheric Pressure Low Temperature Direct Plasma Technology: Status and Challenges for Thin Film Deposition," *Plasma Processes and Polymers*, 2012, 9: pp. 1041-1073. (33 pages).
Merche et al., "Atmospheric plasmas for thin film deposition: A critical review," *Thin Solid Films*, 2012 (online Jan. 2012), 520: pp. 4219-4236. (18 pages).
Modi et al., "Miniaturized gas ionization sensors using carbon nanotubes," Nature, Jul. 2003, 424: pp. 171-174. (4 pages).
Moorehead et al., "High-throughput synthesis of Mo—Nb—Ta—W high-entropy alloys via additive manufacturing," Materials and Design, 2020 (online Nov. 2019), 187:108358. (10 pages).
Novoselov et al., "Turbulent nonpremixed cool flames: Experimental measurements, Direct Numerical Simulation, and manifold-based combustion modeling," *Combustion and Flame*, 2019 (online Aug. 2019), 209: pp. 144-154. (11 pages).
Ombrello et al., "Combustion Enhancement via Stabilized Piecewise Nonequilibrium Gliding Arc Plasma Discharge," *AIAA Journal*, Jan. 2006, 44(1): pp. 142-150. (9 pages).
Pangilinan et al., "Enhanced Hardening Effects on Molybdenum-Doped $WB_2$ and $WB_2$-SiC/$B_4C$ Composites," *Chemistry of Materials*, Jun. 2022, 34: pp. 5461-5470. (10 pages).
Rousso et al., "Time and space resolved diagnostics for plasma thermal-chemical instability of fuel oxidation in nanosecond plasma discharges," *Plasma Sources Science and Technology*, Oct. 2020, 29:105012. (11 pages).
Saunders et al., "Ultrafast-Contactless Flash Sintering using Plasma Electrodes," *Scientific Reports*, Jun. 2016, 6:27222. (6 pages).
Slade et al., "The dissociation pressures of some nitrides," *Journal of the Chemical Society, Transactions*, 1919, 115: pp. 215-216. (2 pages).
Starikovskaia, S.M., "Plasma assisted ignition and combustion," *Journal of Physics D: Applied Physics*, Aug. 2006, 39: pp. R265-R299. (35 pages).
Starikovskiy et al., "Plasma-assisted ignition and combustion," *Progress in Energy and Combustion Science*, 2013 (online Aug. 2012), 39: pp. 61-110. (50 pages).
Stoffels et al., "Plasma needle: a non-destructive atmospheric plasma source for fine surface treatment of (bio)materials," *Plasma Sources Science and Technology*, Aug. 2002, 11: pp. 383-388. (6 pages).
Sun et al., "Atmospheric Pressure Plasma-Synthesized Gold Nanoparticle/Carbon Nanotube Hybrids for Photothermal Conversion," *Langmuir*, Mar. 2019, 35: pp. 4577-4588. (12 pages).
Tachi et al., "Low-temperature reactive ion etching and microwave plasma etching of silicon," *Applied Physics Letters*, Feb. 1988, 52(8): pp. 616-618. (3 pages).
Thomas et al., "Optimization of Dielectric Barrier Discharge Plasma Actuators for Active Aerodynamic Flow Control," *AIAA Journal*, Sep. 2009, 47(9): pp. 2169-2178. (10 pages).
Velikhov et al., "Glow discharge in a gas flow," *Soviet Physics Uspekhi*, May 1982, 25(5): pp. 340-358. (19 pages).
Wadhwa, C.L., *High Voltage Engineering—Second Edition*. New Delhi, India, New Age International Publishers, 2007. (312 pages).
Walsh et al., "Room-temperature atmospheric argon plasma jet sustained with submicrosecond high-voltage pulses," Applied Physics Letters, Nov. 2007, 91:221502. (3 pages).
Walsh et al., "Three distinct modes in a cold atmospheric pressure plasma jet," Journal of Physics D: Applied Physics, Feb. 2010, 43:075201. (14 pages).
Wang et al., "Recent developments in DBD plasma flow control," *Progress in Aerospace Sciences*, 2013 (online Jul. 2013), 62: pp. 52-78. (27 pages).
Xie et al., "High-Temperature Pulse Method for Nanoparticle Redispersion," *Journal of the American Chemical Society*, Sep. 2020, 142: pp. 17364-17371. (8 pages).
Xie et al., "Rapid liquid phase-assisted ultrahigh-temperature sintering of high-entropy ceramic composites," Science Advances, Jul. 2022, 8:eabn8241. (8 pages).
Xu, X., "Dielectric barrier discharge—properties and applications," *Thin Solid Films*, 2001, 390: pp. 237-242. (6 pages).
Yang et al., "Instabilities in the anode region of atmospheric pressure arc plasmas," *Plasma Sources Science and Technology*, Sep. 2007, 16: pp. 765-773. (9 pages).
Yokoyama et al., "The mechanism of the stabilisation of glow plasma at atmospheric pressure," *Journal of Physics D: Applied Physics*, 1990, 23: pp. 1125-1128. (5 pages).
Zhong et al., "2D Modeling of Plasma Dynamic Contraction in the Positive Column of Glow Discharge," *AIAA SciTech Forum*, Jan. 2022. (6 pages).
Zhong et al., "Dynamics and chemical mode analysis of plasma thermal-chemical instability," *Plasma Sources Sci. Technol.*, Mar. 2021, 30:035002. (16 pages).
Zhong et al., "Thermal-chemical instability of weakly ionized plasma in a reactive flow," *Journal of Physics D: Applied Physics*, Sep. 2019, 52:484001. (9 pages).

* cited by examiner

VOLUMETRIC PLASMAS, AND SYSTEMS AND METHODS FOR GENERATION AND USE THEREOF

CROSS-REFERENCE TO RELATED APPLICATIONS

The present application claims the benefit of U.S. Provisional Application No. 63/378,215, filed Oct. 3, 2022, entitled "Tip-Enhanced Volumetric Plasma and Methods for Making and Using the Same," and U.S. Provisional Application No. 63/513,567, filed Jul. 13, 2023, entitled "A Uniform, Ultrahigh-Temperature Stable Plasma Operating at Atmospheric Pressure for the Synthesis of Extreme Materials," each of which is hereby incorporated by reference herein in its entirety.

STATEMENT REGARDING FEDERALLY SPONSORED RESEARCH

This invention was made with government support under DE-SC0020233 awarded by the U.S. Department of Energy. The government has certain rights in the invention.

FIELD

The present disclosure relates generally to plasma systems and methods, and more particularly, to generation and use of a volumetric plasma, for example, by applying an electric field between electrodes.

BACKGROUND

Plasma is formed when an electric field electronically and vibrationally excites molecules via electron impact processes. While plasmas have been used for material processing, such as reactive ion etching and thin film deposition, it continues to be challenging to use conventionally-generated plasmas in the fabrication of large-scale bulk materials, in particular, materials have a high-melting point. For such fabrication, uniform high temperatures (e.g., >1000 K) over a large area or volume (e.g., >1 $cm^2$) may be preferable. Volumetric plasmas, such as glow discharge, have been demonstrated. However, flow discharge typically requires low pressure (e.g., <150 torr), where the plasma neutral gas temperature ($T_g$) is significantly lower than the electron temperature ($T_e$). As a result of the low neutral gas temperature (e.g., <1000 K), the ability of glow discharge to process high-temperature materials, particularly at a high yield is limited.

While arc discharge can be used to generate high-temperature plasmas (e.g., up to 10,000 K) at atmospheric pressure, the generated plasmas have spatially non-uniform temperatures and can be unstable. In particular, atmospheric arc discharge between conventional plate electrodes contracts to a narrow, random arc channel (e.g., ~1 mm in diameter), with the resulting temperature distribution being highly non-uniform. Pin-to-pin electrodes can help avoid random discharge. For example, the high curvature of the electrode (e.g., a radius of several mm) can increase the local electric field strength and promote the thermionic emission of secondary electrons. However, such a pin structure can limit the arc plasma to a narrow channel with a limited plasma volume. Use of a rotating gliding arc can increase the discharge volume, but the plasma channel remains a narrow filament with the concomitant non-uniform distribution of temperature and active species.

Embodiments of the disclosed subject matter may address one or more of the above-noted problems and disadvantages, among other things.

SUMMARY

Embodiments of the disclosed subject matter provide systems and methods for generating volumetric plasmas, as well as use of such volumetric plasmas, for example, to subject a sample (e.g., precursor(s), reactant(s), or other material(s)) to high temperatures over relatively large areas with enhanced temporal stability and/or spatial uniformity. In some embodiments, the volumetric plasma can be generated by applying voltage between a pair of electrodes separated by a gap. A surface of at least one of the electrodes that faces the gap can have a dense array of first projecting portions that extend toward the other electrode. The array of first projecting portions can create numerous concentrated electric fields that merge across the electrodes, which can accelerate the Townsend-breakdown to arc-discharge transition and expand initial spark discharges into a volumetric plasma. In some embodiments, a surface of at least one of the electrodes that faces the gap can have one or more longer projecting portions that extend toward the other electrode farther than the first projecting portions so as to contact or be narrowly spaced from one or more portions of the other electrode. The longer projecting portions can help initiate plasmas through spark discharge at lower breakdown voltages.

In one or more embodiments, a method can comprise generating a volumetric plasma between first and second electrodes spaced from each other by a gap. The first electrode can comprise a first base layer and a plurality of first projecting portions that extend along a first direction from the first base layer toward the second electrode. The first base layer can comprise a first electrically-conductive material. At least some of the first projecting portions can comprise a second electrically-conductive material. The melting temperature for the first electrically-conductive material and the melting temperature for the second electrically-conductive material can be at least 1000 K. During the generating, a temperature of the volumetric plasma between the first and second electrodes can be in a range of 1000-8000 K, inclusive.

In one or more embodiments, a system can comprise first and second electrodes, an electrical power source, and a control system. The first electrode can comprise a first base layer and a plurality of first projecting portions. The first base layer can comprise a first electrically-conductive material. At least some of the first projecting portions can comprise a second electrically-conductive material. The melting temperature for the first electrically-conductive material and the melting temperature for the second electrically-conductive material can be at least 1000 K. The second electrode can be spaced from the first electrode by a gap. The plurality of first projecting portions can extend along a first direction from the first base layer toward the second electrode. The electrical power source can be electrically coupled to the first and second electrodes. The control system can be operatively coupled to the electrical power source and can be configured to control operation thereof. The control system can comprise one or more processors and computer-readable storage media storing instructions that, when executed by the one or more processors, cause the electrical power source to apply voltage between the first and second electrodes such that a volumetric plasma is generated within or adjacent to the gap. A temperature of the volumetric plasma can be in a range of 1000-8000 K, inclusive.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1A:
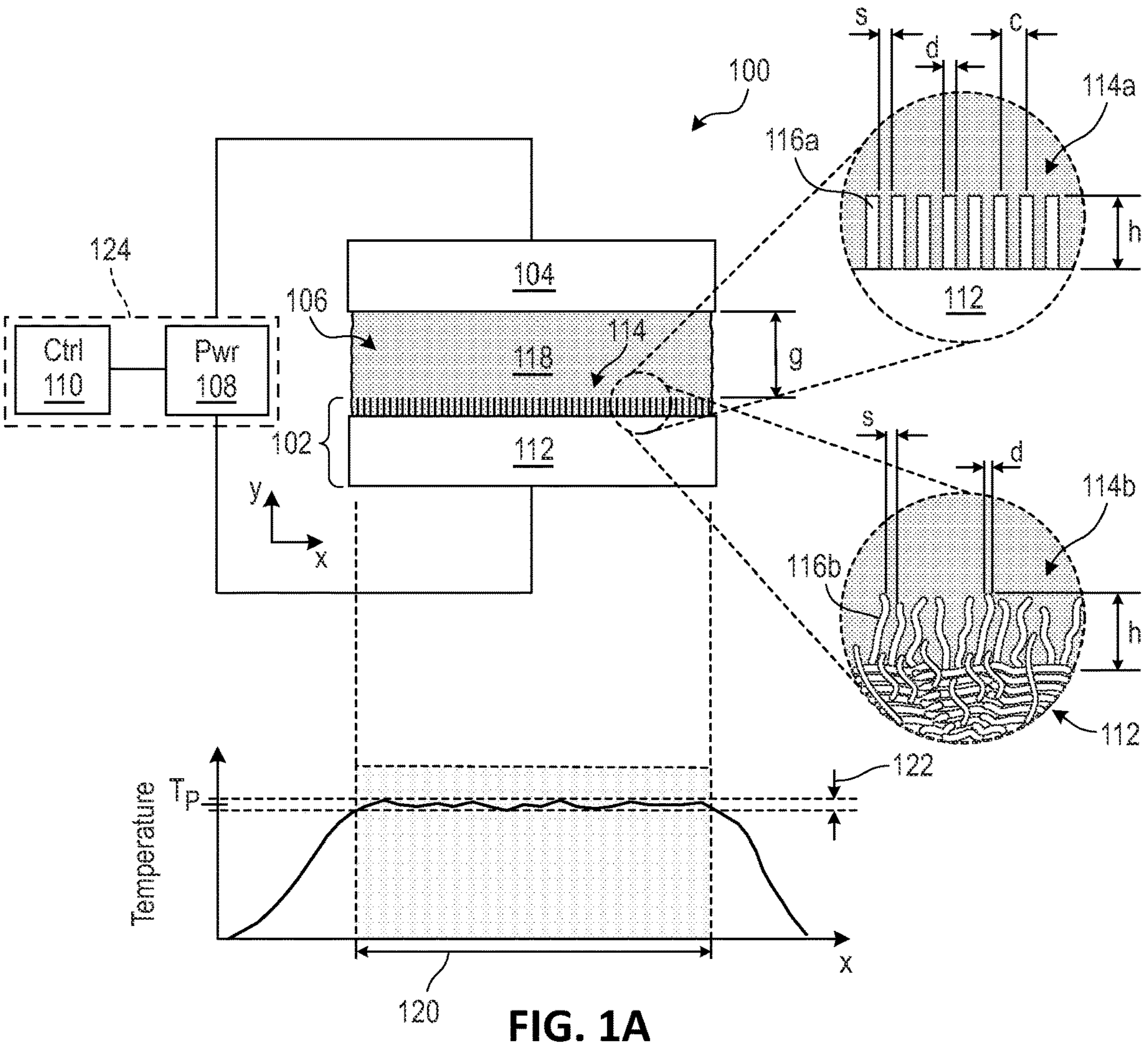
FIG. 1A is a simplified schematic diagram of a system having an electrode with projecting portions for generating a volumetric plasma, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about," "substantially," or "approximately" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein but are not intended to be limiting. For example, certain terms may be used such as "inner," "outer," "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part, and the object remains the same.

As used herein, "comprising" means "including," and the singular forms "a" or "an" or "the" include plural references unless the context clearly dictates otherwise. The term "or" refers to a single element of stated alternative elements or a combination of two or more elements unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following are provided to facilitate the description of various aspects of the disclosed subject matter and to guide those skilled in the art in the practice of the disclosed subject matter.

Volumetric Plasma: A three-dimensional volume of electrons, ions, and/or excited molecules created and/or maintained by application of an electric field between electrodes. In some embodiments, the plasma can be generated via application of a direct current (DC) voltage, an alternating current (AC) voltage (e.g., radio frequency (RF), for example, in a range of 3 kHz to 300 GHz), or other waveform (e.g., pulsed voltage waveform) between the electrodes.

Cloth or Felt: A structure formed of a plurality of fibers, for example, woven together (e.g., to form a cloth) or otherwise coupled together (e.g., matting, condensing, and/or pressing fibers together to form a felt). In some embodiments, the cloth or felt can be formed of carbon or metal fibers (e.g., a refractory metal or refractory metal alloy). In some embodiments, a carbon cloth or felt can be formed by carbonizing (e.g., at a temperature of at least 1000 K) polyacrylonitrile (PAN) or rayon fibers.

Inert atmosphere: An atmosphere of one or more gases that do not undergo a chemical reaction when subjected to the temperature of a generated plasma. In some embodiments, each gas in the inert atmosphere is selected from the group consisting of nitrogen, argon, helium, neon, krypton, xenon, radon, and oganesson.

Refractory material: A material (e.g., element or compound) having a melting temperature (e.g., at atmospheric pressure) of at least 1000 K, for example, at least 1850 K (~1580° C.). In some embodiments, a refractory material can be as defined in ASTM C71-01, "Standard Terminology Relating to Refractories," August 2017, which is incorporated herein by reference. In some embodiments, the refractory material can be carbon (e.g., graphite, carbon cloth, carbon felt, carbon nanotubes), refractory metals, refractory metal alloys, refractory ceramics, or any combination thereof.

Refractory metal or refractory metal alloy: A metal or metal alloy having a melting temperature (e.g., at atmospheric pressure) of at least 1000 K, for example, at least 2100 K (~1850° C.). In some embodiments, the refractory metal can be niobium, molybdenum, tantalum, tungsten, rhenium, alloys thereof, or any combination thereof.

Refractory Ceramic: An inorganic oxide, nitride, boride, or carbide material having a melting temperature (e.g., at atmospheric pressure) of at least 1000 K. In some embodiments, the ceramic is electrically conductive, for example, having an electrical conductivity of at least $10^{-2}$ S/cm at room temperature. In some embodiments, the ceramic can be a metal carbide, a metal nitride, a metal diboride, silicon carbide, or any combination thereof. In some embodiments, the metal carbide can be tantalum carbide, hafnium carbide, zirconium carbide, niobium carbide, titanium carbide, or any combination thereof. In some embodiments, the metal nitride can be tantalum nitride, hafnium nitride, zirconium nitride, niobium nitride, titanium nitride, or any combination thereof. In some embodiments, the metal diboride can be tantalum diboride, hafnium diboride, zirconium diboride, niobium diboride, titanium diboride, or any combination thereof.

Refractory high-entropy superalloy (RHEA): An alloy formed of five or more elements, in substantially equal proportions, at least some of which are refractory metals.

Powder: A plurality of particles, each having a maximum cross-sectional dimension (e.g., diameter when the particle is spherical) less than or equal to about 1 mm. In some embodiments, an identified particle size represents an average particle size for all particles (e.g., an average of the maximum cross-sectional dimensions). In some embodiments, the particle size can be measured according to one or more known standards, such as, but not limited to, ASTM B214-16 entitled "Standard Test Method for Sieve Analysis of Metal Powders," ASTM B330-20 entitled "Standard Test Methods for Estimating Average Particle Size of Metal Powders and Related Compounds Using Air Permeability," ASTM B822-20 entitled "Standard Test Method for Particle Size Distribution of Metal Powders and Related Compounds by Light Scattering," and ASTM B922-20 entitled "Standard Test Method for Metal Powder Specific Surface Area by Physical Adsorption," all of which are incorporated by reference herein.

Nanoparticle: An engineered particle formed of one or more elements and having a maximum cross-sectional dimension (e.g., diameter when the particle is spherical) less than or equal to about 1 μm, for example, about 500 nm or less. In some embodiments, the nanomaterial has a maximum cross-sectional dimension of less than or equal to about 300 nm, for example, in a range of 10-100 nm, inclusive. In some embodiments, the nanomaterial is formed of at least two (2) elements, for example, three (3) or more elements.

Introduction

Disclosed herein are systems and methods for generation of volumetric plasmas, and use thereof, for example, for materials synthesis, fabrication, and/or catalysis. In some embodiments, the generated volumetric plasmas can exhibit high temperatures (e.g., >1000 K, for example, 3000-8000 K) over relatively large areas (e.g., ≥1 $cm^2$). In some embodiments, the generated volumetric plasmas can exhibit enhanced temporal stability, enhanced spatial uniformity, or both. For example, the volumetric plasma can be substantially stable over time, with a peak temperature at a point within its volume, an average temperature across its volume, and/or a temperature at a point within its volume that varies by no more than 10% for at least 1 minute (e.g., ≥10 minutes). Alternatively or additionally, the volumetric plasma can have a substantially uniform temperature across its volume (or at least across its lateral area in a plane perpendicular to a thickness of the gap), for example, a temperature at each point in the plasma being no more than 10% from a peak temperature or an average temperature across the plasma.

The volumetric plasma can be generated by applying voltage between a pair of electrodes separated by a gap, and a surface of at least one of the electrodes that faces the gap can have a plurality of projecting portions (e.g., pillars, fibers, tips, or other surface protrusions). The use of the projecting portions can help decrease the voltage needed for gas breakdown and/or allow a uniform volumetric plasma to be achieved at a lower current and power. In particular, the projecting portions can produce enhanced electric fields that merge across the surface of the electrodes, accelerate the Townsend breakdown to arc transition, expand the plasma size and volume, and increase the plasma uniformity, unlike conventional arc discharge. Moreover, the expansion can generate a collective heating effect that can help to stabilize the plasma.

For example, FIG. 1A shows a plasma generation system 100 with a first electrode 102, a second electrode 104, an electrical power supply 108, and a controller 110. In the illustrated example, the first electrode 102 is separated from a second electrode 104 by a gap 106 of thickness, g, and has a plurality 114 of first projecting portions 116 that extend (e.g., along the y-direction) toward the second electrode 104. In some embodiments, the thickness, g, of the gap 106 can be less than 10 cm, for example, in a range of 1 mm to 1 cm. A voltage (DC, AC, or other waveform, such as a pulsed voltage waveform) can be applied across the electrodes 102, 104 by electrical power supply 108 to form a volumetric plasma 118 within the gap 106. In some embodiments, during the volumetric plasma 118, a peak voltage applied between the electrodes 102, 104 can be less than or equal to 100 V (e.g., ≤50 V), and/or a peak current between the electrodes 102, 104 can be less than or equal to 100 A (e.g., ≤50V).

In some embodiments, the volumetric plasma 118 can be generated at any pressure, with or without application of a magnetic field, for example, in a range from 1 Torr to 10 atm. For example, the volumetric plasma 118 can be generated at atmospheric pressure (e.g., about 1 atm). In some embodiments, the volumetric plasma 118 can exhibit a substantially uniform temperature across a lateral extent 120 (e.g., in the x-z plane) of the plasma. In some embodiments, the lateral extent 120 of the volumetric plasma 118 can be at least 1 mm, for example, in a range of 1 mm to 100 cm. In some embodiments, the temperature at different points in the volumetric plasma 118 along its lateral extent 120 can be within a narrow band 122 around a plasma temperature, $T_P$, for example, less than or equal to 10% of the plasma temperature (e.g., band=±50 K for $T_P$=1000 K). In some embodiments, the plasma temperature, $T_P$, can be at last 1000 K, for example, in a range of 3000-8000 K. Alternatively, in some embodiments, the volumetric plasma 118 can be a non-thermal or cold plasma, for example, where the temperature of electrons is greater than 1000 K (e.g., in a range of 3000-8000 K) while the temperature of heavy species (e.g., ions and neutral particles) is less than 1000 K (e.g., at or approaching room temperature). In some embodiments, the plasma temperature, $T_P$, can be an average temperature across the lateral extent 120 of the volumetric plasma, or a temperature at a center (e.g., in the x-z plane) of the lateral extent 120 of the plasma.

In some embodiments, the plasma temperature, $T_P$, can be changed by selecting or altering the power input from power supply 108 (e.g., with higher powers corresponding to higher temperatures), selecting or altering the distance, g, of the gap 106 (e.g., with smaller gaps corresponding to higher temperatures), and/or selecting or altering the gas pressure between the two electrodes 102, 104 (e.g., with higher pressures corresponding to higher temperatures). In some embodiments, the volumetric plasma can be temporally stable, for example, such that the profile of temperature across lateral extent 120 and/or plasma temperature, $T_P$, stays about the same for a substantially constant power input (e.g., power of a DC signal, power and frequency for an AC signal, power and frequency for a pulsed voltage waveform, etc.) for any amount of time, for example, at least 1 minute (e.g., ≥10 minutes).

Controller 110 can control operation of the electrical power supply 108, for example, timing, application, and/or magnitude of the voltage, current, or electrical power applied across the electrodes 102, 104, which may in turn control characteristics of the volumetric plasma (e.g., on/off, temperature, etc.). In the illustrated example, controller 110 is operatively coupled to the electrical power supply 108. Alternatively or additionally, controller 110 and the electrical power supply 108 may be considered part of a unitary system, for example, different modules of a control system 124. In some embodiments, controller 110 can control other aspects of system 100, for example, size of gap 106 and/or pressure between electrodes 102, 104.

In the illustrated example of FIG. 1A, the projecting portions extend from a base layer 112 of the first electrode 102. In some embodiments, the projecting portions can be disposed on or formed from a surface of the base layer 112, for example, pillars 116*a* of plurality 114*a* in the top inset of FIG. 1A. Alternatively or additionally, in some embodiments, the projecting portions are exposed or cut surface portions of the base layer 112, for example, fibers 116*b* of plurality 114*b* in the bottom inset of FIG. 1A. In some embodiments, each projecting portion 116 can have a cross-sectional dimension (e.g., a maximum or minimum cross-sectional dimension in the x-z plane, for example, a diameter), d, less than or equal to 500 μm. In some embodiments, the cross-sectional dimension, d, for the projecting portions 116 can be greater than 1 μm, for example, in a range of 1-100 μm. In some embodiments, the cross-sectional dimension, d, may represent an average of each of the projecting portions 116, with the cross-sectional dimensions of the projecting portions 116 being within 10% of the average.

In some embodiments, the spacing, s, between adjacent projecting portions 116 (e.g., along the x-direction, along the z-direction, and/or along the x-z plane) can be less than or equal to 1 mm. In some embodiments, the spacing, s, can be about the same or less than the cross-sectional dimension, d, for example, less than or equal to 100 μm (e.g., in a range of 1-50 μm). In some embodiments, the spacing, s, may represent an average spacing across the plurality 114. In some embodiments, the individual spacings between pairs of projecting portions 116 can be within 10% of the average. In some embodiments, the combination of the cross-sectional dimension, d, and spacing, s, can yield a center-to-center spacing, c, less than 1 mm, for example, 1-100 μm. Alternatively or additionally, the plurality 114 can exhibit a density of at least $10^4$ projecting portions per $cm^2$, for example, about $10^5$ portions/$cm^2$.

Alternatively or additionally, the spacing, s, may be less than or about the same (e.g., within an order of magnitude) as the Debye length of the system 100. The Debye length ($\lambda_D$) describes the distance within which the charges are increasingly electrically screened and the electric potential decreases exponentially in magnitude by 1/e, where e is the electron charge. It can be calculated with the following equation:

$$\lambda_D = \sqrt{\frac{k_B T_e \varepsilon}{n_e e^2}}$$

Tin which $k_B$ is the Planck constant ($1.38e^{-23}$ J/K=$8.617e^{-5}$ eV/K), $T_e$ is the electron temperature (e.g., about 4000-8000 K), $n_e$ is the electron density (e.g., about $10^{-12}$ $cm^{-3}$), and ε is the plasma permittivity (e.g., 55.26 $e^2$/(eV·μm)). In some embodiments, with the spacing close to the Debye length, the electric fields generated by the projecting portions can merge during early stages of plasma formation, which can help form a uniform, volumetric plasma. For example, assuming $T_e$=8000 K and $n_e$=$10^{12}$ $cm^{-3}$, the Deby length, $\lambda_D$, can be estimated as ~6.2 μm, and the spacing, s, can be in a range of 1-10 μm.

In some embodiments, the length, h, of the projecting portions 116 (e.g., along the y-direction from a surface of the base layer 112) can be greater than its cross-sectional dimension, d. Alternatively or additionally, the length, h, of the projecting portions 116 can be less than the gap size, g. In some embodiments, the length, h, of the projecting portions 116 can be greater than or equal to 100 μm and/or less than or equal to 1 cm, for example, in a range of 200-500 μm. In some embodiments, the length, h, may represent an average length across the plurality 114. In some embodiments, the length of each projecting portion 116 can be within 10% of the average. In some embodiments, each projecting portion can be substantially straight and extend substantially parallel to a thickness of the gap (e.g., parallel to the y-direction), for example, as shown by pillars 116*a* in FIG. 1A. Alternatively or additionally, in some embodiments, each projecting portion can deviate from being substantially straight along at least part of its length, and/or have a part at angle with respect to a thickness of the gap (e.g., extending in the x-z plane), for example, as shown by fibers 116*b* in FIG. 1B, in which case the length, h, can be the distance the projecting portion extends along the y-direction.

In some embodiments, the first electrode 102 and the second electrode 104 can be formed of electrically-conductive materials that can withstand the plasma temperature, for example, having melting temperatures (e.g., at atmospheric pressure) that is at least 1000 K. For example, the first electrode 102 and/or the second electrode 104 can be formed of refractory materials (e.g., carbon, refractory metal or alloy, and/or refractory ceramic). In some embodiments, the base layer 112 of the first electrode 102 can be formed of an electrically-conductive material different from that of the plurality 114 of projecting portions. For example, the base layer can be graphite, and the projecting portions can be refractory metal (e.g., when pillars 116*a* are formed on base layer 112). Alternatively, in some embodiments, the base layer 112 and the projecting portions can be formed of a same electrically-conductive material (e.g., e.g., when fibers 116*b* constitute both the plurality 114 and the base layer 112).

Figure 1B:
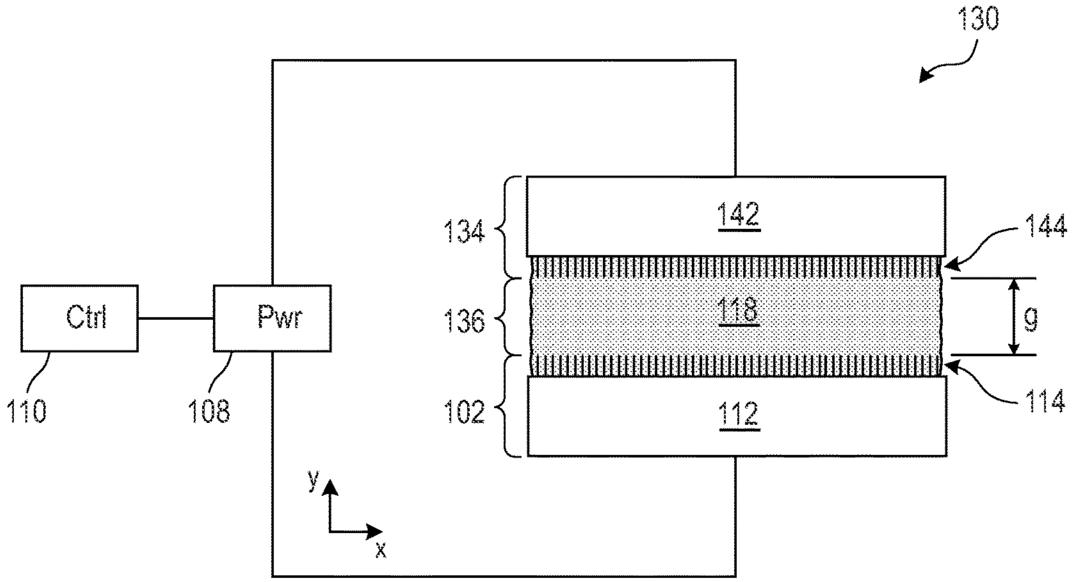
FIG. 1B is a simplified schematic diagram of another system having a pair of electrodes with projecting portions for generating a volumetric plasma, according to one or more embodiments of the disclosed subject matter.

In the illustrated example of FIG. 1A, the second electrode 104 is provided as a planar electrode without projecting portions. In some embodiments, the first electrode 102 with projecting portions can operate as an anode, and the second electrode 104 without projecting portions can operate as a cathode. However, in some embodiments, the second electrode 104 can also have its own projecting portions. For example, FIG. 1B shows a plasma generation system 130 that has a first electrode 102, second electrode 134, electrical power supply 108, and controller 110. Similar to the example of FIG. 1A, the first electrode 102 has a plurality 114 of projecting portions on base layer 112 separated from a second electrode 134 by a gap 136 of thickness, g. However, the second electrode 134 has another plurality 144 of projecting portions on base layer 142, which projecting portions may have a configuration (e.g., shape, size, spacing, and/or material) that is the same as or different from that of plurality 114 of the first electrode 102.

In some embodiments, the volumetric plasma 118 can be used for materials synthesis or processing (e.g., bulk materials, powders, nanoparticles, nanotubes, nanomaterials), chemical reactions (e.g., to convert one or more reactants into one or more products, with or without a catalyst), sterilization (e.g., using a cold plasma to treat food or medical devices), or for any other purpose where application of a plasma temperature may be useful. In some embodiments, the plasma generation system can provide rapid cooling (e.g., ≥$10^2$ K/s, for example, in a range of $10^3$ to $10^5$ K/s) after the high temperature application, for example, by moving the processed material out of the volumetric plasma, reducing a temperature of the volumetric plasma, turning off the volumetric plasma, and/or providing an active cooling modality (e.g., air stream directed at the processed material, use of a heat exchanger, etc.).

Examples of Electrode Configurations

Figure 2A:
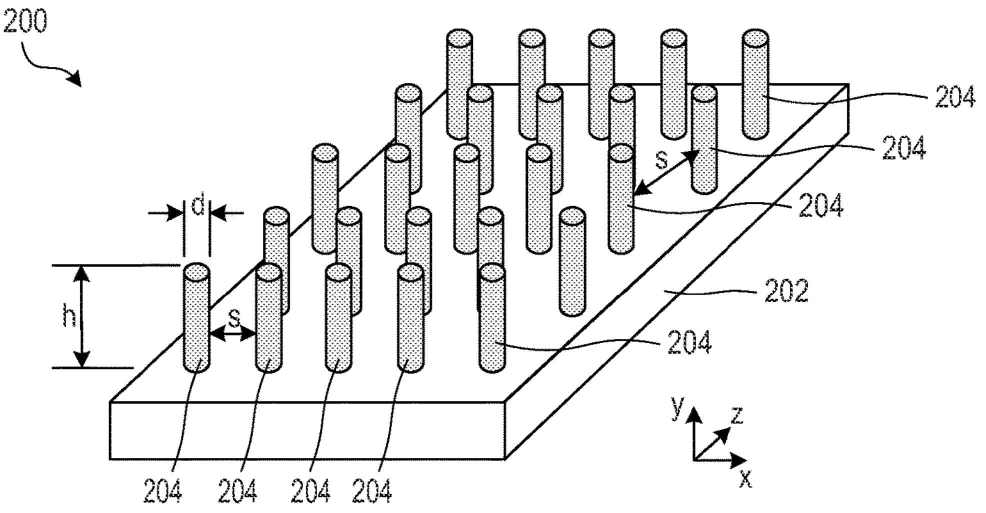
FIG. 2A is a simplified perspective view of an electrode with projecting portions, according to one or more embodiments of the disclosed subject matter.

In some embodiments, one or both electrodes in the plasma generation system can comprise an array of projecting portions. For example, FIG. 2A illustrates a configuration for an electrode 200 that has a two-dimensional array (e.g., in the x-z plane) of projecting portions 204 formed on a substantially planar base layer 202. In the illustrated example of FIG. 2A, the projecting portions 204 are shaped as round pillars or rods; however, other shapes are also possible according to one or more contemplated embodiments. In some embodiments, the base layer 202 and at least some of the projecting portions 204 can be composed of a refractory material, for example, a refractory metal.

Figure 2B:
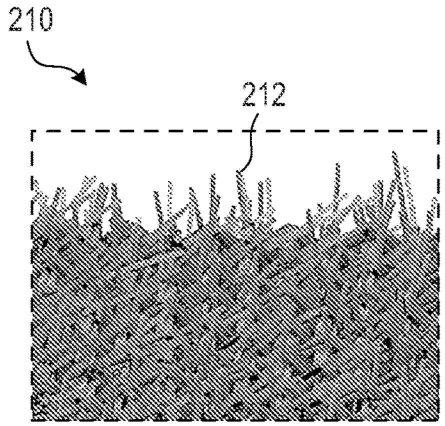
FIG. 2B is a simplified perspective view of a cloth electrode with fiber projecting portions, according to one or more embodiments of the disclosed subject matter.

In some embodiments, projecting portions 204 can be formed by a three-dimensional printing modality, such as but not limited to laser-based direct energy deposition or laser powder-bed fusion. Alternatively or additionally, in some embodiments, the array of projecting portions can be formed from the underlying base layer, for example, by cutting, abrading, and/or roughening a surface of a cloth or felt formed of refractory material fibers (e.g., carbon or metal fibers). For example, FIG. 2B illustrates a configuration for an electrode 210 that has projecting portions 212 formed by fibers fragmented at and/or exposed from a cut surface of a carbon cloth.

Figure 2C:
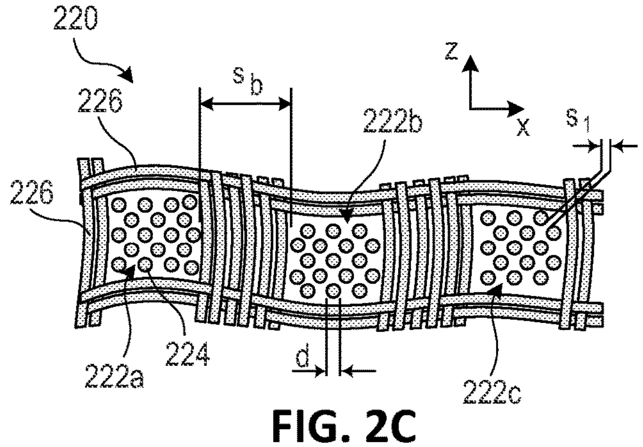
FIG. 2C shows a plan view of another cloth electrode with bundles of fiber projecting portions, according to one or more embodiments of the disclosed subject matter.
Figure 2D:
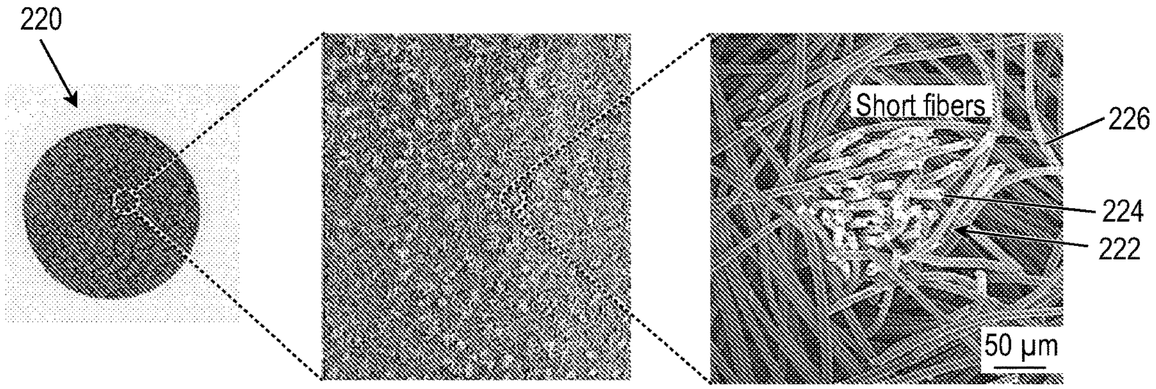
FIG. 2D show images of a carbon felt electrode with bundles of fiber projecting portions, according to one or more embodiments of the disclosed subject matter.

In some embodiments, the underlying base layer can comprise woven fibers, and the projecting portions can be arranged in bundles based on the weave pattern. For example, FIGS. 2C-2D illustrate a configuration for an electrode 220 that has bundles 222*a*-222*c* of cut fibers 224 held together but separated by laterally-oriented fibers 226. Within each bundle 222*a*-222*c*, the cut fibers 224 can be separated from each other (e.g., along the x-z plane) by an intra-bundle spacing, $s_1$, for example, similar to the spacing, s, described above with respect to FIG. 1A. Between bundles (e.g., between bundles 222*a* and 222*b* in FIG. 2C), adjacent cut fibers 224 can be separated by an inter-bundle spacing, $s_b$, greater than the intra-bundle spacing, $s_1$, for example, less than or equal to 500 μm (e.g., in a range of 50-250 μm). In some embodiments, the laterally-oriented fibers 226 can serve as the base or supporting layer, and the cut fibers 224 extending (e.g., along the y-direction) beyond the laterally-oriented fibers 226 serve as projecting portions.

Figure 2E:
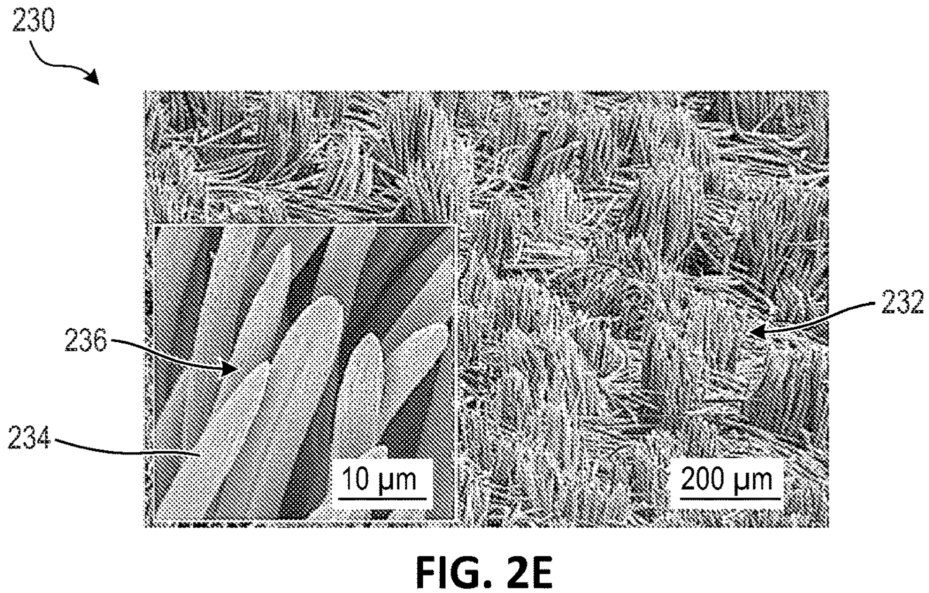
FIG. 2E shows scanning electron microscopy (SEM) images of sharpened tips of fiber projecting portions of a carbon felt electrode, according to one or more embodiments of the disclosed subject matter.
Figure 2F:
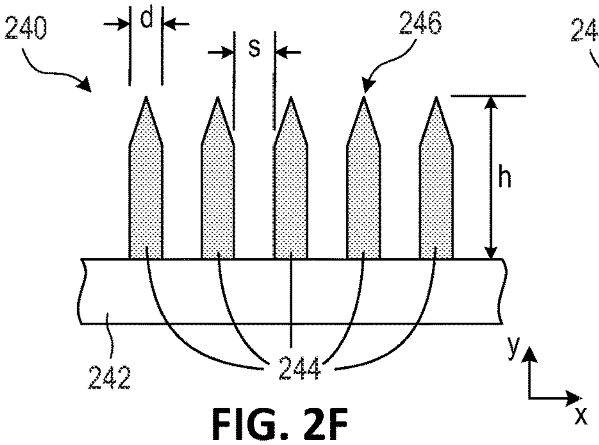
FIGS. 2F-2G are cross-sectional and plan views of an electrode with projecting portions having two-dimensional sharp tips, according to one or more embodiments of the disclosed subject matter.
Figure 2G:
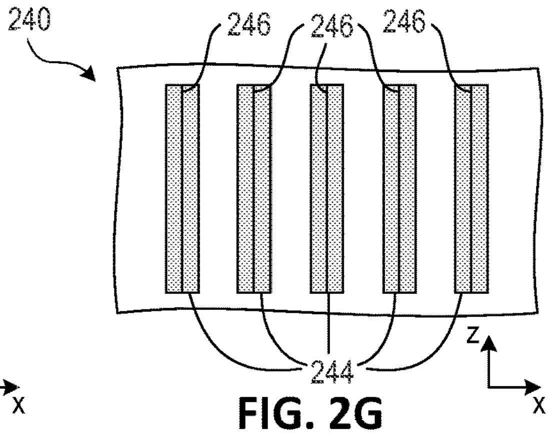

In some embodiments, exposed ends of the projecting portions (e.g., adjacent to the gap) can have a narrowed or tapered shape, for example, a one-dimensional tip. For example, FIG. 2E shows a configuration for an electrode 230 having bundles 232 of cut fibers 234 that have been sharpened to have a conical tip 236, which can further decrease the barrier for arc discharge. In some embodiments, the sharpening of the fiber tip can be a result of the initial plasma generation. For example, after the first plasma breakdown, due to temperature and local electrical fields, the tips of carbon fibers can gradually be sharpened to have the conical shape. Other modalities for tip sharpening are also possible according to one or more contemplated embodiments. Alternatively or additionally, in some embodiments, the projecting portions can have tips that are narrowed or tapered in only one dimension, for example, forming a two-dimensional tip. For example, FIGS. 2F-2G show a configuration for an electrode 240 having elongated projecting portions 244 formed on base layer 242, and each of the projecting portions can have a respective two-dimensional tip 246 (e.g., knife edge).

Figure 2H:
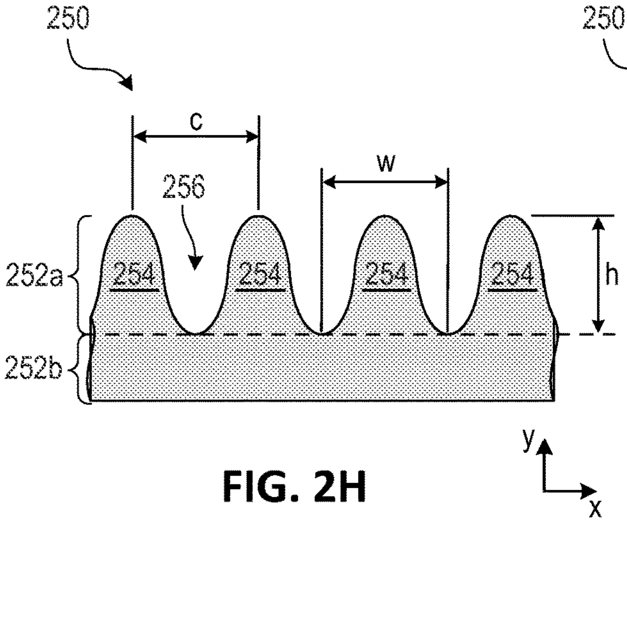
FIGS. 2H-2I are cross-sectional and plan views of an electrode with projecting portions having blunt tips, according to one or more embodiments of the disclosed subject matter.
Figure 2I:
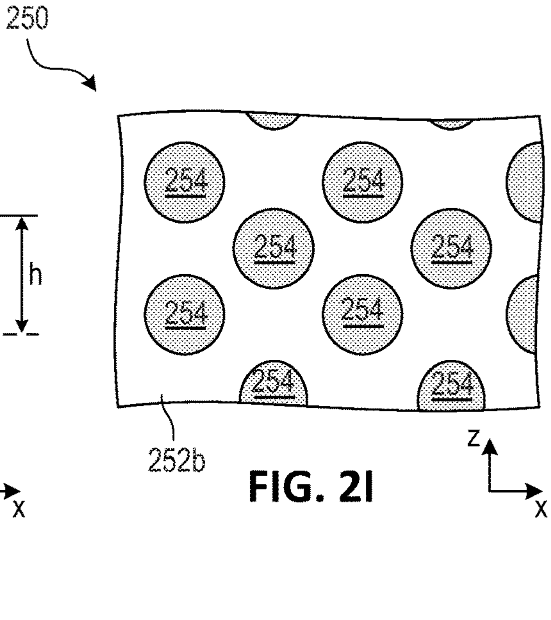

Alternatively or additionally, in some embodiments, the projecting portions can be formed as protruding surface features of an underlying bulk part, for example, rounded or blunt tips. For example, FIGS. 2H-2I show a configuration for an electrode 250 having a plurality of projecting portions formed by surface features 252*a* of an underlying base layer 252*b*. In the illustrated example of FIGS. 2H-2I, the projecting portions are rounded bumps 254 surrounded by a recessed surface portion 256. The bumps 254 can have a maximum cross-sectional dimension, w, (e.g., e.g., along the x-z plane), for example, similar to the cross-sectional dimension, d, described above with respect to FIG. 1A, and/or the bumps 254 can be separated from adjacent bumps (e.g., along the x-z plane) by a center-to-center spacing, c, for example, similar to the spacing, s, described above with respect to FIG. 1A.

Although the projecting portions in FIGS. 2A-2I are shown as having the same size and shape, in some embodiments, one, some, or all of the projecting portions can have a size and/or shape different from that of the other projecting portions. Moreover, FIGS. 2A-2I illustrate a regular array for the projecting portions, embodiments of the disclosed subject matter are not limited thereto. Rather, in some embodiments, the spacing, size, and/or shape of the projecting portions can change across the face of the electrode (e.g., along the x-direction, along the z-direction, or both). For example, the array of projecting portions can have a variable spacing or random arrangement.

Examples of Structures and Configurations for Volumetric Plasma Initiation

In some embodiments, a system for generating volumetric plasma can include means for initiating the plasma, for example, by providing a smaller distance than the gap between electrodes such that gas discharge occurs at a lower voltage than would otherwise be possible. In some embodiments, the initiating means can be temporary, for example, removed or altered once the plasma is initiated. In some embodiments, the initiating means can be reusable or reproducible, for example, to initiate the plasma between the electrodes more than once. Alternatively, in some embodiments, the initiating means may be consumable, for example, degraded or decomposed by the high temperatures of the generated volumetric plasma.

In some embodiments, the volumetric plasma can be generated by applying voltage between the electrodes separated by a first gap, a surface of at least one of the electrodes that faces the first gap can have a plurality of first projecting portions, and a surface of at least one of the electrodes that faces the first gap can have a plurality of second projecting portions (e.g., pillars, fibers, tips, or other surface protrusions). In some embodiments, the first and second projecting portions can be on the same surface, with the second projecting portions being longer than the first projecting portions so as to extend into the first gap between the electrodes. In some embodiments, the second projecting portions form a narrower second gap with the other electrode (e.g., a surface of the other electrode facing the gap, a first projecting portion extending from the surface of the other electrode, or a second projecting portion extending from the surface of the other electrode). In some embodiments, the narrower second gap can be at least an order of magnitude smaller than the first gap and/or have a size that is within an order of magnitude of a cross-sectional dimension of the second projecting portion. In some embodiments, gas discharge can occur across the second gap at a voltage (or power) much lower than that needed to generate gas discharge across the first gap, for example, by at least an order of magnitude.

Figure 3A:
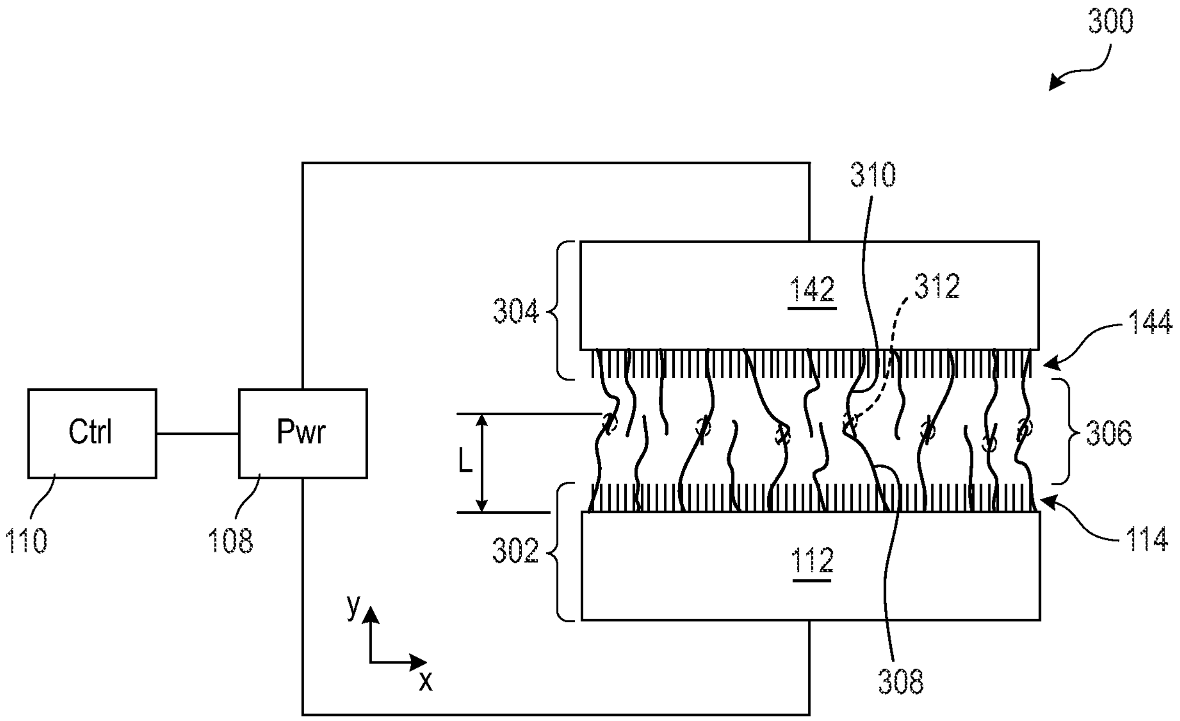
FIG. 3A is a simplified schematic diagram of a system having a pair of electrodes with short and long projecting portions for generating a volumetric plasma, according to one or more embodiments of the disclosed subject matter.

For example, FIG. 3A shows a plasma generation system 300 with a first electrode 302, a second electrode 304, an electrical power supply 108, and a controller 110. In the illustrated example, the first electrode 302 is separated from a second electrode 304 by a first gap 306 (e.g., having thickness, g). In some embodiments, the gap 306 can be less than 10 cm, for example, in a range of 1 mm to 1 cm. The first electrode 302 can have a plurality 114 of first projecting portions that extend (e.g., along the y-direction) toward the second electrode 304, and the second electrode 304 can have its own plurality 144 of second projecting portions that extend (e.g., along the y-direction) toward the first electrode 302. In addition, the first electrode 302 can have one or more second projecting portions 308 that extend (e.g., along the y-direction) farther than the plurality 114 of first projecting portions, and the second electrode 302 can have its own one or more second projecting portions 310 that extend (e.g., along the y-direction) farther than the plurality 144 of first projecting portions. The second projecting portions 310 of the second electrode may have a configuration (e.g., shape, size, spacing, and/or material) that is the same as or different from that of the second projecting portions 308 of the first electrode 302.

In some embodiments, the second projecting portions 308, 310 can be disposed on or formed from a surface of the respective base layer 112, 142, for example, similar to but longer than pillars 116*a* in the top inset of FIG. 1A. Alternatively or additionally, in some embodiments, the second projecting portions 308, 310 are exposed or cut surface portions of the respective base layer 112, 142, for example, similar to but longer than fibers 116*b* in the bottom inset of FIG. 1A. In some embodiments, each second projecting portion 308, 310 can have a cross-sectional dimension (e.g., a maximum or minimum cross-sectional dimension in the x-z plane, for example, a diameter) that is about the same as the cross-sectional dimension of the first projecting portions in the respective plurality 114, 144, for example, less than or equal to 500 μm. In some embodiments, the cross-sectional dimension for the second projecting portions 308, 310 can be greater than 1 μm, for example, in a range of 1-100 μm. In some embodiments, the cross-sectional dimension may represent an average of each of the second projecting portions 308 or each of the second projecting portions 310, with the cross-sectional dimensions of the second projecting portions 308, 310 being within 10% of the respective average.

Figure 3B:
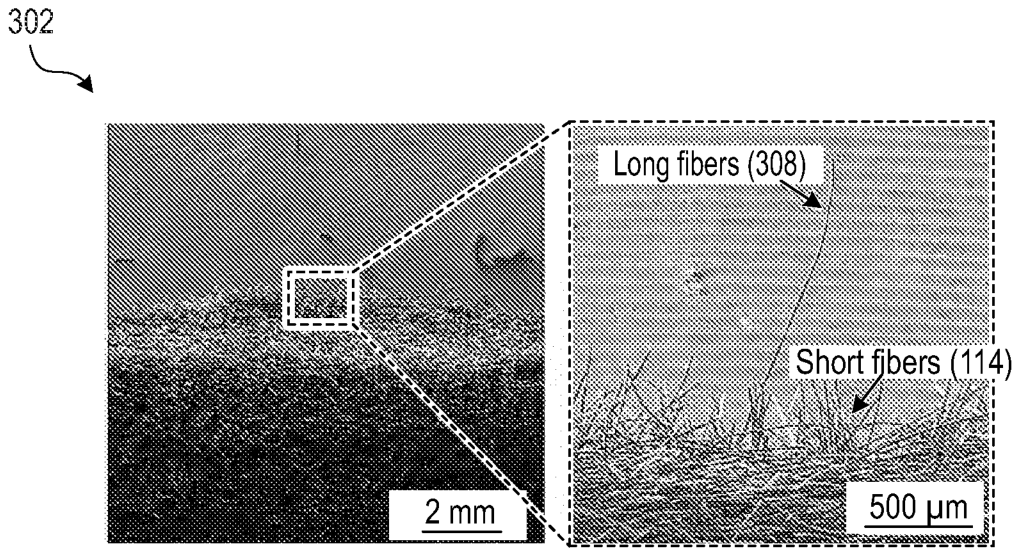
FIG. 3B are SEMS images of a carbon felt electrode with short and long fiber projecting portions, according to one or more embodiments of the disclosed subject matter.

In some embodiments, the second projecting portions 308, 310 extend into and across gap 306 so as to initially contact each other and form high-resistance points of contact and/or to form narrow gap regions 312 (e.g., on the order of the respective cross-sectional dimension, such as ≤5 μm), which can facilitate the initiation of the volumetric plasma at a lower voltage. In some embodiments, the each second projecting portion 308, 310 can extend from the respective base layer 112, 142 by a distance, L, along a thickness direction of the gap 306 (e.g., along the y-direction). In some embodiments, the distance, L, can be greater than or equal to 1 mm, for example, in a range of 10-100 mm. In some embodiments, the distance, L, may represent an average across the respective electrode 302, 304, and the distance that each second projecting portion 308, 310 extends along the gap thickness direction can be within 10% of the average. In some embodiments, each second projecting portion 308, 310 can deviate from being straight along at least part of its length, and/or have a part at angle with respect to a thickness of the gap (e.g., extending in the x-z plane), for example, as shown in FIGS. 3A-3B, in which case the distance, L, represents the distance that the second projecting portion extends along the y-direction. Alternatively or additionally, in some embodiments, each second projecting portion can be substantially straight and extend substantially parallel to a thickness of the gap 306 (e.g., parallel to the y-direction), such that the distance, L, represents the length of the respective second projecting portion.

In some embodiments, the first electrode 302 and the second electrode 304 can be formed of electrically-conductive materials that can withstand the plasma temperature, for example, having melting temperatures (e.g., at atmospheric pressure) that is at least 1000 K. For example, the first electrode 302 and/or the second electrode 304 can be formed of refractory materials (e.g., carbon, refractory metal or alloy, and/or refractory ceramic). In some embodiments, the base layer 112 of the first electrode 302 can be formed of an electrically-conductive material different from that of the plurality 114 of first projecting portions and/or different from that of the second projecting portions 308. Similarly, the base layer 142 of the second electrode 304 can be formed of an electrically-conductive material different from that of the plurality 144 of first projecting portions and/or different from that of the second projecting portions 310. Alternatively, in some embodiments, the base layer 112, the plurality 114 of first projecting portions, and/or the second projecting portions 308 can be formed of a same electrically-conductive material, for example, when fibers form the plurality of first projecting portions 114 (e.g., short fibers), the second projecting portions 308 (e.g., long fibers), and the base layer 112, as shown in FIG. 3B.

Figure 3C:
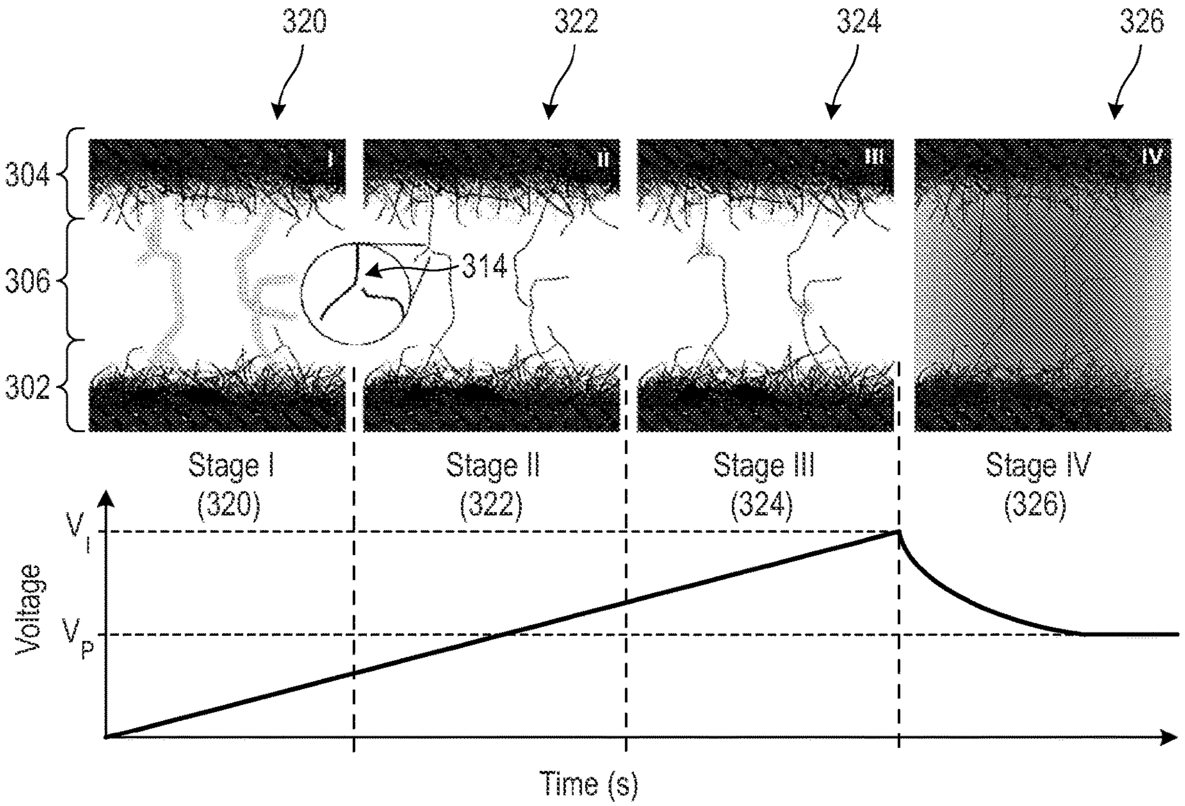
FIG. 3C illustrates aspects of initiating and generating a plasma using short and long fiber projecting portions, according to one or more embodiments of the disclosed subject matter.
Figure 3D:
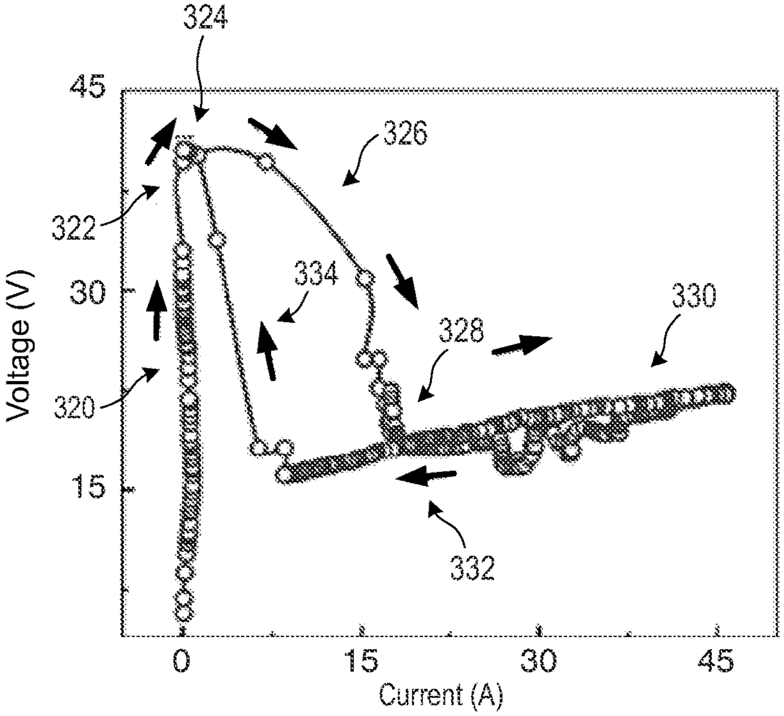
FIG. 3D is a graph showing current-voltage characteristics for initiating and generating a plasma using short and long fiber projecting portions, according to one or more embodiments of the disclosed subject matter.

In some embodiments, the contacting or narrowed gap regions 312 of the second protruding portions 308, 310 can help initiate the volumetric plasma at a lower voltage than would otherwise be possible across gap 306. Once initiated, the volumetric plasma can grow across and be maintained by the plurality 114 of first protruding portions of the first electrode 302 and the plurality 144 of first protruding portions of the second electrode 304. For example, FIGS. 3C-3D illustrate various aspects of plasma initiation and generation in system 300. In an initial stage 320, voltage can be applied across gap 306 via electrodes 302, 304, such that a current flows through the contacting second projecting portions and causes Joule heating thereof. Because of the current flow, the second projecting portions can begin to glow, albeit without any plasma formation. The Joule heating is intensified at defective regions or the contact points of the second projecting portions where the resistance is highest, which consequently generates a locally ultrahigh temperature (e.g., greater than a melting temperature of the second projecting portions, for example, greater than 4000 K) that causes the corresponding parts of the second projecting portions to break.

This self-terminating process generates extremely narrow gaps 314 between the second projecting portions, for example, close to the scale of the diameter of the second projecting portions (~10 μm). Because of the gap formation, current can no longer flow through the second projecting portions, and the gap between the first and second electrodes remains dark despite increasing the voltage in the second stage 322. Further increases of the voltage in the third stage 324 begin to produce gas discharge. In particular, the locally-enhanced electric fields at the tips of the second projecting portions promote second electron emissions that result in spark discharge across the newly formed gaps 314, which in turn helps to initiate the plasma at a low breakdown voltage (e.g., $V_I \leq 100$ V, such as ~40-45 V). Once the plasma is initiated, the plasma can then grow during the fourth stage 326, where the densely-spaced shorter first projecting portions produce tip-enhanced electric fields that merge across the surfaces of the electrodes, accelerate the Townsend breakdown to arc transition, expand the plasma size and volume, and increase the plasma uniformity, unlike conventional arc discharge. This expansion also generates a collective heating effect that helps stabilize the plasma. As the plasma expands, the voltage drops from the breakdown voltage (with a concomitant increase in current) until the plasma reaches its stable volumetric form, corresponding to an applied voltage, $V_P$. By continuing to apply sufficient power (e.g., 400-800 W) between electrodes 302, 304, the volumetric plasma can continue and be stable for at least one minute (e.g., at least 10 minutes), or, in some embodiments, indefinitely depending on the plasma temperature and the materials employed in the system.

Figure 3E:
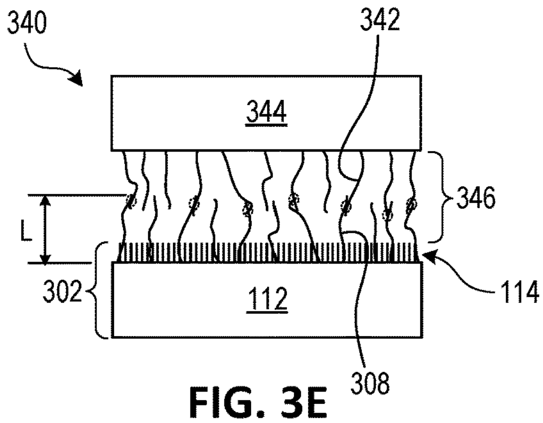
FIGS. 3E-3F are simplified schematic diagrams of systems that use an electrode with short and long projecting portions to generate a volumetric plasma, according to one or more embodiments of the disclosed subject matter.

In the illustrated example of FIG. 3A, the second electrode 304 is provided as a base layer 142 with first and second projecting portions. However, in some embodiments, the second electrode may only have second projecting portions. For example, FIG. 3E shows part of a plasma generation system 340 having a first electrode 302 and a second electrode 344 separated from the first electrode 302 by a gap 346. Similar to the example of FIG. 3A, the first electrode 302 has a plurality 114 of first projecting portions and a plurality of second projecting portions 308. However, the second electrode 344 has only second projecting portions 342, which may have a configuration (e.g., shape, size, spacing, and/or material) that is the same as or different from that of the second projecting portions 308 of the first electrode 302. Operation of the system 340 may otherwise be the same as system 300, for example, as described above with respect to FIGS. 3C-3D.

Figure 3F:
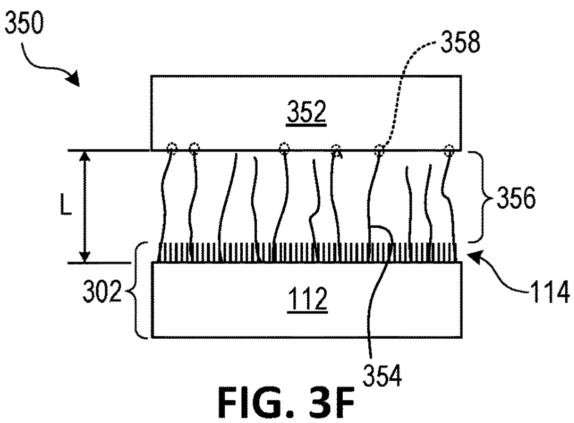

Alternatively, in some embodiments, the second electrode may not have any projecting portions. For example, FIG. 3F shows part of a plasma generation system 350 having a first electrode 302 and a second electrode 352 separated from the first electrode 302 by a gap 356. Similar to the example of FIG. 3A, the first electrode 302 has a plurality 114 of first projecting portions and a plurality of second projecting portions 354. However, the second electrode 352 has no projecting portions. Instead, at least some of the second projecting portions 308 are long enough to extend across the gap 356 so as to initially contact the second electrode 352 and form high-resistance points of contact and/or to form narrow gap regions 358. Operation of the system 350 may otherwise be the same as system 300, for example, as described above with respect to FIGS. 3C-3D. In the illustrated example of FIG. 3F, the second electrode 352 is a bare electrode without any first projecting portions; however, according to one or more contemplated embodiments, it is also possible that the second electrode could have first projecting portions (e.g., similar to the configuration of electrode 134 in FIG. 1B), and the second projecting portions 308 could contact or form narrow gap regions 358 with the first projecting portions of the second electrode.

Figure 3G:
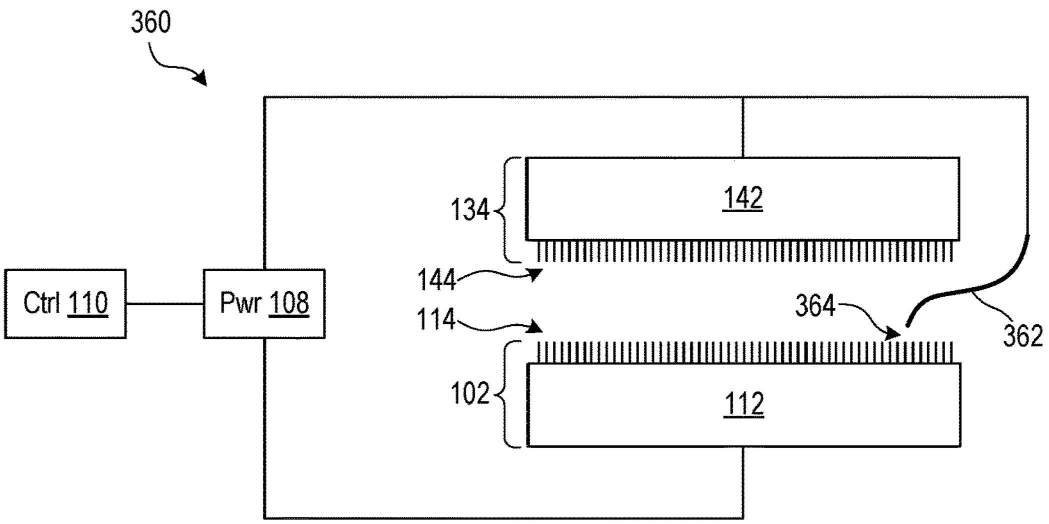
FIG. 3G is a simplified schematic diagram of a system employing an external trigger to initiate a volumetric plasma, according to one or more embodiments of the disclosed subject matter.

Alternatively, in some embodiments, neither the first electrode nor the second electrode may have second projecting portions. Rather, a separate trigger (e.g., wire) can be used to initiate the plasma at a lower voltage than use of the electrodes alone. In some embodiments, after initiating the plasma, the separate member may be consumed by the plasma (e.g., having a melting temperature less than that of the plasma) or removed from the plasma. For example, FIG. 3G shows a plasma generation system 360 that has a first electrode 102, a second electrode 134, a power supply 108, a controller 110, and a trigger member 362 (e.g., wire). The trigger member 362 can be disposed within the gap between electrodes 102, 134, such that a narrower gap 364 (e.g., ≤10 μm) is formed between an end of the trigger member 362 and an end of one of the first projecting portions of the first electrode 102. In operation, gas discharge across the narrower gap 364 can help initiate the plasma at the lower voltage, after which the plasma can expand across the first and second electrodes 102, 134 and fill the gap therebetween.

In the illustrated example of FIG. 3G, the trigger member 362 is arranged to form the narrower gap with respect to a portion of the first electrode 102. Alternatively, in some embodiments, the trigger member 362 can be disposed such that the narrower gap is formed between an end of the trigger member and an end of one of the first projecting portions of the second electrode 134. In the illustrated example, the trigger member 362 forms the narrower gap 364 with one of the first projecting portions. Alternatively, in some embodiments, the narrower gap 364 can be formed with respect to multiple ones of the first projecting portions and/or with respect to different parts of either electrode, for example, longer second projecting portions when provided.

Figure 3H:
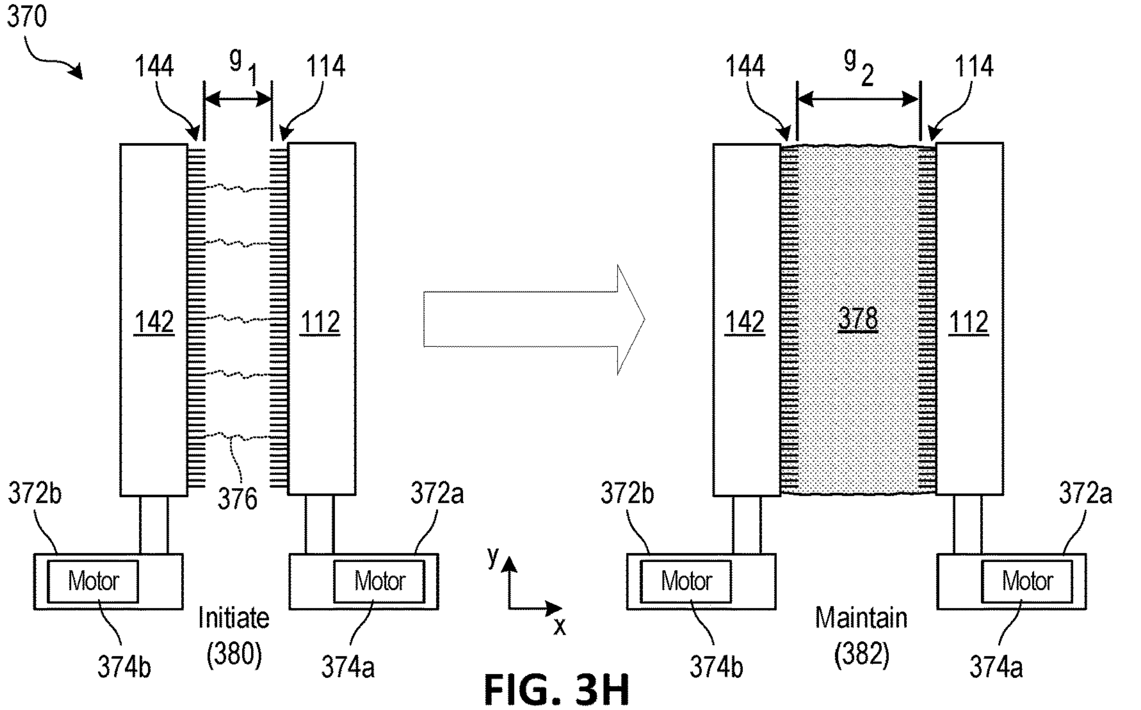
FIG. 3H illustrates aspects of initiating and maintaining a volumetric plasma by changing a distance of a gap between projecting portions of a pair of electrodes, according to one or more embodiments of the disclosed subject matter.

In some embodiments, instead of or in addition to provision of second projecting portions and/or a separate trigger, the thickness of the gap can be changed to facilitate plasma initiation. For example, FIG. 3H illustrates part of a plasma generation system 370 that employs variable gap spacing between first and second electrodes. In the illustrated example, the first electrode has a base layer 112 with a plurality 114 of first projecting portions, and the second electrode has a base layer 142 with a plurality 144 of first projecting portions. However, other configurations for the first electrode and/or the second electrode are also possible according to one or more contemplated embodiments. In the illustrated example, the first electrode is mounted on or supported by a first translation stage 372*a* having a motor 374*a*, and the second electrode is mounted on or supported by a second translation stage 372*b* having a motor 374*b*. The first and second translation stages 372*a*, 372*b* can be configured to move the first and second electrodes toward or away from each other, so as to change a size of the gap therebetween. Other configurations for the first and second translation stages are also possible according to one or more contemplated embodiments, for example, having a translation stage for one of the electrodes while the other remains in a fixed location, mounting both electrodes on a common translation stage, using a translation stage that does not employ a motor, or any other means for varying the size of the gap between the electrodes.

To initiate the plasma, the first electrode (e.g., with base layer 112 and plurality 114 of first projecting portions) and the second electrode (e.g., with base layer 142 and plurality 144 of first projecting portions) can be positioned to form a gap, $g_1$, of a first thickness, as shown at 380. Application of voltage across $g_1$ can generate gas discharge 376 between some of the first projecting portions, which can grow into a volumetric plasma 378 via the rest of the pluralities 114, 144 of the first projecting portions. Once the plasma 378 has been generated, the first and second electrodes can be moved apart to form a gap, $g_2$, of a second thickness greater than that of $g_1$. As the electrodes are moved apart, the power applied to the electrodes can be controlled to maintain the plasma (e.g., by increasing the current and/or voltage) despite the increased size of the gap. Once a desired gap spacing has been achieved as shown at 382, the volumetric plasma 378 can be used for a particular application. In some embodiments, prior to plasm initiation, the voltage can be applied between the electrodes while the electrodes are moving. For example, the voltage can be applied, and the gap between electrodes progressively decreased until the plasma initiates. Once initiated, the gap between electrodes can be maintained or progressively increased until a desired gap thickness is achieved.

Example Configurations for Use of Volumetric Plasma

As noted above, the generated volumetric plasma can be used for materials synthesis or processing or in chemical reactions, among other things. In addition to subjecting materials to controllable high temperature (e.g., in a range of 1000-8000 K), the electromagnetic field changes in the volumetric plasma can yield synergistic effects in the fabrication or catalysis process.

Figure 4A:
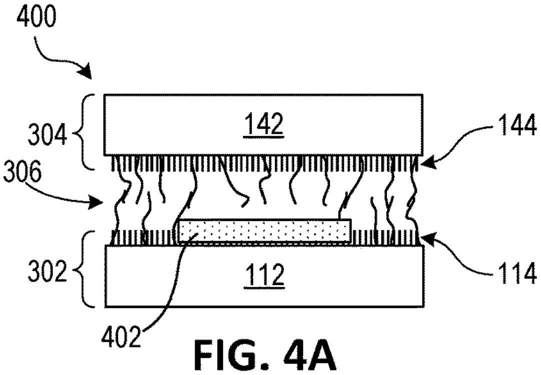
FIG. 4A illustrates aspects of processing a pellet using a generated volumetric plasma, according to one or more embodiments of the disclosed subject matter.
Figure 4B:
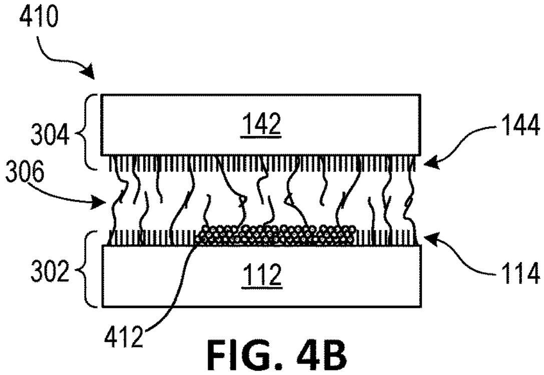
FIG. 4B illustrates aspects of processing one or more precursors using a generated volumetric plasma, according to one or more embodiments of the disclosed subject matter.

For example, FIG. 4A illustrates a plasma system configuration 400 for sintering or otherwise heating a precursor pellet 402 (e.g., having a diameter of at least 10 mm, for example, 15-30 mm) to form a bulk product. Instead of or in addition to pellets, the precursors can be in the form of particles. For example, FIG. 4B illustrates a plasma system configuration 410 for sintering or otherwise heating precursor particles 412 (e.g., powder, nanoparticles, elements or compounds carried by a substrate, etc.) to form particulate products (e.g., powder or nanoparticles). The precursors 402, 412 can be disposed within the gap 306 between the first and second electrodes 302, 304. For example, in some embodiments, the bulk product formed by subjecting the precursor 402 to the volumetric plasma can be a high melting point ceramic (e.g., hafnium carbonitride (Hf—C—N)), a refractory metal, or a refractory alloy (e.g., MoNbTaW alloy). For example, in some embodiments, the particular product formed by subjecting the precursor 412 (e.g., biomass carbon or carbon black) to the volumetric plasma (e.g., a temperature of 5000 K for 10 seconds) can be carbon nanotubes.

In the illustrated examples of FIGS. 4A-4B, the precursors 402, 412 are disposed directly on and supported by part of the plurality 114 of first projecting portions of the first electrode 302. However, in some embodiments, the precursors 402, 412 can be supported within the gap 306, for example, by a separate support member, so as to avoid contacting either of the electrodes 302, 304 or to only contact second projecting portions. In some embodiments, the precursors 402, 412 can be provided within the gap 306 prior to initiation of the volumetric plasma. Alternatively, in some embodiments, the precursors 402, 412 can be introduced into the gap 306 once the volumetric plasma has already been initiated and/or stabilized.

Figure 4C:
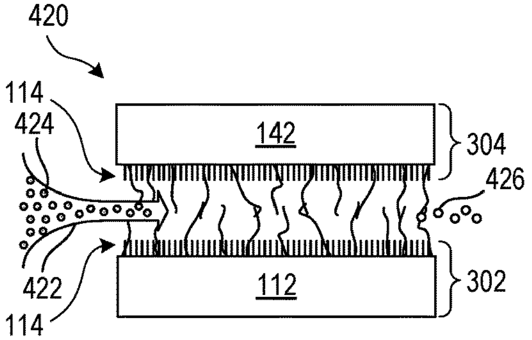
FIG. 4C illustrates aspects of processing one or more precursor particles carried by a gas flow using a generated volumetric plasma, according to one or more embodiments of the disclosed subject matter.

In some embodiments, the system can be configured to convey the precursors through the gap 306 (e.g., along a direction in the x-z plane). For example, FIG. 4C illustrates a flow-through plasma system configuration 420 for sintering or otherwise heating precursor particles 424 (e.g., powder, nanoparticles, elements or compounds carried by a substrate, etc.) to form particulate products 426 (e.g., powder or nanoparticles). The precursors 424 can be carried into and through the gap between the first and second electrodes 302, 304, and/or the products 426 can be carried from the gap by a carrier gas flow 422, for example, an inert gas.

In some embodiments, the flow-through configuration 420 can replace conventional arc discharge techniques in nanopowder synthesis. For example, an argon gas flow can carry the precursors into and through the volumetric plasma, whose temperature can be tailored to yield the desired nanopowder product. Such nanopowder products can include, but are not limited to energy storage materials, such as lithium-ion battery cathode powders (e.g., ternary cathode materials, such as nickel cobalt manganese) and solid electrolyte powders (e.g., lithium lanthanum zirconium oxide). Alternatively or additionally, in some embodiments, the flow-through configuration 420 can be used for supported nanoparticle synthesis. For example, precursors can be pre-dispersed (e.g., coated) on high-surface area substrates (e.g., porous particles) that are carried through the plasma by carrier gas 422. The precursors on the substrates can be converted by the plasma into nanoparticles on the substrates.

In some embodiments, the flow-through configuration of FIG. 4C can replace conventional methods (e.g., sol-gel processing, carbothermic reduction, mechano-chemical synthesis, etc.) in synthesizing an ultra-high temperature ceramic (UHTC) (e.g., having a melting point greater than 3000 K), such as a high entropy (HE) UHTC, for example, HE-carbide, HE-boride, or HE-nitride. For example, precursor powders (e.g., carbon black, boron carbide, and/or $MO_2$ where M refers to a transition metal) can be mixed and flowed through the volumetric plasma at an ultrahigh temperature (e.g., at least 3000 K) via a carrier gas. For HE-UHTCs, the precursor powders can include four or five powder components in substantially equal molar amounts. For example, the HE-UHTC precursor powders can include, but are not limited to, carbides (e.g., hafnium carbide, tantalum carbide, zirconium carbide, niobium carbide, titanium carbide) and nitrides (e.g., hafnium nitride, tantalum nitride, zirconium nitride, niobium nitride, titanium nitride). In some embodiments, the composition of the carrier gas can vary, for example, from pure argon (or other inert gas) to a combination of argon with hydrogen, carbon monoxide, hydrogen, etc., depending on the chemical composition of the target UHTC powder. The reaction temperature can be adjusted via the applied current, gap distance between the electrodes, and/or gas pressure. The pre-mixed feedstock powders can pass through the ultrahigh temperature zone generated by the volumetric plasma, and the resulting powders can be collected after exiting the gap.

In the illustrated example of FIG. 4C, a carrier gas is used to convey the precursors through the gap between electrodes and the plasma therein. However, other means for conveying the precursors is also possible according to one or more contemplated embodiments. In some embodiments, in addition to or in place of the carrier gas flow, gravity can be used to convey the precursors through the plasma, for example, by orientating the thickness direction of the gap at a non-zero angle with respect to gravity (e.g., such that the x-z plane is not perpendicular to gravity). For example, FIG. 4E illustrates a gravity-feed plasma system configuration 440 for sintering or otherwise heating precursor particles 442 (e.g., powder, nanoparticles, elements or compounds carried by a substrate, etc.) to form particulate products 444 (e.g., powder or nanoparticles). In the illustrated example of FIG. 4E, the gap extends substantially parallel to the direction of gravity; however, in some embodiments, the lateral extension of the gap may be at an angle with respect to gravity, for example, as shown by the configuration 450 of FIG. 4F. In either case, gravity can be used to move the precursors 442 into and through the gap between the first and second electrodes 302, 304, and/or the products 444 from the gap.

Figure 4D:
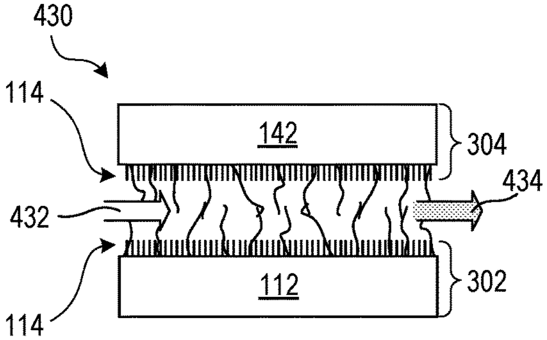
FIG. 4D illustrates aspects of processing a flow of one or more reactants into one or more products using a generated volumetric plasma, according to one or more embodiments of the disclosed subject matter.
Figure 4E:
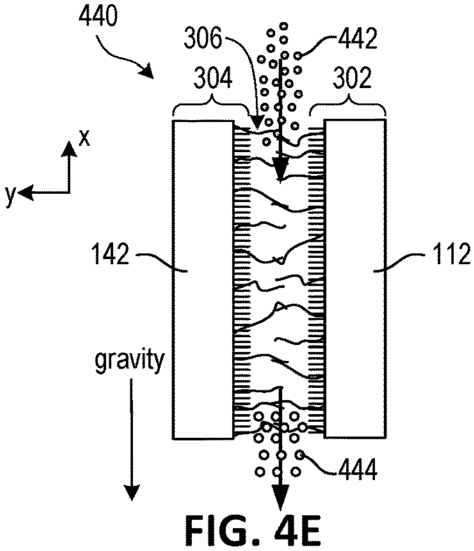
FIGS. 4E-4F illustrate aspects of gravity-driven processing of one or more precursors particles using a generated volumetric plasma, according to one or more embodiments of the disclosed subject matter.
Figure 4F:
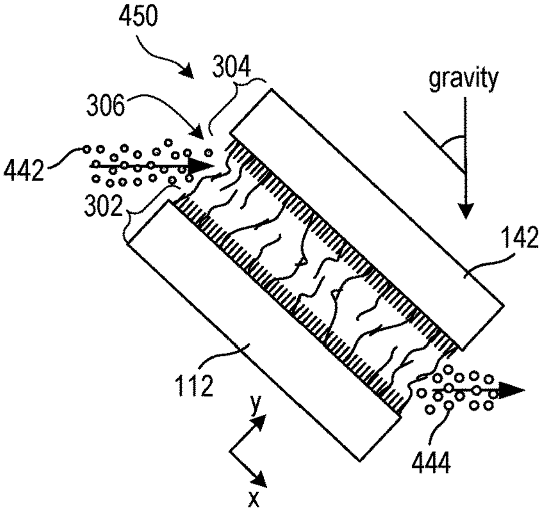

In some embodiments, the gravity-feed configuration of FIG. 4E or FIG. 4F can replace conventional rotating kiln techniques in cement powder synthesis. For example, precursor powders (e.g., limestone, shale, sandstone or clay, and/or iron oxide) can be mixed and conveyed through the volumetric plasma between the electrodes 302, 304. In some embodiments, the use of the high temperature plasma can remove impurities (e.g., fuel combustion residues) that would otherwise occur with conventional processing techniques. Moreover, since the plasma can generate ultrahigh temperatures (e.g., ≥3000 K) that greatly exceed that of conventional rotating kilns (e.g., ~1723 K), cement powders can be formed in a much shorter time that that required by rotating kilns to form large clinkers (e.g., at least 30 minutes). In some embodiments, the limited-time high-temperature exposure offered by the volumetric plasma can selectively convert only the surface of limestones (e.g., to form $3CaO \cdot SiO_2$, $2CaO \cdot SiO_2$, and $3CaO \cdot Al_2O_3$), while the core part of the limestones can still maintain $CaCO_3$ (e.g., to reduce $CO_2$ emissions).

Figure 4G:
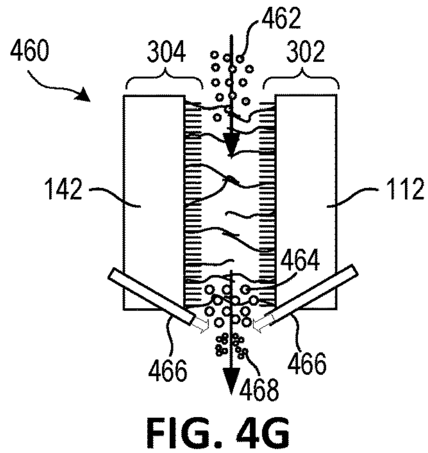
FIG. 4G illustrates aspects of processing one or more precursor particles into a fine powder using a generated volumetric plasma, according to one or more embodiments of the disclosed subject matter.

In some embodiments, the system can include means for adjusting the size of produced particles after exposure to the volumetric plasma. For example, FIG. 4G illustrates a gravity-feed plasma system configuration 460 for sintering or otherwise heating precursor particles 462 (e.g., fine powder or nanoparticles) to form particulate products 464. Similar to the above-described examples, gravity can be used to move the precursors 462 into and through the gap between the first and second electrodes 302, 304, and/or the products 464 from the gap. System configuration 460 further includes gas flow conduits 466 (e.g., jets) that direct and/or focus a gas flow (e.g., inert gas) at the exiting products 464, for example, to break the products 464 (e.g., liquid droplets that have not yet a chance to solidify) into smaller size particles 468 (e.g., atomized).

In some embodiments, the gravity-feed configuration of FIG. 4G can be used to synthesize an atomized refractory high entropy alloy (RHEA) powder from a fine refractory powder feed. For example, the feed stock to the volumetric plasma can include a micro-sized mixed powder of single components of refractory metals. The powder is melted and alloyed as it passes through the ultrahigh-temperature region provided by the volumetric plasma. The molten and alloyed RHEA stream exiting the volumetric plasma is then exposed to a high-velocity gas jet (e.g., argon and/or helium), which breaks the stream into small droplets, whose sizes can be tuned by the gas composition, gas pressure, etc., for example, to meet dimensional requirements for additive manufacturing.

In the above-described examples, the volumetric plasma is used to convert solid precursors into solid products. However, embodiments of the disclosed subject matter are not limited thereto. Rather, the high temperature offered by the volumetric plasma can be used with other phases of matter, for example, to facilitate (e.g., catalyze) chemical reactions of gases, without or with provision of a separate catalyst (e.g., to help guide reaction selectivity). For example, FIG. 4D illustrates a plasma system configuration 430 for gas-phase processing, in which one or more reactant 432 are converted to one or more products 434, in particular, by using the volumetric plasma between electrodes 302, 304 to expose the reactants 432 to a high temperature (e.g., at least 1000 K).

In some embodiments, the gas-phase processing configuration of FIG. 4D can be used to provide $CO_2$ reduction, for example, to recycle $CO_2$ from the waste exhaust of a combustion product. For example, a mixture of $CO_2$ and water vapor ($H_2O$) can be heated by the volumetric plasma to convert the mixture into a hydrocarbon fuel, such as methane or acetaldehyde. In some embodiments, the gas-phase processing configuration of FIG. 4D can be used to synthesize ammonia ($NH_3$). For example, a mixture of nitrogen ($N_2$) and hydrogen ($H_2$) can be heated by the volumetric plasma to convert the mixture into ammonia. Alternatively, in some embodiments, the gas-phase processing configuration of FIG. 4D can be used to decompose ammonia, for example, to form nitrogen and hydrogen. Other synthesis and/or decomposition reactions are also possible according to one or more contemplated embodiments.

Figure 4H:
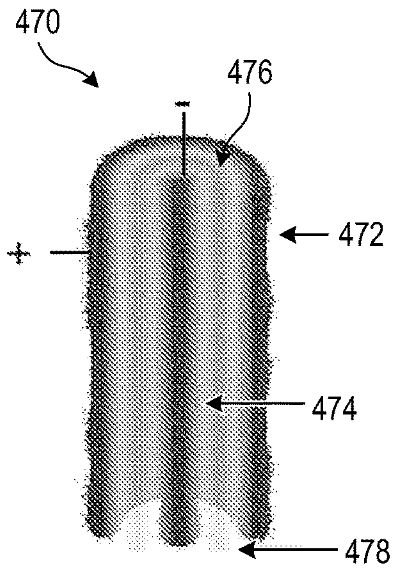
FIGS. 4H-4I are perspective cross-sectional and plan views, respectively, of a coaxial electrode configuration for generating a volumetric plasma, according to one or more embodiments of the disclosed subject matter.
Figure 4I:
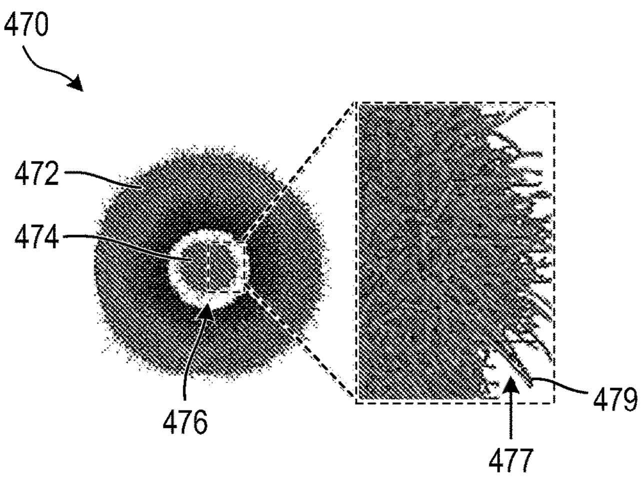

In the above-described examples, the electrodes and the gap therebetween have a generally planar geometry. However, other shapes and configurations are also possible according to one or more contemplated embodiments. Indeed, in addition to being a facile method of generating a stable and large-area plasma, the embodiments of the disclosed subject matter are scalable and readily adaptable to different manufacturing needs. In some embodiments, the electrodes can be arranged in a co-axial structure, and the resulting gap can be non-planar. For example, FIGS. 4H-4I shows a coaxial plasma system configuration 470 that has an inner rod-shaped electrode 474 disposed in and coaxial with an outer annular-shaped electrode 472 (e.g., tube), thereby forming an annular-shaped gap 476 therebetween. In the illustrated example, the plurality 477 of projecting portions 479 covers the surfaces of both electrodes 472, 474, which can form a long, volumetric plasma channel. Because of the relatively-closed environment (e.g., with the gap being encircled by the outer electrode except at opposite axial ends), the configuration may be especially useful for gas-phase reactions, alloying refractory metals, and/or various atomization processes, for example, where feed stock enters the gap 476 at one axial end and passes through the plasma channel to subject the materials to heating and/or the plasma's field effect, and the resulting products exit the gap 476 at an opposite axial end 478.

Figure 4J:
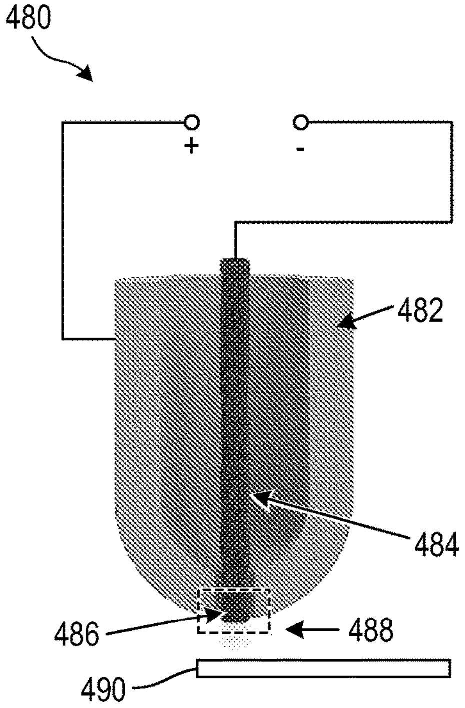
FIGS. 4J-4K are cross-sectional and plan views, respectively, of another coaxial electrode configuration for generating a focused volumetric plasma, according to one or more embodiments of the disclosed subject matter.
Figure 4K:
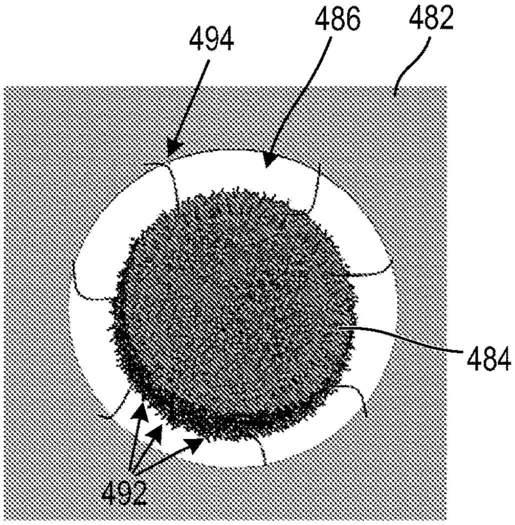

Alternatively or additionally, in some embodiments, the electrodes can be configured to restrict the generated plasma to a small region, for example, to form a focused heating zone. For example, FIGS. 4J-4K show another coaxial plasma system configuration 480, but with a focused heating zone 488. In the illustrated example, the system configuration 480 includes an inner rod-shaped electrode 484 (e.g., carbon felt rod) disposed in and coaxial with an outer electrode 482 (e.g., graphite shell). The electrodes 482, 484 form a narrow annular gap 486 proximal to the focused heating zone 488, while away from the heating zone the spacing (e.g., along the radial direction) between the electrodes is sufficiently large, such that plasma is only formed proximal to the heating zone 488. Such a configuration may help increase machining precision of the generated plasma, for example, to use in additive manufacturing (3D printing on substrate 490). In the illustrated example, a plurality of first projecting portions 492 (e.g., short carbon fibers) and a plurality of second projecting portions 494 (e.g., long carbon fibers) extend from cover surfaces of the inner electrode 484, while the outer electrode 482 presents only a bare surface without any projecting portions. At least some of the second projecting portions 494 can contact the outer electrode 482, for example, to help initiate plasma formation.

In any of the disclosed examples, the systems can provide rapid cooling (e.g., at least $10^2$ K/s) in addition to subjecting the ultrahigh temperature via the volumetric plasma. In some embodiments, cooling can be provided by turning off the volumetric plasma, for example, by providing to the electrodes no electrical power or at least an electrical power level insufficient to support plasma generation. Alternatively or additionally, cooling can be provided by moving the materials out of the volumetric plasma, for example, by conveying the materials from within the gap between the electrodes to outside the gap using a carrier gas flow or gravity. Alternatively or additionally, cooling can be provided by moving the volumetric plasma away from the materials, for example, by displacing one or both of the electrodes with respect to the materials and/or by using a magnetic field to change a location of the generated plasma. Alternatively or additionally, an active cooling modality can be used, such as but not limited to a directed air flow, heat exchanger, heat pump, and thermoelectric module. Other cooling techniques and modalities are also possible according to one or more contemplated embodiments.

Supported Electrode Examples

Figure 5A:
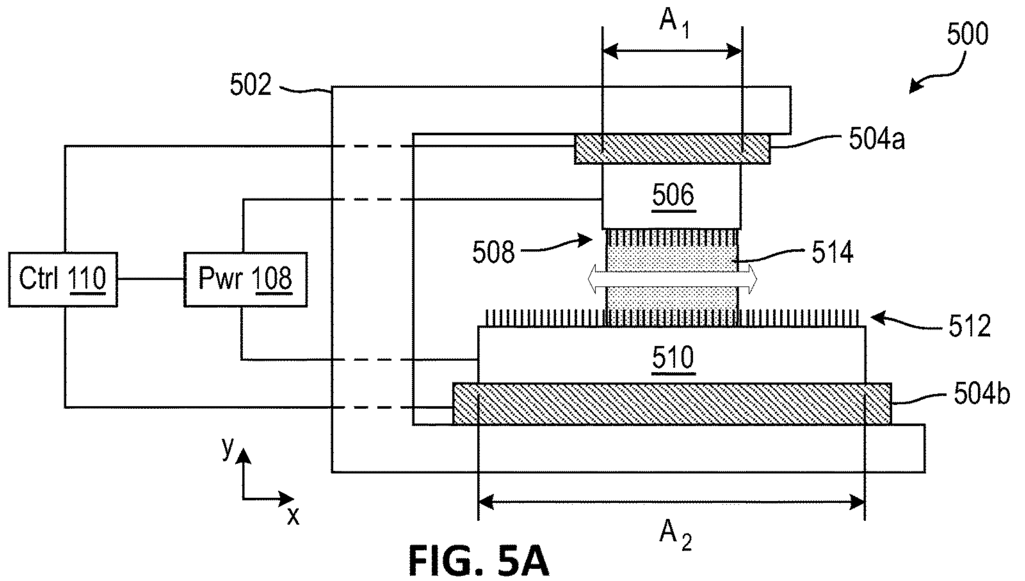
FIG. 5A is a simplified schematic diagram of a system for generating and scanning a volumetric plasma, according to one or more embodiments of the disclosed subject matter.

In some embodiments, one or both of the electrodes can be supported in such a manner so as to be movable with respect to the other, for example, to allow processing of a sample with dimensions larger than that of the volumetric plasma. In such embodiments (or in any other embodiment), one of the electrodes can have an area (e.g., of a surface facing the gap) that is less than the area (e.g., of a surface facing the gap) of the other electrode. In some embodiments, the smaller supported electrode can be moved with respect to the larger electrode, for example, to move a localized heating zone provided by the generated plasma across the surface of the larger electrode. For example, FIG. 5A shows a movably-supported plasma generation system 500 that can provide a volumetric plasma 514 at different locations. In the illustrated example, the system 500 includes first and second electrodes, first and second translation stages 504_a_, 504_b_, a frame 502 supporting the first and second translation stages, an electrical power supply 108, and a controller 110. The first electrode can have a first base layer 506 with a plurality 508 of projecting portions extending therefrom, and the second electrode can have a second base layer 510 with its own plurality 512 of projecting portions therefrom. In the illustrated example, the first base layer 506 can have an area, $A_1$ (e.g., in the x-z plane), less than the area, $A_2$ (e.g., in the x-z plane) of the second base layer 510, and the pluralities 508, 512 of projecting portions can cover the respective areas.

The translation stages 504_a_, 504_b_ can be mechanically coupled to the respective base layer 506, 510 and configured to move the respective electrode in at least one dimension, for example, two dimensions (e.g., along the x-z plane). In operation, the translation stages 504_a_, 504_b_ can thus move the electrodes with respect to each other so as to change a location of the generated volumetric plasma 514, for example, to scan a heating zone produced by the plasma across a surface of a sample on the base layer 510. Alternatively, in some embodiments, only one translation stage may be provided for moving an electrode coupled thereto, while the other electrode remains substantially stationary (e.g., supported in position by the frame 502). In some embodiments, one or both of the translation stages 504*a*, 504*b* can be configured to move the respective electrode along the y-direction and/or to move in three-dimensions, for example, to allow a size of the gap between electrodes to be changed.

Figure 5B:
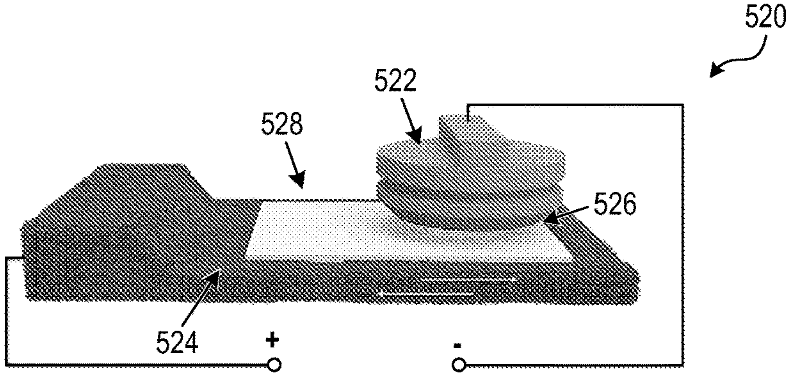
FIG. 5B is a simplified perspective view of a power bed fusion/sintering system employing a volumetric plasma, according to one or more embodiments of the disclosed subject matter.

In some embodiments, moving the volumetric plasma by moving one or both of the electrodes with respect to the other can be used for additive manufacturing, for example, to achieve powder bed fusion or sintering. For example, FIG. 5B illustrates a configuration of a plasma system 520 for additive manufacturing. The system 520 includes a supported electrode head 522 (e.g., with a 10-mm diameter carbon felt disk) and a base electrode strip 524. A powder bed 528 can be provided on and supported by base electrode strip 524. In some embodiments, the powder bed 528 comprises an electrically-conductive material, for example, a pre-pressed sample pellet derived from multi-elemental metal powders. By applying a voltage between the supported electrode head 522 and the base electrode strip 524, a plasma beam 526 (e.g., having a column radius of ~1 mm) can be generated. Either or both of the supported electrode head 522 and the base electrode strip 524 can be moved with respect to the other (e.g., using a motorized platform) so as to scan the plasma 526 across the powder bed 528.

Figure 5C:
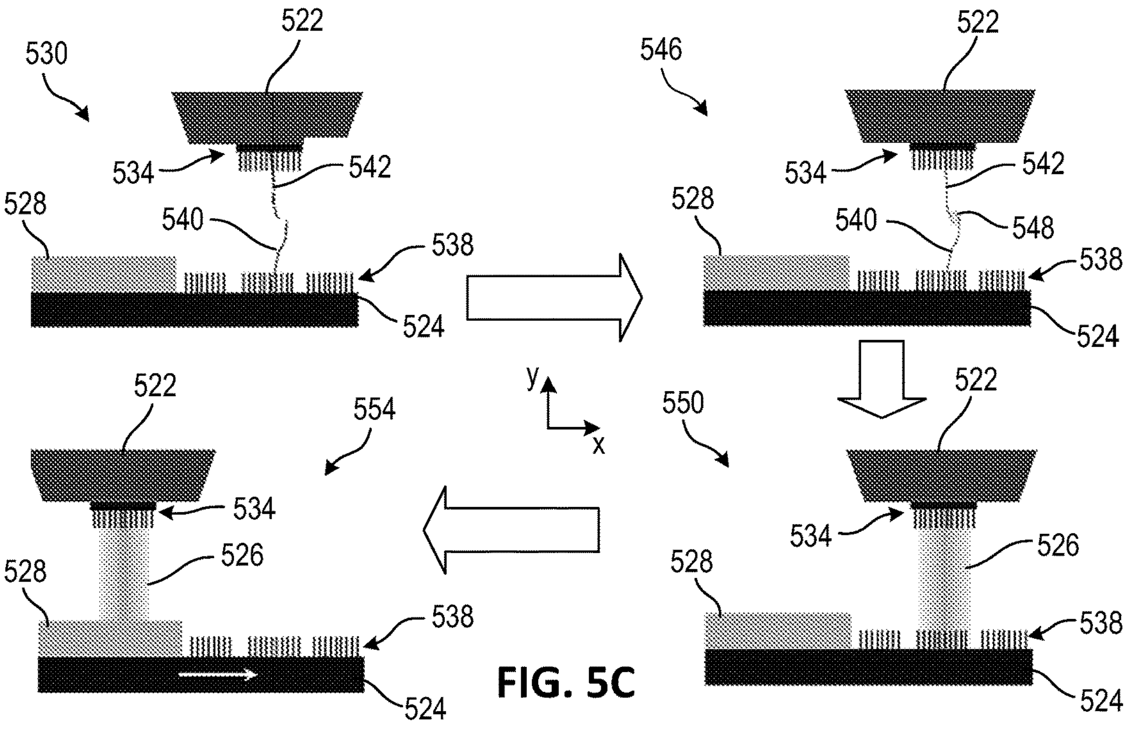
FIG. 5C is a simplified schematic diagram illustrating aspects of a plasma sintering/fusion process using a focused volumetric plasma beam, according to one or more embodiments of the disclosed subject matter.

More details of the operation of system 520 are shown in FIG. 5C. At an initial positioning stage 530, the supported electrode head 522 is moved over a portion of the base electrode strip 524 exposed from the powder bed 528, such that the array 534 of first projecting portions and the array 538 of first projecting portions of the electrodes face each other. In the illustrated example, the electrodes also have respective second projecting portions 540, 542, which may come into contact 548, or at least be narrowly spaced from each other, at positioning stage 530. The voltage between electrodes is then increased during the plasma initiation stage 546 to cause gas discharge, for example, between second projecting portions 540, 542, which discharge then spreads and stabilizes into the columnar plasma 526 with the aid of the first projecting portions 534, 538 in the plasma stabilization stage 550. Once the columnar plasma 526 is formed, one or both of the electrode can be moved with respect to the other so as to position a portion of the powder bed 528 within the plasma 526. During sintering stage 554, the plasma 526 can be moved across the surface of the powder bed 528 to sinter or fuse different portions thereof.

Figure 5D:
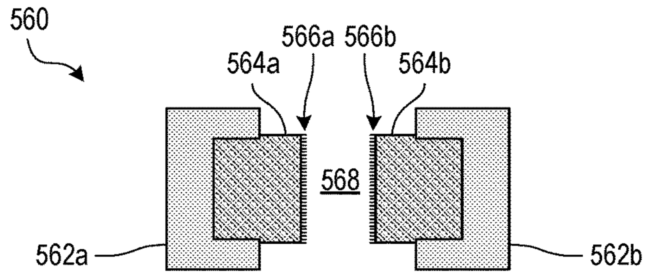
FIGS. 5D-5E are plan and side views, respectively, of a supported electrode configuration for generating a volumetric plasma, according to one or more embodiments of the disclosed subject matter.
Figure 5E:
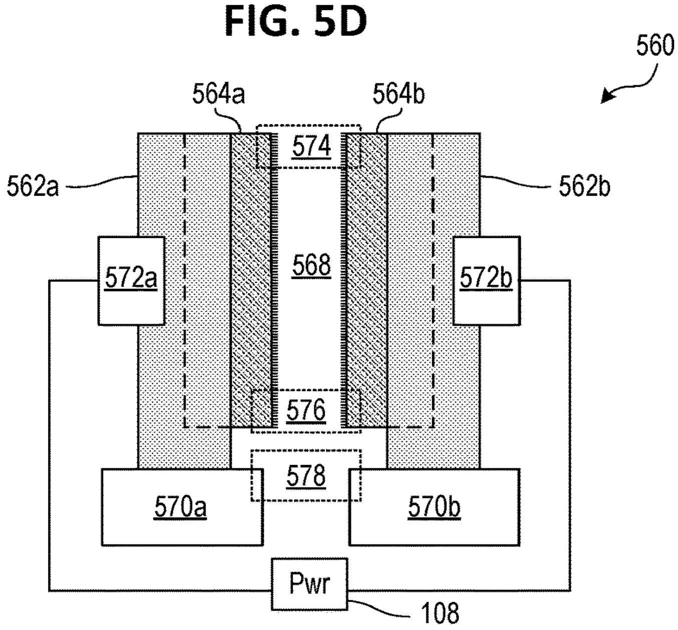

In some embodiments, the supported electrode configuration can comprise one or more holders to hold, shape, increase a mechanical strength or rigidity, and/or make an electrical connection to the electrode, for example, when the electrode is formed of a cloth or felt. For example, FIGS. 5D-5E illustrate a supported electrode configuration 560 where electrodes 564*a*, 564*b* are spaced apart from each other by a gap 568. Surface portions of each of the electrodes 564*a*, 564*b* facing the gap 568 can have respective pluralities 566*a*, 566*b* of projecting portions, similar to examples described above. A part of electrode 564*a* opposite the gap 568 can be inserted into and retained by an electrode holder 562*a*, and a part of electrode 564*b* opposite the gap 568 can be inserted into and retained by an electrode holder 562*b*. The electrode holders 562*a*, 562*b* can be electrically coupled to power supply 108 via respective electrical coupling members 572*a*, 572*b* (e.g., clamps that secure to an external surface of the holders).

In some embodiments, the holders 562*a*, 562*b* and the electrodes 564*a*, 564*b* can be formed of electrically conductive materials having a melting temperature greater than or equal to 1000 K. Alternatively, in some embodiments, the electrodes 564*a*, 564*b* can be formed of electrically conductive materials having a melting temperature greater than or equal to 1000 K, and the holders 562*a*, 562*b* can be formed of electrically-conductive materials having a melting temperature less than 1000 K. Power from power supply 108 can be provided to the electrodes 564*a*, 564*b* to generate the plasma within gap 568 via the electrode holders 562*a*, 562*b* and the respective coupling members 572*a*, 572*b*. In the illustrated example, each electrode holder 562*a*, 562*b* is a U-shaped member, although other shapes are also possible according to one or more contemplated embodiments. In some embodiments, the electrodes 564*a*, 564*b* can be formed of a flexible or fluffy material, for example, carbon felt or carbon cloth, and the electrode holders 562*a*, 562*b* can be formed of a more rigid material, for example, machined graphite, 3D-printed carbon, refractory metal, etc.

In the illustrated example, each electrode holder 562*a*, 562*b* is also provided with a respective base member 570*a*, 570*b*. In some embodiments, the base member 570*a*, 570*b* (e.g., feet) can be formed of an electrically-insulating material (e.g., ceramic) and can be constructed to support the electrode holders (and the electrodes thereon) in a substantially vertical orientation (e.g., gravity feed configuration). In such embodiments, a region 574 on an opposite side of the gap 568 from the base members 570*a*, 570*b* may be considered an input region (e.g., for supply of precursors, reactants, or other material to be processed by the plasma), and a region 576 on a same side of the gap 568 as the base members 570*a*, 570*b* may be considered an output region (e.g., where products or processed materials leave the plasma). In some embodiments, one or more components can be provided within a capture zone 578 below or adjacent to the output region 576 to capture the exiting products or processed materials.

Other configurations are also possible according to one or more contemplated embodiments. For example, in some embodiments, the input and output regions can be on opposite sides of gap 568 in the plan view of FIG. 5D rather than opposite sides of gap 568 in the elevation view of FIG. 5E. Alternatively or additionally, in some embodiments, the input and output regions can be the same region, for example, with materials leaving the gap 568 along the same direction and through the same end via which they entered. Alternatively or additionally, in some embodiments, the output region can be along a direction orthogonal to the input region (e.g., with input provided at a top side of the gap 568, and output exiting the gap 568 via lateral sides instead of (or in addition to) the bottom side of the gap 568).

Figure 5F:
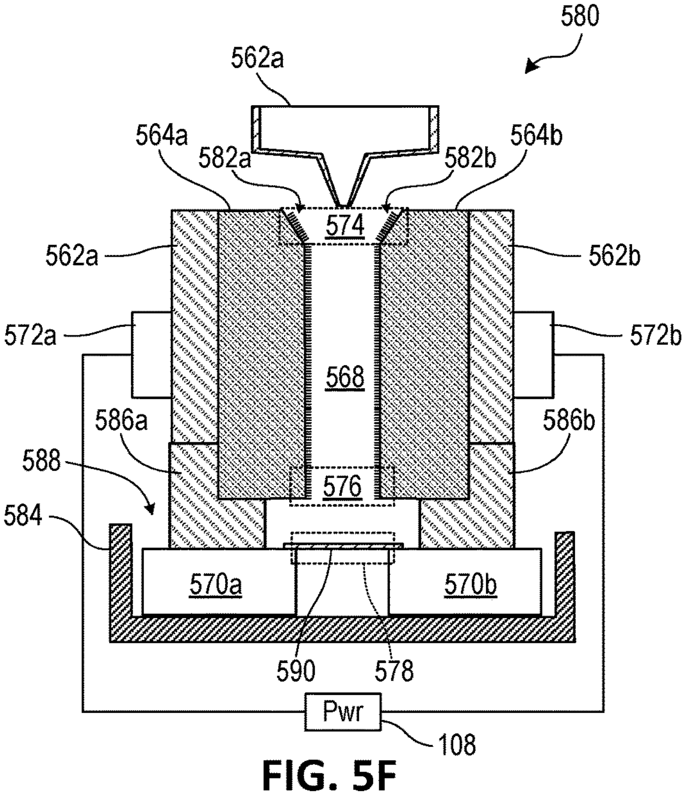
FIG. 5F is a simplified cross-sectional view of a volumetric plasma system employing a supported electrode configuration, according to one or more embodiments of the disclosed subject matter.

FIG. 5F shows additional aspects of a plasma generation system 580 employing electrode holders 562*a*, 562*b*, for example, to process precursors or particles delivered from an input hopper 592. In the illustrated example, the electrode holders 562*a*, 562*b* can have thickened bottom portions 586*a*, 586*b*, for example, to help increase stability and/or rigidity of the standing holders. The base members 570*a*, 570*b* of the electrode holders 562*a*, 562*b* can also be disposed within a recess 588 of an insulating holder 584 (e.g. formed of plastic or ceramic), for example, to help retain the holders in a standing orientation. In some embodiments, the inlet region 574 can have a different profile than the rest of the gap 568, for example, for delivery of particles/reactants to the plasma and/or to avoid forming the plasma therein. For example, the electrodes 564*a*, 564*b* can include respective slanted surface portions 582*a*, 582*b* so as to form a tapered inlet region. Alternatively or additionally, in some embodiments, a collection member 590 (e.g. substrate or hopper) can be supported on the base members 570*a*, 570*b* and disposed within the capture zone 578, for example, to collect the processed materials leaving the gap 568 and the plasma therein.

Example Methods for Generation and Use of Volumetric Plasma

Figure 6A:
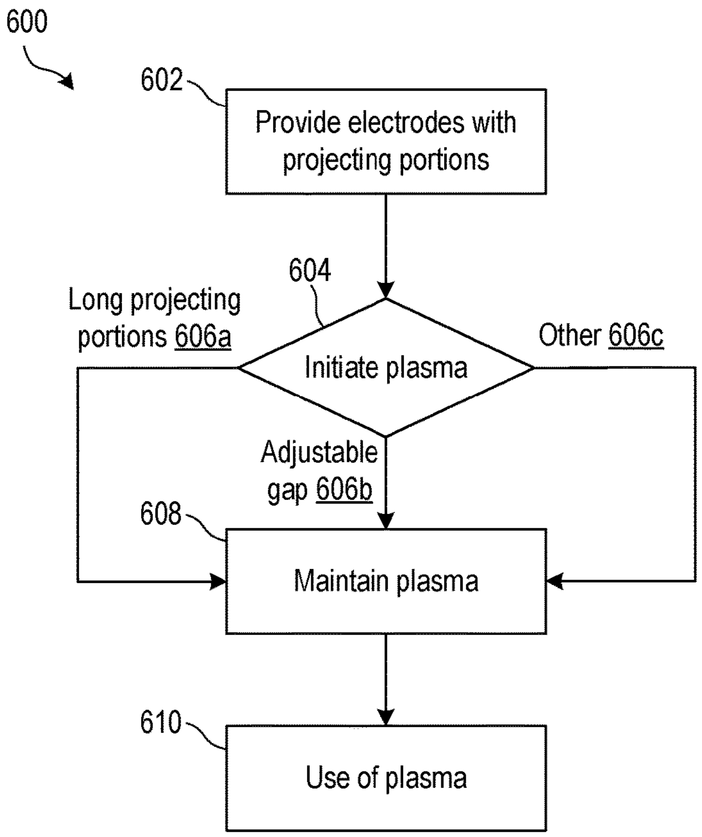
FIG. 6A is a simplified process flow diagram for a method of generating and using a volumetric plasma, according to one or more embodiments of the disclosed subject matter.

FIG. 6A illustrates aspects of a method 600 for generating and using a volumetric plasma. The method 600 can initiate a process block 602, where a pair of electrodes can be provided. In some embodiments, one or both of the provided electrodes can have a plurality of short projecting portions, for example, any of the first projecting portions discussed herein with respect to any of FIGS. 1A-5F. In some embodiments, one or both of the provided electrodes can have at least one long projecting portion, for example, any of the second projecting portions discussed herein with respect to any of FIGS. 3A-3F and 4A-5F. In some embodiments, the provision of process block 602 can include fabricating the electrodes or portions thereof, for example, forming the short and/or long projecting portions. For example, the short and/or long projecting portions can be fabricated via three-dimensional printing (e.g., laser-based direct energy deposition or laser powder-bed fusion). Alternatively or additionally, in some embodiments, the short and/or long projecting portions can be fabricated by cutting of a cloth or felt, for example, formed of a refractory material (e.g., carbon, refractory metal, or refractory metal alloy). Alternatively or additionally, in some embodiments, the short and/or long projecting portions can be fabricated by abrading or roughening a surface of a refractory material (e.g., cloth or felt).

The method 600 can proceed to decision block 604, where a plasma can be initiated between the electrodes. In some embodiments, when long projecting portions are provided on one or both electrodes, the plasma can be initiated via option 606*a*, where the long projecting portions are subjected to Joule heating to generate narrow gaps therebetween, and then spark discharge occurs between the narrow gaps. For example, the use of long projecting portions to initiate plasma via option 606*a* can be similar to that discussed herein with respect to any of FIGS. 3A-3F. Alternatively or additionally, in some embodiments, the plasma can be initiated via option 606*b*, where the thickness of the gap can be reduced to allow spark discharge between the electrodes, for example, the short projecting portions. For example, the use of a reduced gap thickness to initiate the plasma via option 606*b* can be similar to that discussed herein with respect to any of FIGS. 3H and 5A-5C. Alternatively or additionally, in some embodiments, the plasma can be initiated via any other technique 606*c*, such as but not limited to applying a higher breakdown voltage, changing a gas pressure, and/or using a separate trigger (e.g., as discussed herein with respect to FIG. 3G).

The method 600 can proceed to process block 608, where the volumetric plasma can be maintained. In some embodiments, process block 608 can include growing the initiated plasma across the surface of the electrodes, for example, via the short projecting portions, to form the volumetric plasma. In some embodiments, the volumetric plasma can be substantially spatially uniform and/or temporarily stable. In some embodiments, process block 608 can include applying a DC voltage, an AC voltage (e.g., RF), or pulsed voltage waveform (e.g., square wave) of sufficient power to the electrodes so as to retain the plasma between the electrodes. In some embodiments, a plasma temperature and/or temperature profile of the volumetric plasma can be substantially constant for at least one minute, for example, at least ten minutes. In some embodiments, the maintaining of process block 608 can include varying power applied to the electrodes, changing a thickness of the gap between electrodes, and/or changing a gas pressure between the electrodes, for example, to change the plasma temperature. Alternatively or additionally, the maintaining of process block 608 can include moving the volumetric plasma, for example, to expose a material to the plasma (e.g., as discussed herein with respect to any of FIGS. 5A-5C).

The method 600 can proceed to block 610, where the volumetric plasma can be used, for example, in a manner similar to that discussed herein with respect to any of FIGS. 4A-4K and 9A-11. For example, the volumetric plasma can be used to heat a material, such as but not limited to sintering a pellet to form a bulk material, heating stationary or flow-through particles to form alloys, cement, or ceramics (e.g., nanopowders or supported nanoparticles), heating stationary or flow-through particles to form other particles (e.g., carbon nanotubes), heating stationary or flow-through particles to form surface layers (e.g., powder bed fusion), facilitating thermochemical reactions (e.g., chemical synthesis or degradation, with or without a catalyst), performing low-temperature sterilization, or for any other purpose.

Although blocks 602-610 of method 600 have been described as being performed once, in some embodiments, multiple repetitions of a particular process block may be employed before proceeding to the next decision block or process block. In addition, although blocks 602-610 of method 600 have been separately illustrated and described, in some embodiments, process blocks may be combined and performed together (simultaneously or sequentially). Moreover, although FIG. 6A illustrates a particular order for blocks 602-610, embodiments of the disclosed subject matter are not limited thereto. Indeed, in certain embodiments, the blocks may occur in a different order than illustrated or simultaneously with other blocks. In some embodiments, method 600 can include steps or other aspects not specifically illustrated in FIG. 6A. Alternatively or additionally, in some embodiments, method 600 may comprise only some of blocks 602-610 of FIG. 6A.

Computer Implementation Examples

Figure 6B:
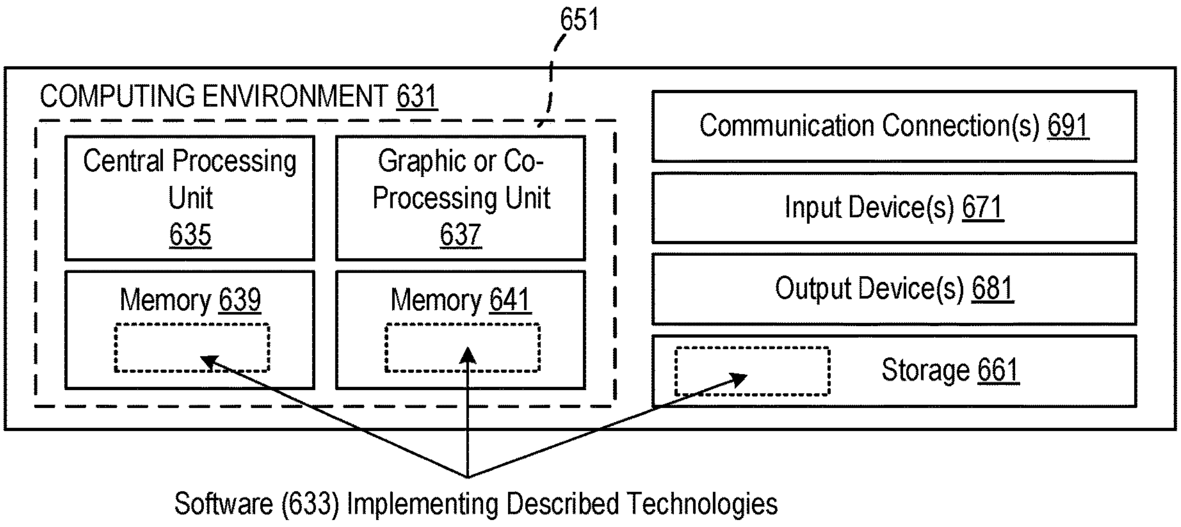
FIG. 6B depicts a generalized example of a computing environment in which the disclosed technologies may be implemented.

FIG. 6B depicts a generalized example of a suitable computing environment 631 in which the described innovations may be implemented, such as but not limited to aspects of power supply 108, controller 110, control system 124, controllers of translation stages 372, and/or method 600. The computing environment 631 is not intended to suggest any limitation as to scope of use or functionality, as the innovations may be implemented in diverse general-purpose or special-purpose computing systems. For example, the computing environment 631 can be any of a variety of computing devices (e.g., desktop computer, laptop computer, server computer, tablet computer, etc.).

With reference to FIG. 6B, the computing environment 631 includes one or more processing units 635, 637 and memory 639, 641. In FIG. 6B, this basic configuration 651 is included within a dashed line. The processing units 635, 637 execute computer-executable instructions. A processing unit can be a central processing unit (CPU), processor in an application-specific integrated circuit (ASIC), or any other type of processor (e.g., hardware processors, graphics processing units (GPUs), virtual processors, etc.). In a multi-processing system, multiple processing units execute computer-executable instructions to increase processing power. For example, FIG. 6B shows a central processing unit 635 as well as a graphics processing unit or co-processing unit 637. The tangible memory 639, 641 may be volatile memory (e.g., registers, cache, RAM), non-volatile memory (e.g., ROM, EEPROM, flash memory, etc.), or some combination of the two, accessible by the processing unit(s). The memory 639, 641 stores software 633 implementing one or more innovations described herein, in the form of computer-executable instructions suitable for execution by the processing unit(s).

A computing system may have additional features. For example, the computing environment 631 includes storage 661, one or more input devices 671, one or more output devices 681, and one or more communication connections 691. An interconnection mechanism (not shown) such as a bus, controller, or network interconnects the components of the computing environment 631. Typically, operating system software (not shown) provides an operating environment for other software executing in the computing environment 631, and coordinates activities of the components of the computing environment 631.

The tangible storage 661 may be removable or non-removable, and includes magnetic disks, magnetic tapes or cassettes, CD-ROMs, DVDs, or any other medium which can be used to store information in a non-transitory way, and which can be accessed within the computing environment 631. The storage 661 can store instructions for the software 633 implementing one or more innovations described herein.

The input device(s) 671 may be a touch input device such as a keyboard, mouse, pen, or trackball, a voice input device, a scanning device, or another device that provides input to the computing environment 631. The output device(s) 681 may be a display, printer, speaker, CD-writer, or another device that provides output from computing environment 631.

The communication connection(s) 691 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or any other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java™, Python®, and/or any other suitable computer language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Fabricated Examples and Experimental Results

Figure 7A:
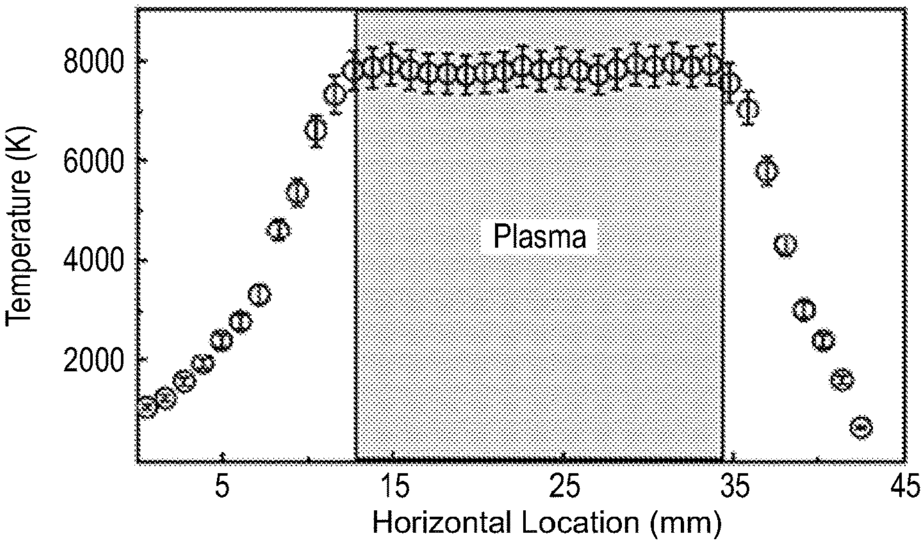
FIG. 7A is graph showing the measured temperature profile of plasma generated using carbon felt electrodes.
Figure 7B:
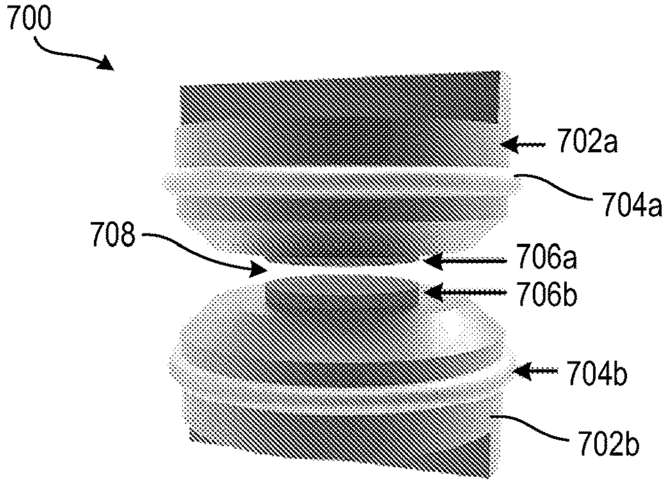
FIG. 7B is an image of an experimental setup employing carbon felt electrodes to generate a volumetric plasma.
Figure 7C:
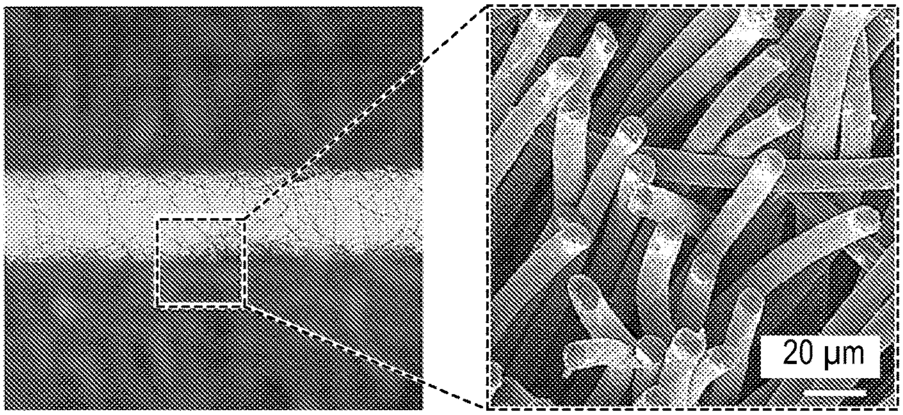
FIG. 7C shows an image of the pair of carbon felt electrodes with short and long fibers, as well as an SEM image of the short fibers on one of the carbon felt electrodes.
Figure 7D:
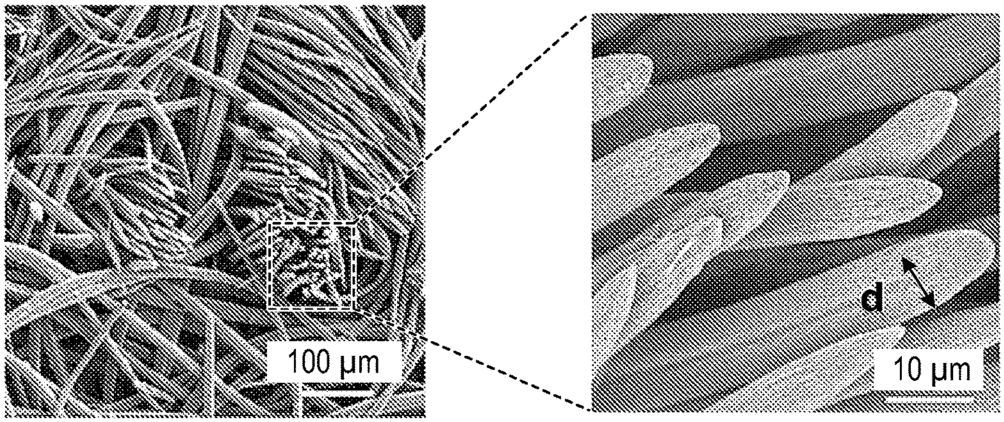
FIG. 7D shows SEM images of the short fibers on a carbon felt electrode after plasma generation.

The plasma generation setup 700 was composed of two carbon felt electrodes **706*a*, 706*b* connected to graphite holder 702*a*, 702*b*, as shown in FIG. 7B. To fabricate the electrodes, a piece of carbon felt with dimensions of 50 mm×150 mm×6.5 mm was punched into disks of 25.4 mm in diameter, then cut ~1 mm away from the felt surface using a razor blade, thereby cutting the carbon fibers that composed the felt and producing vertically-oriented carbon fiber tips. Two pieces of circular graphite blocks with dimensions of 50 mm×50 mm×25 mm were fabricated with a computer numerical control (CNC) machine to provide the holders for the carbon felt electrodes. The graphite holders 702*a*, 702*b* were connected to the positive and negative tabs of a programmable power supply via copper wires 704*a*, 704*b*. The gap 708 between the two electrodes 706*a*, 706*b* was set at ~3 mm, but can be adjusted for different applications. The full electrode setup 700** was housed in a glovebox filled with pure argon gas at atmospheric pressure. In this setup, multiple long carbon fibers (loosened by the electrode cutting process) extend from the carbon felt surfaces and form contacts between the two electrodes, as shown in FIG. 7C. In addition, cutting the carbon felt produces an electrode surface that features a high density of shorter, vertically-oriented carbon fibers with blunt tips that are separated by uncut, horizontally-aligned fibers, with an inter-bundle distance of ~200 μm, as shown in FIGS. 7C-7D. The carbon fiber tips feature diameters of ~10 μm, which is much smaller than the micron-to-centimeter scale of the metal pin electrodes conventionally used to generate arc plasmas.

To initiate the plasma, the voltage was gradually increased between the electrodes 706*a*, 706*b* (e.g., up to ~33 V). The longer fibers that contact each other generated strong Joule heating, which caused the fibers to glow. The defective regions or the contacts between the fibers have a higher resistance than the fibers themselves, which leads to localized heating at the fiber junctures. At a higher current, the excessive Joule heating created an ultra-high temperature that breaks the fibers and forms small gaps between the long fibers, opening the circuit. These small gaps (e.g., ~several micrometers) pronouncedly reduce the gas breakdown voltage (e.g., ~42 V) and increase the plasma uniformity via the enhanced electric field and the increased $2^{nd}$ electron emission at the fiber tips. Once the sparks are formed and initiate the plasma, the gas discharge expands between the electrodes, which can be attributed to the array of shorter, vertically-aligned fiber bundles that create a concentrated electric field that merges across the electrode surface. Thus, this unique tip-enhanced electrode design enabled a smooth transition to a volumetric arc discharge. The resulting plasma generated an extremely bright light, in which a neutral density filter was needed to clearly observe the plasma. Interestingly, the carbon fibers had sharper tips after the plasma generation process, which were retained even after 10 min of plasma discharge, as shown in FIG. 7D. The carbon tips were likely sharpened by the concentrated electric fields produced upon application of the voltage between the two electrodes. Such sharp tips can also further increase the surrounding local electric field and facilitate the discharge process.

The continuous, volumetric plasma (e.g., ~25 mm in diameter, but only limited by the size of the electrodes) exhibited a highly controllable temperature of 3000-8000 K, as well as a uniform temperature distribution, as shown in FIG. 7A. Compared with conventional arc jet or pin-to-pin arc plasma techniques, the setup 700 can achieve a plasma over a uniformly large area and at relatively high temperature at atmospheric pressure with modest current input (e.g., ~45 A). Notably, the carbon fiber tips remain stable even under these ultrahigh temperature conditions due to the low heat capacity, high thermal conductivity, and high emissivity of the carbon electrodes. As a result, the volumetric plasma can maintain stable operation for 10 minutes or longer with sustained power input.

Figure 7E:
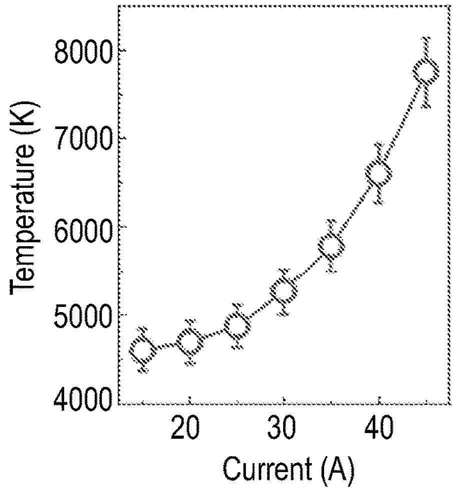
FIG. 7E is a graph of a temperature of a central region of a generated plasma using a pair of carbon felt electrodes as a function of input current.

The temperature of the plasma was determined using Rayleigh thermometry, a linear technique in which the Rayleigh scattering signal is proportional to the total number density of the molecules in the plasma and inversely proportional to the temperature. As shown in FIG. 7E, as the current was increased from 15 A to 45 A (corresponding to a current density of 3 $A/cm^2$ to 9 $A/cm^2$), the plasma temperature increased from ~4200 K to ~7700 K. This demonstrated the ability of the setup to generate an ultra-high-temperature environment with precise control of the temperature. The temperature was also measured in a line-scan across the center of the plasma at a current of 20 A (4 $A/cm^2$), and it was found to be ~4700 K across the electrode surface, thereby demonstrating the plasma uniformity. The plasma temperature was also measured under the same conditions (4 $A/cm^2$, ~3 mm gap) using grey body radiation spectroscopy, which yielded an average temperature of ~4500 K, validating the Rayleigh thermometry results. Despite such an ultrahigh plasma temperature, numerical simulation shows the carbon tips feature a lower temperature distribution, reaching just ~3000 K even when the plasma center is set at 7000 K. This can be attributed to the high thermal conductivity and emissivity of the carbon tips, which helps rapidly transfer heat away from the electrodes. This can also explain how the carbon tips are able to remain stable in such an ultrahigh-temperature environment, which is necessary for the continuous operation of the plasma.

To investigate the role of the fibers in the plasma breakdown process, a control experiment was conducted using a pair of stainless-steel electrodes that did not feature any fibers. These plate electrodes required almost 1500 V over a ~3 mm gap to achieve the gas discharge breakdown, which is more than 30-times higher than the 42 V required using the carbon fiber tip-enhanced electrodes over the same electrode gap distance. The pronounced decrease in the breakdown voltage for the disclosed setup can be attributed to the presence of the long carbon fibers, which provide small gap distances via the Joule heating breakage, as well as the tip-enhanced electric fields of the shorter carbon fibers, which promote the Townsend breakdown. In addition, the short fiber tips can enhance secondary electron emissions to enable a volumetric spark discharge formation with a uniform temperature distribution. In contrast, the stainless-steel plate electrodes, which have neither the sharp fiber tips for the enhanced electric field nor the short tips to facilitate the secondary electron emissions, thus require a much higher voltage to achieve the gas discharge breakdown and have difficulty creating a uniform and volumetric plasma. Moreover, when using the fiber-less stainless-stainless steel plate electrodes, the discharge position is highly narrow and unpredictable, typically following the path of streamers, which can make such configuration unsatisfactory for materials manufacturing. In contrast, short fiber tip array of the disclosed setup can enable volumetric plasma formation through the localized tip-enhanced electric fields that merge the gas discharge across the electrodes.

Control experiments were also performed by isolating the effects of the long and short carbon fibers in the disclosed setup. In some cases, by removing the long fibers between the carbon felt electrodes and ensuring no contact was formed, plasma breakdown was unable to be generated under the same conditions. However, higher breakdown voltages and/or other plasma initiation techniques could be used instead of the long carbon fibers. Additionally, to investigate the role of short fiber tip array, two graphite plate electrodes of the same dimensions but with only a bundle of long fibers glued in between the electrodes were used. These control electrodes initially displayed a phenomenon similar to the carbon felt electrodes, in which sparks are formed after a dark period. However, the voltage continued to increase, only spark discharge was observed, with no continuous or expanded plasma formation. In contrast, the disclosed setup produced a stable volumetric plasma due to the presence of the dense, short carbon fibers that decorate the surface of the electrodes.

Figure 8A:
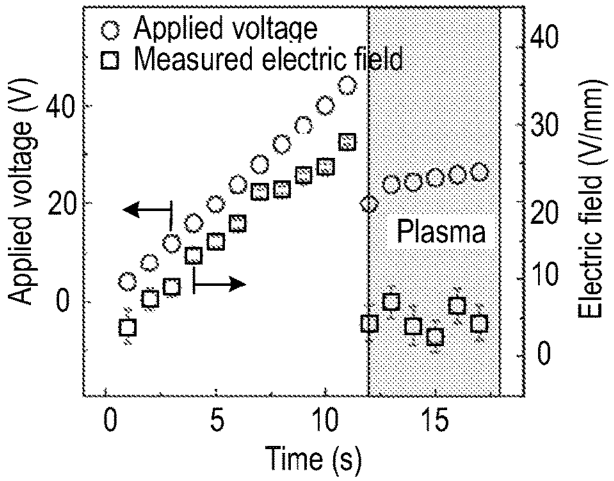
FIG. 8A is a graph of applied voltage and measured electric field between carbon felt electrodes via electric field induced second harmonic (E-FISH) generation.

FIG. 3D shows the current-voltage (CV) characteristics of the disclosed plasma discharge process using the tip-enhanced carbon felt electrodes. The plasma electric field strength between the electrodes was also simultaneously measured using the in-situ electric field induced second harmonics (E-FISH) method, the results of which are shown in FIG. 8A. Conceptually, E-FISH measures the electric field via the second harmonic signal of the excitation laser in the presence of an externally applied electric field. The second harmonic signal is quadratically proportional to the plasma electric field strength. To determine the final electric field, the E-FISH signals were calibrated by measuring the electric fields generated before breakdown with a DC power supply and corrected for the number density of molecules using Rayleigh scattering. The E-FISH measurements featured a spatial resolution of ~3 mm (estimated based on the confocal length of the laser beam) along the laser beam propagation direction.

Referring to FIG. 3D, as the top carbon felt (cathode) bias voltage was increased from zero to ~33 V (first stage 320), bright filaments were observed between the electrodes, which are the long carbon fibers in contact with each other and thus subjected to Joule heating due to the current passing therethrough. Then from ~33 V to ~42 V, no current signal was observed in the CV curve (second stage 322), and no light emission was observed from the fibers. This lack of current can be attributed to the high temperatures achieved by the Joule-heated fibers in first stage 320, causing them to physically break at regions of high resistance (e.g., inter-fiber junctions) and forming narrow gaps between these long fibers. The gaps between the long fibers stops the Joule heating effect, causing the fibers to turn dark again.

As the voltage was further increased to ~42-45 V (third stage 324), the electric field was further elevated, and spark discharge was observed. This discharge occurs in the narrow gaps between the broken fibers via the tip-enhanced field emission effect, which discharge process can help reduce the breakdown voltage of the plasma by promoting electron impact ionization via the Townsend avalanche, thereby causing the plasma to ignite (fourth stage 326). With this transition to arc discharge, a rapid drop of the voltage to ~20 V was observed due to the increase of the electron number density and conductivity of the plasma gas (fifth stage 328), with a current surge to 18 A (i.e., the arc discharge breakdown current). After the breakdown, the E-FISH measured field between the two electrodes remained very low (~5 V/mm), indicating that only a low electric field was needed to maintain the plasma. The arc discharge volume then began to rapidly expand between the electrodes.

When the current reached ~45 A (sixth stage 330), the plasma generated a temperature of ~7700 K. The current was then gradually reduced from 45 A (seventh stage 332). During this stage, the arc discharge remained stable (though at a lower intensity) even when the current reached just ~7 A, which was below the gas discharge breakdown current (~18 A at fifth stage 328). This pronounced hysteresis can be explained by the fact that once arc discharge occurs there is a high density of electrons between the electrodes, which makes it easier to maintain the arc discharge state. Additionally, the temperature of the plasma is still very high (>3000 K), which promotes the thermionic emission of electrons from the short carbon fiber tips. However, when the current was decreased below 7 A (eighth stage 334), the plasma terminated with a voltage surge to 42 V, closing the hysteresis loop. In general, the breakdown voltage of the disclosed plasma setup was significantly lower than previously reported plasma breakdown values, as well as highly reproducible (~42±2.6 V, based on 15 experiments).

Figure 8B:
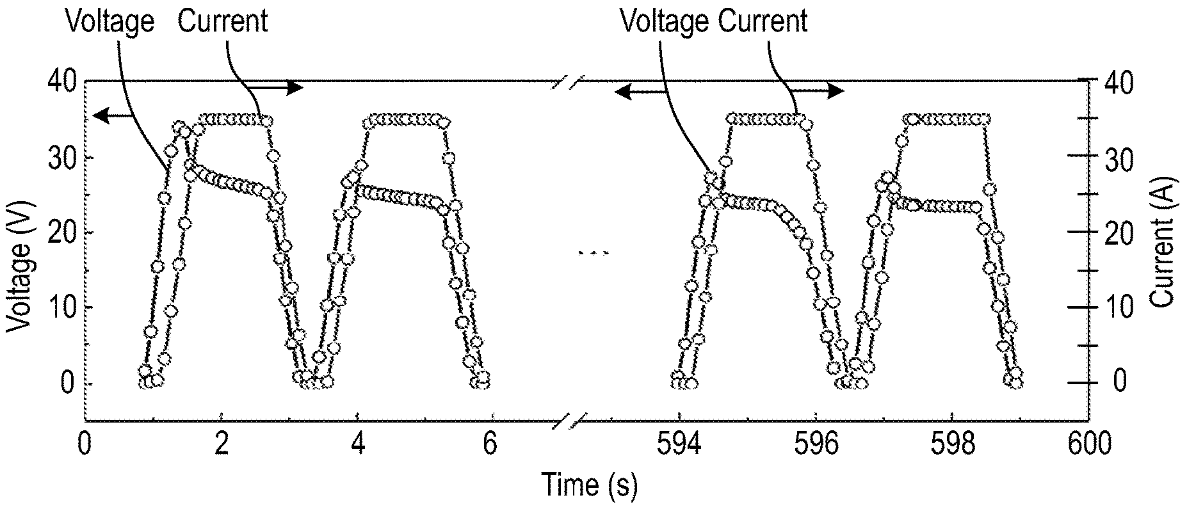
FIG. 8B is a graph of voltage-current versus time illustrating pulsed plasma operation of a pair of carbon felt electrodes.

The volumetric plasma can also be rapidly turned on and off, for example, by simply modulating the voltage and current applied. As shown in FIG. 8B, a pulsed plasma could be generated by using a programmable power supply to repeatedly set the applied voltage to 45 V for 0.5 seconds and then set the voltage back to 0 V for 0.5 seconds. This process increased the current of the plasma to 35 A for 1 second. As a result, the plasma temperature could be cycled between 1000 K and 6000 K in less than 1 second, with ramping/cooling rates of ~$10^3$ K/s. This excellent tunability was due to the low voltage barrier for the arc plasma transition enabled by the tip-enhanced electrodes. The ability to pulse the plasma to reach high temperatures for short periods of time and then quench back to low temperatures can allow the disclosed setup to control reaction pathways for various nonequilibrium syntheses where drastic temperature changes are needed (e.g., rapid cooling).

This continuous, volumetric, uniform, and stable ultrahigh-temperature plasma can be employed for the synthesis of various high-temperature materials. For example, the disclosed setup was used to synthesize and sinter hafnium carbonitride (Hf(C,N))—an ultrahigh-temperature ceramic that has been challenging to prepare due to its high melting point (>4000 K). In the disclosed setup, the plasma can reach temperatures of several thousand K in less than 1 second, which can prevent nitrogen dissociation and thus successfully synthesize and sinter Hf(C,N). To investigate the synthesis of Hf(C,N), a pellet was prepared from a mixture of HfC and HfN precursor powders. In particular, HfC (99% purity) and HIN (99.5% purity) powders were weighed with a nominal atomic ratio of Hf:C:N=0.53:0.27:0.2, then mixed and ball milled for 5 hours. The tungsten carbide ball-milling jars were sealed with tape in an argon environment to protect the powders from oxidation during milling. The ball milled powder was then pressed into pellets with a diameter of 10 mm and placed on the surface of the lower electrodes in the gap region between the two tip-enhanced carbon felt electrodes 706*a*, 706*b* in FIG. 7B. A programmable power supply was used to generate the plasma, in particular, heating the pellets for 10 seconds at plasma temperatures of 4400 K, 4500 K, 4800 K, and 5150 K, as measured by Rayleigh scattering. The sintered pellets were cooled down to room temperature for further characterization.

Figure 9A:
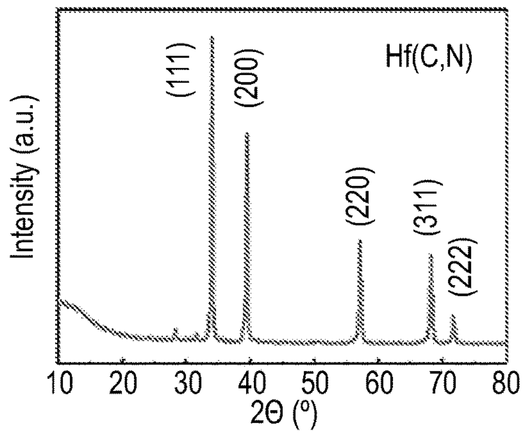
FIG. 9A shows X-ray diffraction analysis (XRD) patterns of Hf(C,N) synthesized using a volumetric plasma generated by a pair of carbon felt electrodes.

With the HfC/HfN pellet on the bottom carbon felt electrode 706*b*, the temperature profile of the generated plasma at different currents was consistent with the temperature of the plasma without the pellet sample present. The sintered ceramic pellet resulting from the plasma structure was investigated with respect to its phase and structure. Prior to sintering, the cross-section of the precursor pellet exhibited a compacted powder structure. After the one-step plasma sintering process at a plasma temperature of 5150 K for ~10 seconds, the cross-section of the resulting ceramic pellet exhibited good density and uniformity. X-ray diffraction (XRD) patterns of the resulting Hf(C,N) sample are shown in FIG. 9A. After the synthesis, a predominantly single phase of the rock salt crystal structure (space group: $Fm\bar{3}m$) was successfully achieved. These results demonstrate that the ultrahigh temperature of the plasma in the disclosed setup can rapidly synthesize and sinter largely single-phase Hf(C,N) in just 10 s.

The disclosed plasma setup also possesses fast quenching capabilities, in which the temperature can drop from 6000 K to 1000 K in less than 1 second. Such fast quenching capabilities can be used to synthesize bulk extreme materials, such as but not limited to amorphous high-melting point oxides, which typically require a fast-quenching treatment after melting to achieve a desired disordered state. Most high-melting-point oxide materials are also extremely difficult to transform into amorphous states via conventional tools due to the simultaneous requirements of both high-temperature melting and rapid cooling. Amorphous phases of ultrahigh-temperature oxides, such as magnesium oxide (MgO), are typically made via sputtering into thin films, not produced as bulk materials.

Figure 9B:
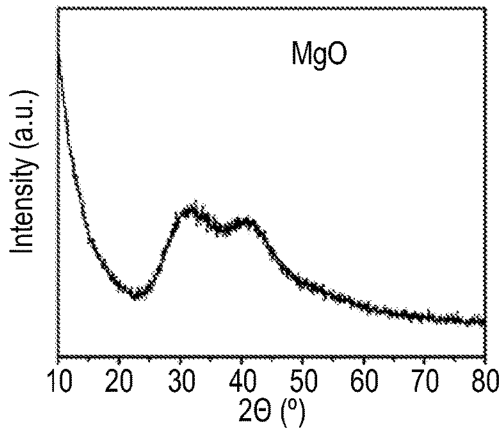
FIG. 9B shows XRD patterns of glass MgO synthesized using a volumetric plasma generated by a pair of carbon felt electrodes.

As a demonstration, the disclosed plasma heating and quenching were applied to crystalline MgO powder. In particular, MgO crystalline oxide powder (>99% purity) was pressed into pellets with a diameter of 8 mm. After plasma initiation, the pellet sample was inserted into the gap region between the two carbon felt electrodes 706*a*, 706*b*, and heated up to ~6000 K for 20 seconds until the pellet melted. The plasma was turned off, and the sample was quickly taken out with a ceramic plate and cooled down to room temperature in seconds via strong air flow. The fast cooling treatment helped maintain the spherical shape produced by surface tension in its formerly molten state. FIG. 9B shows the XRD patterns of the resulting MgO, in which no sharp peaks can be detected, indicating the formation of the amorphous MgO phase. Imaging analysis of the cross-section of the MgO sample revealed no obvious grain boundaries. The disclosed plasma heating and quenching can be applied to other oxides with high melting points (e.g., >3000 K). For example, similar results were obtained using zirconia ($ZrO_2$) crystalline oxide powder (99% purity) and yttria-stabilized zirconia (YSZ) crystalline oxide powder (TZ-3Y).

The disclosed plasma setup can also be used to synthesize tungsten-based refractory alloys directly from the metallic elemental powders. For example, a W-1.5Nb-0.5Ti alloy was designed, in which tungsten (W) functions as the primary refractory metal, and the lower-melting point niobium (Nb) and titanium (Ti) facilitate sintering. In particular, tungsten (99.95% purity), niobium (99.85% purity), and titanium (99.98% purity) powders were mixed with a nominal composition of 98 wt. % W, 1.5 wt. % Nb, and 0.5 wt. % Ti. The powder blend was further mixed with a tumbler mixer for 5 hours to reach a high homogeneity. The powder mixture was then printed into a 1×8×30 mm flat rectangular shape using the Binder Jetting method (ExOne™ Innvent+ ®, sold by Desktop Metal, Inc. of Burlington, MA, USA). A standard set of printing parameters for tungsten alloys was chosen for the printing process (e.g., saturation: 60%; binder set time: 5 seconds; dry time: 10 seconds; layer thickness: 50 μm; roughing roller: 300 rpm; smoothing roller: 400 rpm). To minimize carbon contamination during the printing process, a binder with low carbon content was used. After printing, the samples were cured in an oven at 200° C. for 8 hours to develop strength for the subsequent de-powdering and handling processes. After removing excess powder with compressed air, the samples went through a de-binding step for 30 min at 450° C., in particular, to decompose the binder into organic fumes that evaporated, leaving behind the shaped powder mixture (e.g., pellet) that was then sintered using the disclosed plasma setup.

The pellet was placed on the surface of the lower electrode 706*b*, and a programmable power supply was employed to generate plasma within the gap 708. The generated plasma heated the pellet for 10 seconds at a plasma temperature of ~4700 K, as measured by Rayleigh scattering. The sintered pellet was then cooled down to room temperature for further characterization. Imaging and energy dispersive X-ray spectroscopy (EDS) mapping results show that the applied plasma treatment forms a dense W-1.5Nb-0.5Ti alloy with uniform distribution of the W/Nb/Ti elements. Additionally, the elemental ratio of the synthesized sample was consistent with the precursor ratio, indicating the fast plasma heating process minimizes (or at least reduces) elemental evaporation.

For comparison, a specimen with the same composition, 98W-1.5Nb-0.5Ti (wt. %), was synthesized using conventional arc melting. In particular, the raw materials in pure metal form with a purity of >99.99 wt. % (W: 99.999 wt. %, Nb: 99.999 wt. %, Ti: 99.99 wt. %) were cleaned and weighed before placing them in the chamber of an arc-melter. The chamber was pumped and purged with pure argon (Ar) until the chamber pressure reached 2 psi. The Ar-gas flashing process was repeated four times to ensure an inert environment inside the working chamber. The open circuit voltage was at 85 V and the current was set at 350 A, which are the recommended maximum limits to avoid damage to the tungsten electrode of the arc-melter. At the beginning of the arc-melting process, a high-purity Zr (>99.99 wt. %) piece was fully melted to further remove residual oxygen inside the chamber. Each melting lasted for ~1 minute, followed by a 20-second furnace cooling with cold tap water running through the copper crucible. The melting process was repeated three times to maximize the homogeneity of the alloy composition. After melting, the samples were sliced and polished for microstructure analysis. The resulting samples exhibited significant heterogeneity, as well as unmelted tungsten within the microstructure.

The disclosed plasma setup was also used to synthesize an MoNbTaW (equal molar) refractory alloy with similar results, thereby suggesting the universality of the disclosed plasma setup for synthesis/sintering. In particular, transition metal elemental powders (all >99% purity) were weighed at a nominal ratio of $Mo_{0.25}Nb_{0.25}Ta_{0.25}W_{0.25}$, then mixed and ball milled for 5 hours. The tungsten carbide ball-milling jars were sealed with tape in an Ar environment to protect the powders from oxidation. The ball milled powder was then pressed into pellets with a diameter of 10 mm. The samples were put on the surface of the lower electrode 706*b*, and a programmable power supply was used to generate the plasma within the gap 708. The generated plasma heated the pellet for 10 seconds at a plasma temperature of ~4700 K, as measured by Rayleigh scattering, after which the sintered pellet was cooled down to room temperature.

Figure 9C:
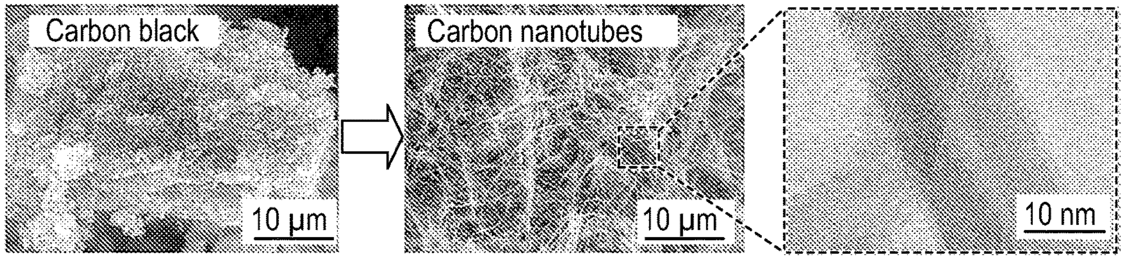
FIG. 9C shows images of the conversion of carbon black to carbon nanotubes using a volumetric plasma.

The disclosed plasma setup can also be used to generate high-value carbon materials, such as carbon nanotubes (CNTs), simply by heating biomass carbon or carbon black without any catalysts. In particular, 50 mg of carbon black powder was spread on the surface of the lower tip-enhanced electrode 706*b*, and a programmable power supply was used to generate the plasma with the gap 708. The generated plasma heated the powder for 10 seconds at a plasma temperature of ~6600 K (input current of 40 A), as measured by Rayleigh scattering, after which the material was cooled down to room temperature for further characterization. After the plasma treatment, imaging shows that the vast majority of the carbon black converted into multiwalled CNTs composed of ~5-15 carbon layers, as shown in FIG. 9C. The ends of the CNTs were also analyzed using transmission electron microscopy (TEM), and no metal nanoparticle catalysts could be observed. These results suggest that the conversion of the carbon black to CNTs was due to the high temperature treatment of the plasma alone, rather than due to potential metallic contaminants in the starting material. Electron energy loss spectroscopy (EELS) analysis of the fabricated CNTs also shows a typical characteristic carbon K edge profile, consistent with the CNT profiles in the literature. These results demonstrate the potential of the disclosed plasma setup in making value-added products, such as CNTs, from carbon black, which is a widely available and inexpensive byproduct from the petroleum industry.

Figure 10A:
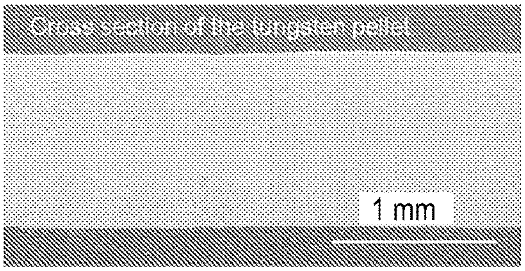
FIG. 10A is a cross-sectional SEM image of a tungsten sample synthesized using a focused volumetric plasma in a powder bed fusion/sintering process.

The disclosed plasma process was adapted to a three-dimensional manufacturing setup, in particular, a powder bed fusion/sintering system, by constructing a platform equipped with a focused plasma beam (similar to the setup illustrated in FIGS. 5B-5C). In particular, a small cathode carbon felt electrode (with a diameter of 8 mm) was used for plasma generation and the input current was carefully adjusted to focus the plasma beam into a filament with a column radius of approximately 1 mm. A carbon felt strip was used as the anode electrode and facilitated electron transfer. The carbon felt strip also supported the sample (a pre-pressed pellet derived from multi-elemental metal powders). The carbon felt strip was connected to a motor, enabling movement along a pre-programmed route. For the sample, tungsten powders (99.9%) were pressed into a pellet and put on the carbon felt strip. The plasma was turned on, and the carbon felt strip with the pellet thereon was moved relative to the focused plasma. After scanning, the heated sample was gradually cooled down to room temperature for further analysis. FIG. 10A shows a cross-sectional SEM image of the tungsten sample resulting from this powder bed fusion/sintering process, in which a very dense structure can be achieved compared to the pellet before treatment, demonstrating the excellent fusion/sintering capability of this technique.

In addition to bulk samples, the disclosed plasma setup can also be used for coating deposition. As proof of concept, the platform equipped with a focused plasma beam (similar to the setup illustrated in FIGS. 5B-5C) was used to form an ultra-high temperature ceramic (UHTC) coating on top of metal alloys, for example, to improve their high-temperature resistance. In particular, boron (>98%), molybdenum (99.9%), tantalum (99.98%), titanium (99%), tungsten (99.95%), and zirconium (99.5%) powders were weighed at a ratio of $(Mo_{0.2}Ta_{0.2}Ti_{0.2}W_{0.2}Zr_{0.2})B_2$, mixed, and then ball milled for 3 hours. 80 mol % excess boron powder was added to compensate for evaporative loss of boron oxide during HEB formation. The powder was further heated by a carbon heater in an Ar-filled glovebox to 1800° C. to trigger self-propagating reactions. Toluene (45 wt %), fish oil (0.5 wt %), and the powders (40 wt %) were mixed and milled for 3 hours, after which polyvinyl butyral (6 wt %) and benzyl butyl phthalate (8.5 wt %) were added and milled for an additional 6 hours to form a slurry. The slurry was cast to form a coating on the surface of a Nb-10Hf-1Ti alloy substrate, followed by a calcination treatment at 450° C. for 1 hour.

Figure 10B:
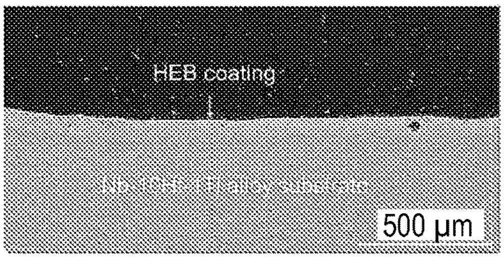
FIG. 10B is a cross-sectional SEM image of a high entropy diboride (HEB) coating on an Nb-10Hf-1Ti alloy substrate synthesized using a volumetric plasma.

A cathode carbon felt electrode (with a diameter of 25.4 mm) was used for plasma generation, and the anode electrode was the carbon felt strip, which supported the coated sample and facilitated electron transfer. The plasma was turned on and the carbon felt strip moved the HEB-coated alloy sample with respect to the plasma, ensuring even heating of the sample by the plasma. After scanning, the sample was gradually cooled down to room temperature for further analysis. As shown in FIG. 10B, the plasma-processed sample exhibits a high entropy diboride (HEB) coating on the surface of C103 alloy (Nb-10Hf-1Ti), in which good bonding without gap between the coating and substrate is confirmed.

The high heating/cooling rate of the disclosed plasma process can be useful in the synthesis and processing of certain materials. For example, a high cooling rate during high-temperature synthesis can offer several advantages, since the ability to rapidly cool a material after it has been processed at high temperatures can influence its microstructure, mechanical properties, and performance. Some of the key advantages of high cooling rates can include but are not limited to:

- Fine microstructure: Rapid cooling can lead to the formation of a fine, uniform microstructure in the material. A finer microstructure can improve mechanical properties such as strength, hardness, and wear resistance.
- Retention of metastable phases and reduced segregation and precipitation: Rapid cooling can help preserve metastable phases that form during high-temperature synthesis. Fast cooling rates can minimize the segregation of alloying elements and the formation of undesired precipitates, which can yield a more homogenous material with improved mechanical properties and corrosion resistance.
- Improved productivity and energy efficiency: High cooling rates can reduce the overall processing time, leading to increased productivity and reduced energy consumption. This can be particularly relevant for industries where high throughput and energy efficiency are important, such as electronics manufacturing and large-scale metal processing.

As noted above, the disclosed plasma process can cycle the plasma temperature between 1000 K and 6000 K in less than 1 second, with overall ramping/cooling rates of ~$10^3$ K/s (and an initial cooling rate that can reach ~$10^5$ K/s). This excellent tunability is due to the low voltage barrier for the arc plasma transition enabled by the tip-enhanced electrodes, as well as the fast power cutoff, which features can be employed to synthesize glass phase ceramic materials that cannot be easily achieved by conventional methods (such as spark plasma sintering).

The high heating/cooling rates can also be useful for non-equilibrium synthesis, as noted with the amorphous ceramics described above. To further demonstrate its utility for non-equilibrium synthesis, the disclosed plasma process was used to fabricate refractory high-entropy alloy (RHEA) particles and atomized tungsten tetraboride ($WB_4$) particles with super hard properties. Mid/high entropy alloys are a relatively new class of materials that have multiple elements in roughly equal proportions. By atomizing mid/high entropy alloys into fine particles and controlling the size, composition, and morphology, it is possible to tailor their properties, such as the mechanical strength, ductility, and corrosion resistance. Atomized mid/high entropy refractory metal alloy powders can be widely used in fields like additive manufacturing, such as powder bed fusion or binder jetting, as well as surface coating.

To fabricate the RHEA particles, elemental powders (e.g., Mo, Nb, Ta, and W) were fed into the plasma via a gravity feed (e.g., using a setup similar to FIG. 4G). The powders are heated and melted in the plasma region to form a high entropy liquid and then rapidly cooled to form atomized particles that were subsequently collected. The atomized powder sizes can be controlled by adjusting the temperature and powder flow rate. The atomization, spheroidization and alloying of RHEA synthesis process benefits not only from the extreme high temperature (up to 8000K) provided by the plasma generated by the tip-enhanced carbon electrodes but also from a long reaction zone residence time provided by the uniform and stable plasma distribution within the gap between the carbon electrodes.

Figure 11:
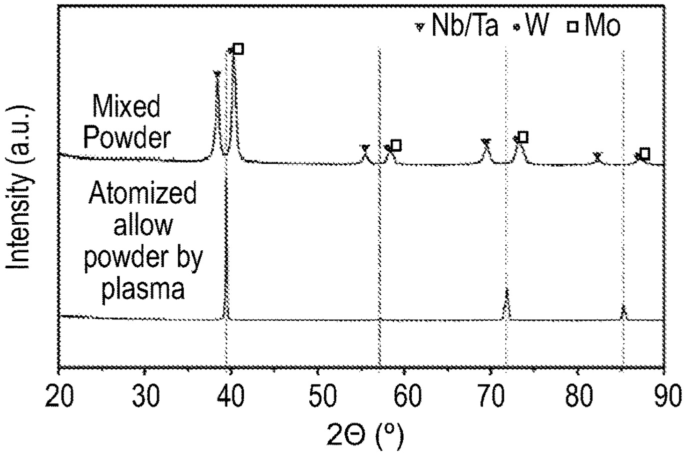
FIG. 11 shows XRD patterns of a mixed powder precursor and an atomized MoNbTaW alloy powder synthesized from the precursor using a volumetric plasma.

The resulting atomized MoNbTaW RHEA alloy powder is of granulated silver grey, in contrast to the black powdery mixture of single components. Images of the atomized MoNbTaW refractory metal powder showed a high degree of sphericity, with no satellite particles attached to the surfaces of large particles being observed. The average particle size was statistically measured as 81.2±13.4 μm. EDS mapping of the MoNbTaW powder sample showed a uniform distribution of the four elements within the particle. XRD patterns of the atomized RHEA powder by plasma and the corresponding precursor powder of mixture of single components are shown in FIG. 11, where the clear peak shift illustrated for the MoNbTaW RHEA powder and the disappearance of diffraction peaks from single components indicates the alloying among the four components. The generality of this method for atomized RHEA powder synthesis was further validated by expanding the refractory metal powder species involved, in particular to WNbTi and MoNbTaWCr with similar results.

The alloying process, crystalline structure, chemical composition of the refractory metal powder can be tuned by the applied temperature, which can depend on the voltage, current, gap distance, and/or gas pressure between the electrodes. The size of the atomized alloy powder can be adjusted by the atomizer design. The argon carrier gas can be optimized with respect to the introduction of the mixed refractory metal powder precursor (e.g., powder feed rate, feed amount, etc.) into the plasma region to further improve production efficiency.

In addition, the disclosed plasma process was used to synthesize atomized $WB_4$ particles, The synthesis route was similar to that of mid/high entropy alloy powders, as discussed above, but with tungsten and boron elemental powders premixed and passed through the plasma region. The ultrahigh temperature of the plasma drives the reaction to form the $WB_4$ phase particles as they cool down. Cross-sectional SEM imaging of the resulting $WB_4$ particles shows similar texture and morphology to bulk $WB_4$ in literature, but atomized powders were synthesized here instead of bulk materials. Such atomized $WB_4$ powders can be useful in additive manufacturing.

Additional Examples of the Disclosed Technology

In view of the above-described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A method comprising:
- generating a volumetric plasma between first and second electrodes spaced from each other by a gap, the first electrode comprising a first base layer and a plurality of first projecting portions that extend along a first direction from the first base layer toward the second electrode,
- wherein the first base layer comprises a first electrically-conductive material,
- at least some of the first projecting portions comprise a second electrically-conductive material,
- a melting temperature for the first electrically-conductive material and a melting temperature for the second electrically-conductive material are at least 1000 K, and
- during the generating, a temperature of the volumetric plasma between the first and second electrodes is in a range of 1000-8000 K, inclusive.

Clause 2. The method of any clause or example herein, in particular, Clause 1, wherein:
- each of the first projecting portions has a cross-sectional dimension in a plane substantially perpendicular to the first direction less than or equal to 1 mm, for example, less than or equal to 500 μm;
- each of the first projecting portions has a length along the first direction less than or equal to 1 cm, for example, less than or equal to 5 mm;
- each of the first projecting portions is spaced from adjacent ones of the plurality of first projecting portions by less than or equal 1 mm; or
- any combination of the above.

Clause 3. The method of any clause or example herein, in particular, any one of Clauses 1-2, wherein:
- a cross-sectional dimension of each of the first projecting portions is in a range of 1-100 μm inclusive, for example, in a range of 1-50 μm, inclusive;
- the length of each of the first projecting portions is in a range of 200-500 μm inclusive;
- the spacing between adjacent first projecting portions is less than or equal to 100 μm, for example, less than or equal to 50 μm;
- a density of the first projecting portions is at least $10^4$ portions/$cm^2$; or
- any combination of the above.

Clause 4. The method of any clause or example herein, in particular, any one of Clauses 1-3, wherein the spacing between adjacent first projecting portions is in a range of 3-20 μm, inclusive.

Clause 5. The method of any clause or example herein, in particular, any one of Clauses 1-4, wherein a thickness of the gap along the first direction is in a range of 1 mm to 10 cm, inclusive, for example, in a range of 1 mm to 1 cm, inclusive.

Clause 6. The method of any clause or example herein, in particular, any one of Clauses 1-5, wherein the generating the volumetric plasma comprises applying a direct current (DC) voltage between the first and second electrodes.

Clause 7. The method of any clause or example herein, in particular, any one of Clauses 1-5, wherein the generating the volumetric plasma comprises applying an alternating current (AC) voltage between the first and second electrodes.

Clause 8. The method of any clause or example herein, in particular, any one of Clauses 1-5, wherein the generating the volumetric plasma comprises applying a pulsed voltage waveform between the first and second electrodes.

Clause 9. The method of any clause or example herein, in particular, any one of Clauses 1-8, wherein a peak voltage applied between the first and second electrodes during the generating the volumetric plasma is less than or equal to 100 V, and/or a peak current between the first and second electrodes during the generating the volumetric plasma is less than or equal to 100 A.

Clause 10. The method of any clause or example herein, in particular, any one of Clauses 1-9, wherein the generating comprises:
- initiating the volumetric plasma by applying a first direct current (DC) voltage, a first alternating current (AC) voltage, or a first pulsed voltage waveform between the first and second electrodes; and maintaining the initiated volumetric plasma by applying a second DC voltage, a second AC voltage, or a second pulsed voltage waveform between the first and second electrodes, wherein an absolute value of a peak voltage of the second DC voltage, the second AC voltage, or the second pulsed voltage waveform is less than an absolute value of a peak voltage of the first DC voltage, the first AC voltage, or the first pulsed voltage waveform.

Clause 11. The method of any clause or example herein, in particular, Clause 10, wherein the absolute value of the peak voltage of the first DC voltage, the first AC voltage, or the first pulsed waveform is in a range of 10-100 V, inclusive, and/or the absolute value of the peak voltage of the second DC voltage, the second AC voltage, or the second pulsed waveform is in a range of 10-50 V, inclusive.

Clause 12. The method of any clause or example herein, in particular, any one of Clauses 10-11, wherein during the initiating the volumetric plasma, the first DC voltage, the first AC voltage, or the first pulsed voltage waveform is applied between the first and second electrodes for at least 1 minute, and/or, during the maintaining the initiated volumetric plasma, the second DC voltage, the second AC voltage, or the second pulsed voltage waveform is applied between the first and second electrodes for at least 1 minute.

Clause 13. The method of any clause or example herein, in particular, any one of Clauses 1-12, wherein the generating the volumetric plasma between the first and second electrodes is at about atmospheric pressure.

Clause 14. The method of any clause or example herein, in particular, any one of Clauses 1-13, wherein a size of the generated plasma along a second direction is at least 1 mm, for example, in range of 1 mm to 100 cm, inclusive, the second direction being in a plane substantially perpendicular to the first direction.

Clause 15. The method of any clause or example herein, in particular, any one of Clauses 1-14, wherein the generating the plasma occurs at a pressure in a range from 1 Torr to 10 atm, inclusive, with or without application of an external magnetic field.

Clause 16. The method of any clause or example herein, in particular, any one of Clauses 1-15, wherein the first and second electrically-conductive materials are a same material.

Clause 17. The method of any clause or example herein, in particular, any one of Clauses 1-16, wherein the first electrically-conductive material, the second electrically-conductive material, or both are formed of carbon or graphite.

Clause 18. The method of any clause or example herein, in particular, any one of Clauses 1-17, wherein the first electrically-conductive material, the second electrically-conductive material, or both are formed of a refractory metal, a refractory metal alloy, or both of the foregoing.

Clause 19. The method of any clause or example herein, in particular, any one of Clauses 1-18, wherein the first electrically-conductive material, the second electrically-conductive material, or both are formed of a metal carbide, a silicon carbide, a metal nitride, a metal diboride, or any combination of the foregoing.

Clause 20. The method of any clause or example herein, in particular, any one of Clauses 1-19, wherein:

the second electrode comprises a second base layer and a plurality of second projecting portions that extend along the first direction from the second base layer toward the first electrode;

the second base layer comprises a third electrically-conductive material;

at least some of the second projecting portions comprise a fourth electrically-conductive material; and a melting temperature for the third electrically-conductive material and a melting temperature for the fourth electrically-conductive material are at least 1000 K.

Clause 21. The method of any clause or example herein, in particular, any one of Clauses 1-20, wherein the first and second electrically-conductive materials are a same material, the third and fourth electrically-conductive materials are a same material, the second and fourth electrically-conductive materials are a same material, the first and third electrically-conductive materials are a same material, or any combination of the foregoing.

Clause 22. The method of any clause or example herein, in particular, any one of Clauses 1-21, wherein:

prior to the generating, an end of each of the at least some of the first projecting portions has a first shape, and, after the generating, the end of each of the at least some of the first projecting portions has been sharpened to have a first conical shape different than the first shape; and/or prior to the generating, an end of each of the at least some of the second projecting portions has a second shape, and, after the generating, the end of each of the at least some of the second projecting portions has a second conical shape different than the second shape.

Clause 23. The method of any clause or example herein, in particular, any one of Clauses 1-22, wherein:

the first electrode further comprises a plurality of third projecting portions that extend along the first direction from the first base layer toward the second electrode farther than the plurality of first projecting portions, at least some of the third projecting portions being formed of a fifth electrically-conductive material;

the second electrode further comprises a plurality of fourth projecting portions that extend along the first direction from the second base layer toward the first electrode farther than the plurality of second projecting portions, at least some of the fourth projecting portions being formed of a sixth electrically-conductive material;

at least one of the third projecting portions contacts with at least one of the fourth projecting portions in the gap or is separated from the at least one of the fourth projecting portions by no more than 25 μm, for example, less than or equal to 5 μm; and a melting temperature for the fifth electrically-conductive material and a melting temperature for the sixth electrically-conductive material are at least 1000 K.

Clause 24. The method of any clause or example herein, in particular, Clause 23, wherein the generating comprises initiating the volumetric plasma via gas discharge between the third and fourth projecting portions, and maintaining the volumetric plasma via gas discharge between the first and second projecting portions.

Clause 25. The method of any clause or example herein, in particular, any one of Clauses 23-24, further comprising, prior to initiating the volumetric plasma, applying a first voltage between the first and second electrodes such that a current flows through contacting parts of the at least one of the third and fourth projecting portions and causes Joule heating thereof, the Joule heating causing breakage of the at least one of the third and/or fourth projecting portions such that the at least one of the third projecting portions become separated from the at least one of the fourth projecting portions by a spacing of 1-25 μm, inclusive, for example, 1-5 μm, inclusive.

Clause 26. The method of any clause or example herein, in particular, any one of Clauses 23-25, further comprising, prior to initiating the volumetric plasma, applying a first voltage between the first and second electrodes such that a current flows through contacting parts of the at least one of the third and fourth projecting portions and causes Joule heating thereof, the Joule heating causing breakage of the at least one of the third and/or fourth projecting portions such that the at least one of the third projecting portions become separated from the at least one of the fourth projecting portions by a spacing of that is no more than three times a cross-sectional dimension of the third or fourth projecting portions.

Clause 27. The method of any clause or example herein, in particular, any one of Clauses 23-26, wherein the first and second electrically-conductive materials are a same material, the third and fourth electrically-conductive materials are a same material, the fifth and sixth electrically-conductive materials are a same material, the second and fourth electrically-conductive materials are a same material, the first and third electrically-conductive materials are a same material, the second and fifth electrically-conductive materials are a same material, the fourth and sixth electrically-conductive materials are a same material, or any combination of the foregoing.

Clause 28. The method of any clause or example herein, in particular, any one of Clauses 23-27, wherein one, some, or all of the first through sixth electrically-conductive materials is formed of or comprises: (i) carbon or graphite, (ii) a refractory metal, a refractory metal alloy, or both of the foregoing, (iii) a metal carbide, a silicon carbide, a metal nitride, a metal diboride, or any combination of the foregoing, or (iv) any combination of (i)-(iii).

Clause 29. The method of any clause or example herein, in particular, any one of Clauses 23-28, wherein:

each of the third projecting portions and/or each of the fourth projecting portions has a cross-sectional dimension in a plane substantially perpendicular to the first direction less than or equal to 1 mm, for example, less than or equal to 500 μm;

the cross-sectional dimension of each of the third projecting portions and/or each of the fourth projecting portions is in a range of 1-100 μm inclusive, for example, in a range of 1-50 μm, inclusive;

each of the third projecting portions and/or each of the fourth projecting portions has a length along the first direction greater than 1 mm, for example, in a range of 10-100 mm, inclusive; or any combination of the above.

Clause 30. The method of any clause or example herein, in particular, any one of Clauses 1-29, further comprising, prior to the generating:

forming the first electrode by cutting a portion from a first cloth comprising woven carbon or metal fibers, the first base layer being a remaining portion of the first cloth after the cutting, the plurality of first projecting portions and/or the plurality of third projecting portions being carbon or metal fibers exposed from a cut surface of the remaining portion of the first cloth; and/or forming the second electrode by cutting a portion from a second cloth comprising woven carbon or metal fibers, the second base layer being a remaining portion of the second cloth after the cutting, the plurality of second projecting portions and/or the plurality of fourth projecting portions being carbon or metal fibers exposed from a cut surface of the remaining portion of the second cloth.

Clause 31. The method of any clause or example herein, in particular, Clause 30, wherein the remaining portion of the first cloth and/or the remaining portion of the second cloth comprises a plurality of woven carbon or metal fibers extending along a second direction in a plane substantially perpendicular to the first direction.

Clause 32. The method of any clause or example herein, in particular, any one of Clauses 1-29, further comprising, prior to the generating:

forming the first electrode by roughening a surface of a first cloth comprising woven carbon or metal fibers, the first base layer being a bulk portion of the first cloth, the plurality of first projecting portions and/or the plurality of third projecting portions being carbon or metal fibers fragmented at and/or exposed from a surface of the bulk portion of the first cloth by the roughening; and/or forming the second electrode by roughening a surface of a second cloth comprising woven carbon or metal fibers, the second base layer being a bulk portion of the second cloth, the plurality of second projecting portions and/or the plurality of fourth projecting portions being carbon or metal fibers fragmented at and/or exposed from a surface of the bulk portion of the second cloth by the roughening.

Clause 33. The method of any clause or example herein, in particular, Clause 32, wherein the bulk portion of the first cloth and/or the bulk portion of the second cloth comprises a plurality of woven carbon or metal fibers extending along a second direction in a plane substantially perpendicular to the first direction.

Clause 34. The method of any clause or example herein, in particular, any one of Clauses 1-29, further comprising, prior to the generating:

forming the plurality of first projecting portions on the first base layer;

forming the plurality of third projecting portions on the first base layer;

forming the plurality of second projecting portions on the second base layer;

forming the plurality of fourth projecting portions on the second base layer; or any combination of the above.

Clause 35. The method of any clause or example herein, in particular, Clause 34, wherein the forming the plurality of first projecting portions, the forming the plurality of second projecting portions, the forming the plurality of third projecting portions, and/or the forming the plurality of fourth projecting portions comprises three-dimensional printing.

Clause 36. The method of any clause or example herein, in particular, Clause 35, wherein the three-dimensional printing comprises laser-based direct energy deposition or laser powder-bed fusion.

Clause 37. The method of any clause or example herein, in particular, any one of Clauses 1-36, wherein the first electrode, the second electrode, or both have a non-planar geometry.

Clause 38. The method of any clause or example herein, in particular, any one of Clauses 1-37, wherein:

the second electrode has a surface area facing the gap greater than that of the first electrode; and the method further comprises, during the generating, moving one of the first and second electrodes with respect to the other so as to change a location of the generated volumetric plasma.

Clause 39. The method of any clause or example herein, in particular, any one of Clauses 1-38, further comprising, prior to or at a same time as the generating, disposing one or more precursors within or adjacent to the gap between the first and second electrodes such that the volumetric plasma heats the one or more precursors so as to form one or more products.

Clause 40. The method of any clause or example herein, in particular, any one of Clauses 1-39, further comprising, during the generating, flowing one or more gases and/or one or more precursors through the volumetric plasma such that the volumetric plasma heats the one or more gases and/or the one or more precursors so at to form one or more products.

Clause 41. The method of any clause or example herein, in particular, Clause 40, wherein the first and second electrodes are arranged such that a thickness of the gap along the first direction is at a non-zero angle with respect to a direction of gravity, such that gravity assists the flow of the one or more precursors through the gap.

Clause 42. The method of any clause or example herein, in particular, any one of Clauses 40-41, wherein the flowing comprises using a carrier gas and/or a substrate to support the one or more precursors within, flowing into, and/or flowing out of the volumetric plasma.

Clause 43. The method of any clause or example herein, in particular, Clause 42, wherein the carrier gas comprises an inert gas.

Clause 44. The method of any clause or example herein, in particular, any one of Clauses 39-43, further comprising ceasing the generating the volumetric plasma, moving the one or more products out of the volumetric plasma, and/or moving the volumetric plasma away from the one or more products.

Clause 45. The method of any clause or example herein, in particular, any one of Clauses 39-44, further comprising actively cooling the one or more products, and/or subjecting the one or more products to a gas flow so as to break the one or more products into smaller size droplets.

Clause 46. The method of any clause or example herein, in particular, any one of Clauses 1-45, wherein the generating comprises:

initiating the volumetric plasma by applying voltage between the first and second electrodes with the gap at a first distance;

moving the first electrode away from the second electrode and/or moving the second electrode away from the first electrode; and maintaining the initiated volumetric plasma by applying voltage between the first and second electrodes with the gap being greater than the first distance.

Clause 47. The method of any clause or example herein, in particular, any one of Clauses 1-46, wherein the generating is such that the volumetric plasma is maintained in a same volume for at least 10 minutes.

Clause 48. The method of any clause or example herein, in particular, any one of Clauses 1-47, wherein the temperature of the volumetric plasma is spatially-uniform, for example, where a temperature of the volumetric plasma across a second direction substantially perpendicular to the first direction varies by no more than 10%.

Clause 49. The method of any clause or example herein, in particular, any one of Clauses 1-48, wherein:

one, some, or all of the first projecting portions, the second projecting portions, the third projecting portions, and the fourth projecting portions have a substantially one-dimensional sharp tip at an end thereof proximal to or within the gap;

one, some, or all of the first projecting portions, the second projecting portions, the third projecting portions, and the fourth projecting portions have a substantially two-dimensional sharp tip at an end thereof proximal to or within the gap;

one, some, or all of the first projecting portions, the second projecting portions, the third projecting portions, and the fourth projecting portions have a blunt tip at an end thereof proximal to or within the gap; or any combination of the above.

Clause 50. A system configured to perform the method of any clause or example herein, in particular, any one of Clauses 1-49, for example, as described with respect to any of FIGS. 1A-11.

Clause 51. A system comprising:

a first electrode comprising a first base layer and a plurality of first projecting portions, the first base layer comprising a first electrically-conductive material, at least some of the first projecting portions comprising a second electrically-conductive material, a melting temperature for the first electrically-conductive material and a melting temperature for the second electrically-conductive material being at least 1000 K;

a second electrode spaced from the first electrode by a gap, the plurality of first projecting portions extending along a first direction from the first base layer toward the second electrode;

an electrical power source electrically coupled to the first and second electrodes; and a control system operatively coupled to the electrical power source and configured to control operation thereof, the control system comprising one or more processors and computer-readable storage media storing instructions that, when executed by the one or more processors, cause the electrical power source to apply voltage between the first and second electrodes such that a volumetric plasma is generated within or adjacent to the gap, a temperature of the volumetric plasma being in a range of 1000-8000 K, inclusive.

Clause 52. The system of any clause or example herein, in particular, any one of Clauses 50-51, wherein:

each of the first projecting portions has a cross-sectional dimension in a plane substantially perpendicular to the first direction less than or equal to 1 mm, for example, less than or equal to 500 μm;

each of the first projecting portions has a length along the first direction less than or equal to 1 cm, for example, less than or equal to 5 mm;

each of the first projecting portions is spaced from adjacent ones of the plurality of first projecting portions by less than or equal 1 mm; or any combination of the above.

Clause 53. The system of any clause or example herein, in particular, any one of Clauses 50-52, wherein:

a cross-sectional dimension of each of the first projecting portions is in a range of 1-100 μm inclusive, for example, in a range of 1-50 μm, inclusive;

the length of each of the first projecting portions is in a range of 200-500 μm inclusive;

the spacing between adjacent first projecting portions is less than or equal to 100 μm, for example, less than or equal to 50 μm;

a density of the first projecting portions is at least $10^4$ portions/$cm^2$; or any combination of the above.

Clause 54. The system of any clause or example herein, in particular, any one of Clauses 50-53, wherein the spacing between adjacent first projecting portions is in a range of 3-20 μm, inclusive.

Clause 55. The system of any clause or example herein, in particular, any one of Clauses 50-54, wherein a thickness of the gap along the first direction is in a range of 1 mm to 10 cm, inclusive, for example, in a range of 1 mm to 1 cm, inclusive.

Clause 56. The system of any clause or example herein, in particular, any one of Clauses 50-55, wherein the electrical power source is configured to apply a direct current (DC) voltage, an alternating current (AC) voltage, or a pulsed voltage waveform between the first and second electrodes.

Clause 57. The system of any clause or example herein, in particular, any one of Clauses 50-56, wherein the computer-readable storage media stores additional instructions that, when executed by the one or more processors, cause the electrical power source to apply a peak voltage between the first and second electrodes of less than or equal to 100 V in order to generate the volumetric plasma, and/or to apply a peak current between the first and second electrodes of less than or equal to 100 A in order to generate the volumetric plasma.

Clause 58. The system of any clause or example herein, in particular, any one of Clauses 50-57, wherein the computer-readable storage media stores additional instructions that, when executed by the one or more processors, further cause the electrical power source to:

initiate the volumetric plasma by applying a first direct current (DC) voltage, a first alternating current (AC) voltage, or a first pulsed voltage waveform between the first and second electrodes; and maintain the initiated volumetric plasma by applying a second DC voltage, a second AC voltage, or a second pulsed voltage waveform between the first and second electrodes, wherein an absolute value of a peak voltage of the second DC voltage, the second AC voltage, or the second pulsed voltage waveform is less than an absolute value of a peak voltage of the first DC voltage, the first AC voltage, or the first pulsed voltage waveform.

Clause 59. The system of any clause or example herein, in particular, Clause 57, wherein the absolute value of the peak voltage of the first DC voltage, the first AC voltage, or the first pulsed waveform is in a range of 10-100 V, inclusive, and/or the absolute value of the peak voltage of the second DC voltage, the second AC voltage, or the second pulsed waveform is in a range of 10-50 V, inclusive.

Clause 60. The system of any clause or example herein, in particular, any one of Clauses 50-59, wherein a size of the first and second electrodes are such that a size of the generated plasma along a second direction is at least 1 mm, for example, in a range of 1 mm to 100 cm, inclusive, the second direction being in a plane substantially perpendicular to the first direction.

Clause 61. The system of any clause or example herein, in particular, any one of Clauses 50-60, wherein the system is configured to generate the volumetric plasma at a pressure in a range of 1 Torr to 10 atm, inclusive, for example, about 1 atm.

Clause 62. The system of any clause or example herein, in particular, any one of Clauses 50-61, wherein the first electrically-conductive material is the same as the second electrically-conductive material.

Clause 63. The system of any clause or example herein, in particular, any one of Clauses 50-62, wherein the first electrically-conductive material, the second electrically-conductive material, or both comprise a refractory metal, a refractory metal alloy, or both of the foregoing.

Clause 64. The system of any clause or example herein, in particular, any one of Clauses 50-63, wherein the first electrically-conductive material, the second electrically-conductive material, or both comprise a metal carbide, a silicon carbide, a metal nitride, a metal diboride, or any combination of the foregoing.

Clause 65. The system of any clause or example herein, in particular, any one of Clauses 50-64, wherein:

the second electrode comprises a second base layer and a plurality of second projecting portions that extend along the first direction from the second base layer toward the first electrode;

the second base layer comprises a third electrically-conductive material;

at least some of the second projecting portions comprise a fourth electrically-conductive material; and a melting temperature for the third electrically-conductive material and a melting temperature for the fourth electrically-conductive material are at least 1000 K.

Clause 66. The system of any clause or example herein, in particular, any one of Clauses 50-65, wherein at least one of the first through fourth electrically-conductive materials is the same as another of the first through fourth electrically-conductive materials.

Clause 67. The system of any clause or example herein, in particular, any one of Clauses 50-66, wherein an end of each of the at least some of the first projecting portions is conical, and/or an end of each of the at least some of the second projecting portions is conical.

Clause 68. The system of any clause or example herein, in particular, any one of Clauses 50-67, wherein:

the first electrode further comprises a plurality of third projecting portions that extend along the first direction from the first base layer toward the second electrode farther than the plurality of first projecting portions, at least some of the third projecting portions being formed of a fifth electrically-conductive material;

the second electrode comprises a plurality of fourth projecting portions that extend along the first direction from the second base layer toward the first electrode, at least some of the fourth projecting portions being formed of a sixth electrically-conductive material;

at least one of the third projecting portions contacts with at least one of the fourth projecting portions in the gap or is separated from the at least one of the fourth projecting portions by no more than 25 μm, for example, less than or equal to 5 μm; and a melting temperature for the fifth electrically-conductive material and a melting temperature for the sixth electrically-conductive material are at least 1000 K.

Clause 69. The system of any clause or example herein, in particular, Clause 68, wherein the computer-readable storage media stores additional instructions that, when executed by the one or more processors, further cause the electrical power source to initiate the volumetric plasma via gas discharge between the third and fourth projecting portions, and maintain the initiated volumetric plasma via gas discharge between the first and second projecting portions.

Clause 70. The system of any clause or example herein, in particular, any one of Clauses 68-69, wherein the computer-readable storage media stores additional instructions that, when executed by the one or more processors, further cause the electrical power source to prior to initiating the volumetric plasma, apply a first voltage between the first and second electrodes such that a current flows through contacting parts of the at least one of the third and fourth projecting portions and causes Joule heating thereof, the Joule heating causing breakage of the at least one of the third and/or fourth projecting portions such that the at least one of the third projecting portions become separated from the at least one of the fourth projecting portions by a spacing of less than or equal to 10 μm, for example, 1-5 μm, inclusive.

Clause 71. The system of any clause or example herein, in particular, any one of Clauses 68-70, wherein at least one of the first through sixth electrically-conductive materials is the same as another of the first through sixth electrically-conductive materials.

Clause 72. The system of any clause or example herein, in particular, any one of Clauses 50-71, wherein one, some, or all of the first through sixth electrically-conductive materials comprise (i) carbon or graphite, (ii) a refractory metal, a refractory metal alloy, or both of the foregoing, (iii) a metal carbide, a silicon carbide, a metal nitride, a metal diboride, or any combination of the foregoing, or (iv) any combination of (i)-(iii).

Clause 73. The system of any clause or example herein, in particular, any one of Clauses 50-72, wherein:

each of the third projecting portions and/or each of the fourth projecting portions has a maximum cross-sectional dimension in a plane substantially perpendicular to the first direction less than or equal to 1 mm, for example, less than or equal to 500 μm;

the maximum cross-sectional dimension of each of the third projecting portions and/or each of the fourth projecting portions is in a range of 1-100 μm inclusive, for example, in a range of 1-50 μm, inclusive;

each of the third projecting portions and/or each of the fourth projecting portions has a length along the first direction greater than 1 mm, for example, in a range of 10-100 mm, inclusive; or any combination of the above.

Clause 74. The system of any clause or example herein, in particular, any one of Clauses 50-73, wherein the first electrode, the second electrode, or both comprise woven carbon or metal fibers.

Clause 75. The system of any clause or example herein, in particular, any one of Clauses 50-74, wherein the plurality of first projecting portions, the plurality of second projecting portions, the plurality of third projecting portions, and/or the plurality of fourth projecting portions comprise three-dimensionally-printed pillars.

Clause 76. The system of any clause or example herein, in particular, any one of Clauses 50-75, wherein the first electrode, the second electrode, or both have a non-planar geometry.

Clause 77. The system of any clause or example herein, in particular, any one of Clauses 50-76, further comprising a first translation stage constructed to move the first electrode and/or a second translation stage constructed to move the second electrode.

Clause 78. The system of any clause or example herein, in particular, Clause 77, wherein the control system is operatively coupled to the first translation stage and/or the second translation stage and configured to control operation thereof, and the computer-readable storage media stores additional instructions that, when executed by the one or more processors, cause the first translation stage and/or the second translation stage to move one of the first and second electrodes with respect to the other of the first and second electrodes.

Clause 79. The system of any clause or example herein, in particular, any one of Clauses 77-78, wherein the second electrode has a surface area facing the gap greater than that of the first electrode, and the computer-readable storage media stores instructions that, when executed by the one or more processors, cause the first translation stage and/or the second translation stage to move one of the first and second electrodes with respect to the other so as to change a location of the volumetric plasma.

Clause 80. The system of any clause or example herein, in particular, any one of Clauses 77-79, wherein the computer-readable storage media stores instructions that, when executed by the one or more processors, cause:

the first translation stage and/or the second translation stage to position the first and second electrodes such that the gap is at a first distance;

the electrical power source to initiate the volumetric plasma by applying voltage between the first and second electrodes with the gap at the first distance;

the first translation stage and/or the second translation stage to move the first and second electrodes away from each other after initiation of the volumetric plasma; and the electrical power source to maintain the initiated volumetric plasma by applying voltage between the first and second electrodes with the gap being greater than the first distance.

Clause 81. The system of any clause or example herein, in particular, any one of Clauses 50-80, wherein the first and second electrodes are arranged such that a thickness of the gap along the first direction is at a non-zero angle with respect to a direction of gravity.

Clause 82. The system of any clause or example herein, in particular, any one of Clauses 50-81, wherein:

one, some, or all of the first projecting portions, the second projecting portions, the third projecting portions, and the fourth projecting portions have a substantially one-dimensional sharp tip at an end thereof proximal to or within the gap;

one, some, or all of the first projecting portions, the second projecting portions, the third projecting portions, and the fourth projecting portions have a substantially two-dimensional sharp tip at an end thereof proximal to or within the gap;

one, some, or all of the first projecting portions, the second projecting portions, the third projecting portions, and the fourth projecting portions have a blunt tip at an end thereof proximal to or within the gap; or any combination of the above.

Clause 83. A method for operating the system of any clause or example herein, in particular, any one of Clauses 1-49, for example, as described with respect to any of FIGS. 1A-11.

Clause 84. A method for generating and/or use of a plasma according to any of the examples disclosed herein, or combinations thereof, for example, as described with respect to any of FIGS. 1A-11.

CONCLUSION

Any of the features illustrated or described herein, for example, with respect to FIGS. 1A-11 and Clauses 1-84, can be combined with any other feature illustrated or described herein, for example, with respect to FIGS. 1A-11 and Clauses 1-84 to provide systems, devices, structures, methods, and embodiments not otherwise illustrated or specifically described herein. All features described herein are independent of one another and, except where structurally impossible, can be used in combination with any other feature described herein. In view of the many possible embodiments to which the principles of the disclosed technology may be applied, it should be recognized that the illustrated embodiments are only examples and should not be taken as limiting the scope of the disclosed technology. Rather, the scope is defined by the following claims. We therefore claim all that comes within the scope and spirit of these claims.

The invention claimed is:

1. A method comprising:

generating a volumetric plasma between first and second electrodes spaced from each other by a gap, the first electrode comprising a first base layer and a plurality of first projecting portions that extend along a first direction from the first base layer toward the second electrode, wherein the first base layer comprises a first electrically-conductive material, at least some of the first projecting portions comprise a second electrically-conductive material, a melting temperature for the first electrically-conductive material and a melting temperature for the second electrically-conductive material are at least 1000 K, and during the generating, a temperature of the volumetric plasma between the first and second electrodes is in a range of 1000-8000 K, inclusive.

2. The method of claim 1, wherein:

each of the first projecting portions has a maximum cross-sectional dimension in a plane substantially perpendicular to the first direction less than or equal to 500 μm;

each of the first projecting portions has a length along the first direction less than or equal to 1 cm;

each of the first projecting portions is spaced from adjacent ones of the plurality of first projecting portions by less than or equal 1 mm; or any combination of the above.

3. The method of claim 1, wherein the generating comprises:

initiating the volumetric plasma by applying a first direct current (DC) voltage, a first alternating current (AC) voltage, or a first pulsed voltage waveform between the first and second electrodes; and maintaining the initiated volumetric plasma by applying a second DC voltage, a second AC voltage, or a second pulsed voltage waveform between the first and second electrodes, wherein an absolute value of a peak voltage of the second DC voltage, the second AC voltage, or the second pulsed voltage waveform is less than an absolute value of a peak voltage of the first DC voltage, the first AC voltage, or the first pulsed voltage waveform.

4. The method of claim 1, wherein a size of the generated plasma along a second direction is in range of 1 mm to 100 cm, inclusive, the second direction being in a plane substantially perpendicular to the first direction.

5. The method of claim 1, wherein:

the second electrode comprises a second base layer and a plurality of second projecting portions that extend along the first direction from the second base layer toward the first electrode;

the second base layer comprises a third electrically-conductive material;

at least some of the second projecting portions comprise a fourth electrically-conductive material; and a melting temperature for the third electrically-conductive material and a melting temperature for the fourth electrically-conductive material are at least 1000 K.

6. The method of claim 5, wherein:

the first electrode further comprises a plurality of third projecting portions that extend along the first direction from the first base layer toward the second electrode farther than the plurality of first projecting portions, at least some of the third projecting portions being formed of a fifth electrically-conductive material;

the second electrode further comprises a plurality of fourth projecting portions that extend along the first direction from the second base layer toward the first electrode farther than the plurality of second projecting portions, at least some of the fourth projecting portions being formed of a sixth electrically-conductive material;

at least one of the third projecting portions contacts with at least one of the fourth projecting portions in the gap or is separated from the at least one of the fourth projecting portions by no more than 5 μm; and a melting temperature for the fifth electrically-conductive material and a melting temperature for the sixth electrically-conductive material are at least 1000 K.

7. The method of claim 6, wherein the generating comprises:

initiating the volumetric plasma via gas discharge between the third and fourth projecting portions; and maintaining the volumetric plasma via gas discharge between the first and second projecting portions.

8. The method of claim 1, wherein:

the second electrode has a surface area facing the gap greater than that of the first electrode; and the method further comprises, during the generating, moving one of the first and second electrodes with respect to the other so as to change a location of the generated volumetric plasma.

9. The method of claim 1, further comprising, prior to or at a same time as the generating, disposing one or more precursors within or adjacent to the gap between the first and second electrodes such that the volumetric plasma heats the one or more precursors so as to form one or more products.

10. The method of claim 1, further comprising, during the generating, flowing one or more gases and/or one or more precursors through the volumetric plasma such that the volumetric plasma heats the one or more gases and/or the one or more precursors so at to form one or more products.

11. The method of claim 1, wherein the generating comprises:

initiating the volumetric plasma by applying voltage between the first and second electrodes with the gap at a first distance;

moving the first electrode away from the second electrode and/or moving the second electrode away from the first electrode; and maintaining the initiated volumetric plasma by applying voltage between the first and second electrodes with the gap being greater than the first distance.

12. A system comprising:

a first electrode comprising a first base layer and a plurality of first projecting portions, the first base layer comprising a first electrically-conductive material, at least some of the first projecting portions comprising a second electrically-conductive material, a melting temperature for the first electrically-conductive material and a melting temperature for the second electrically-conductive material being at least 1000 K;

a second electrode spaced from the first electrode by a gap, the plurality of first projecting portions extending along a first direction from the first base layer toward the second electrode;

an electrical power source electrically coupled to the first and second electrodes; and a control system operatively coupled to the electrical power source and configured to control operation thereof, the control system comprising one or more processors and computer-readable storage media storing instructions that, when executed by the one or more processors, cause the electrical power source to apply voltage between the first and second electrodes such that a volumetric plasma is generated within or adjacent to the gap, a temperature of the volumetric plasma being in a range of 1000-8000 K, inclusive.

13. The system of claim 12, wherein:

each of the first projecting portions has a maximum cross-sectional dimension in a plane substantially perpendicular to the first direction less than or equal to 500 μm;

each of the first projecting portions has a length along the first direction less than or equal to 1 cm;

each of the first projecting portions is spaced from adjacent ones of the plurality of first projecting portions by less than or equal 1 mm; or any combination of the above.

14. The system of claim 12, wherein the electrical power source is configured to apply a direct current (DC) voltage, an alternating current (AC) voltage, or a pulsed voltage waveform between the first and second electrodes.

15. The system of claim 12, wherein the computer-readable storage media stores additional instructions that, when executed by the one or more processors, further cause the electrical power source to:

initiate the volumetric plasma by applying a first direct current (DC) voltage, a first alternating current (AC) voltage, or a first pulsed voltage waveform between the first and second electrodes; and maintain the initiated volumetric plasma by applying a second DC voltage, a second AC voltage, or a second pulsed voltage waveform between the first and second electrodes, wherein an absolute value of a peak voltage of the second DC voltage, the second AC voltage, or the second pulsed voltage waveform is less than an absolute value of a peak voltage of the first DC voltage, the first AC voltage, or the first pulsed voltage waveform.

16. The system of claim 12, wherein a size of the first and second electrodes are such that a size of the generated plasma along a second direction is in a range of 1 mm to 100 cm, inclusive, the second direction being in a plane substantially perpendicular to the first direction.

17. The system of claim 12, wherein:

the second electrode comprises a second base layer and a plurality of second projecting portions that extend along the first direction from the second base layer toward the first electrode;

the second base layer comprises a third electrically-conductive material;

at least some of the second projecting portions comprise a fourth electrically-conductive material; and a melting temperature for the third electrically-conductive material and a melting temperature for the fourth electrically-conductive material are at least 1000 K.

18. The system of claim 12, wherein:

the first electrode further comprises a plurality of third projecting portions that extend along the first direction from the first base layer toward the second electrode farther than the plurality of first projecting portions, at least some of the third projecting portions being formed of a fifth electrically-conductive material;

the second electrode comprises a plurality of fourth projecting portions that extend along the first direction from the second base layer toward the first electrode, at least some of the fourth projecting portions being formed of a sixth electrically-conductive material;

at least one of the third projecting portions contacts with at least one of the fourth projecting portions in the gap or is separated from the at least one of the fourth projecting portions by no more than 5 μm; and a melting temperature for the fifth electrically-conductive material and a melting temperature for the sixth electrically-conductive material are at least 1000 K.

19. The system of claim 12, wherein the first electrode, the second electrode, or both have a non-planar geometry.

20. The system of claim 12, further comprising:

(i) a first translation stage constructed to move the first electrode;

(ii) a second translation stage constructed to move the second electrode; or (iii) both (i) and (ii), wherein the control system is operatively coupled to the first translation stage and/or the second translation stage and configured to control operation thereof, and the computer-readable storage media stores additional instructions that, when executed by the one or more processors, cause the first translation stage and/or the second translation stage to move one of the first and second electrodes with respect to the other of the first and second electrodes.

* * * * *